(12) United States Patent
Steedman Henderson et al.

(10) Patent No.: US 10,885,906 B2
(45) Date of Patent: Jan. 5, 2021

(54) DIALOGUE SYSTEM, A DIALOGUE METHOD, A METHOD OF GENERATING DATA FOR TRAINING A DIALOGUE SYSTEM, A SYSTEM FOR GENERATING DATA FOR TRAINING A DIALOGUE SYSTEM AND A METHOD OF TRAINING A DIALOGUE SYSTEM

(71) Applicant: PolyAI Limited, London (GB)

(72) Inventors: Matthew Steedman Henderson, Singapore (SG); Tsung-Hsien Wen, London (GB); Pei-Hao Su, London (GB); Nikola Mrksic, London (GB); Ivan Vulic, London (GB)

(73) Assignee: PolyAI Limited, London (GB)

( * ) Notice: Subject to any disclaimer, the term of this patent is extended or adjusted under 35 U.S.C. 154(b) by 0 days.

(21) Appl. No.: 16/678,071

(22) Filed: Nov. 8, 2019

(65) Prior Publication Data
US 2020/0152184 A1    May 14, 2020

(30) Foreign Application Priority Data
Nov. 8, 2018   (GB) .................................. 1818237.8

(51) Int. Cl.
*G10L 15/22*        (2006.01)
*G10L 15/197*       (2013.01)
(Continued)

(52) U.S. Cl.
CPC .............. *G10L 15/197* (2013.01); *G06N 3/08* (2013.01); *G10L 13/00* (2013.01); *G10L 15/063* (2013.01);
(Continued)

(58) Field of Classification Search
CPC .... G06F 40/211; G06F 40/253; G06F 40/268; G06F 40/284; G06F 40/30; G10L 15/063; G10L 15/00; G10L 15/1822
See application file for complete search history.

(56) References Cited

U.S. PATENT DOCUMENTS 8,366,554 B1     2/2013  Yuan
2005/0261881 A1*  11/2005  Jackson ................. G06F 30/00
                                                703/1
(Continued)

OTHER PUBLICATIONS

Bordes, Antoine et al.; "Learning End-to-End Goal-Oriented Dialog" arXiv:1605.07683v4 [cs.CL], Mar. 30, 2017; pp. 1-15.
(Continued)

*Primary Examiner* — Lamont M Spooner
(74) *Attorney, Agent, or Firm* — Bracewell LLP; Christopher L. Drymalla

(57) ABSTRACT

A dialogue system comprising: an input for receiving input data relating to a speech or text signal originating from a user; an output for outputting speech or text information specified by a dialogue act; and a processor configured to: generate features from the input signal; for each of a plurality of classifier models, each classifier model corresponding to a dialogue slot, and for one or more values corresponding to the dialogue slot, input features generated from the input signal, the classifier model outputting a probability corresponding to each of three or more relations, wherein the relations specify the relation of the value to the dialogue slot; update a belief state based on the outputs of the classifier models; determine a system dialogue act by inputting information relating to the belief state into a policy model; output speech or text information specified by the determined dialogue act at the output.

12 Claims, 23 Drawing Sheets

(51) Int. Cl.
| | |
|---|---|
| G06F 40/35 | (2020.01) |
| G10L 15/16 | (2006.01) |
| G06N 3/08 | (2006.01) |
| G10L 15/06 | (2013.01) |
| G10L 13/00 | (2006.01) |

(52) U.S. Cl.
CPC .............. *G10L 15/16* (2013.01); *G10L 15/22* (2013.01); *G10L 2015/223* (2013.01)

(56) References Cited

U.S. PATENT DOCUMENTS

| | | | | |
|---|---|---|---|---|
| 2010/0153324 | A1* | 6/2010 | Downs | G06F 40/42 |
| | | | | 706/21 |
| 2012/0166469 | A1* | 6/2012 | Cammert | G06F 16/24568 |
| | | | | 707/769 |
| 2016/0171514 | A1* | 6/2016 | Frank | G06F 16/337 |
| | | | | 705/7.29 |
| 2017/0069000 | A1* | 3/2017 | Duleba | G06F 16/23 |
| 2017/0193020 | A1* | 7/2017 | Yi | G06F 16/90324 |
| 2018/0052842 | A1* | 2/2018 | Hewavitharana | G06F 40/232 |
| 2018/0052884 | A1* | 2/2018 | Kale | G06F 16/242 |
| 2018/0052885 | A1* | 2/2018 | Gaskill | G06N 5/04 |
| 2018/0052913 | A1* | 2/2018 | Gaskill | G06F 16/3344 |
| 2018/0114142 | A1* | 4/2018 | Mueller | G06K 9/18 |
| 2018/0173698 | A1* | 6/2018 | Dubey | G06F 16/3347 |
| 2018/0196881 | A1* | 7/2018 | Lundin | G06F 16/9535 |
| 2018/0203833 | A1 | 7/2018 | Liang et al. | |
| 2018/0285465 | A1* | 10/2018 | Schaffernoth | G06F 16/9535 |
| 2018/0296925 | A1 | 10/2018 | Yuan | |
| 2018/0330721 | A1 | 11/2018 | Thomson et al. | |
| 2018/0341871 | A1* | 11/2018 | Maitra | G06N 5/046 |
| 2018/0349412 | A1* | 12/2018 | Waldeck | G06Q 10/06315 |
| 2019/0012371 | A1* | 1/2019 | Campbell | G06F 16/90332 |
| 2019/0122111 | A1* | 4/2019 | Min | G06N 3/0454 |
| 2019/0130904 | A1* | 5/2019 | Homma | G06N 3/088 |
| 2019/0188537 | A1* | 6/2019 | Dutta | G06K 9/6262 |
| 2019/0349321 | A1* | 11/2019 | Cai | G06F 16/9038 |
| 2020/0074984 | A1* | 3/2020 | Ho | G10L 15/1815 |

OTHER PUBLICATIONS

Budzianowski, Pawel et al.; "MultiWOZ—A Large-Scale Multi-Domain Wizard-of-Oz Dataset for Task-Oriented Dialogue Modelling" Conference on Empirical Methods in Natural Language Processing, Brussels, Oct. 31-Nov. 4, 2018; pp. 5016-5026.

El Asri, Layla et al.; "Frames: A Corpus for Adding Memory to Goal-Oriented Dialogue Systems" (2017) available at: https://protect-eu.mimecast.com/s/b-jyCOYPASA6w78cQeEA5?domain=aclweb.org; pp. 1-13.

Eric, Mihail et al.; "Key-Value Retrieval Networks for Task-Oriented Dialogue" SIGDAL 2017 Conference, Saarbrucken, Aug. 15-17, 2017; pp. 37-49.

Goyal, Anuj et al.; "Fast and Scalable Expansion of Natural Language Understanding Functionality for Intelligent Agents" NAACL-HLT 2018, New Orleans, Jun. 1-6, 2018; pp. 145-152.

Henderson, Matthew et al.; "Robust Dialog State Tracking Using Delexicalised Recurrent Neural Networks and Unsupervised Adaptation" (2014) available at: https://protect-eu.mimecast.com/s/NINCCyP9KuNIJBzTI3H-0?domain=svr-ftp.eng.cam.ac.uk; pp. 1-6.

Henderson, Matthew et al.; "The Second Dialog State Tracking Challenge" SIDGAL 2014 Conference, Philadelphia, Jun. 18-20, 2014; pp. 263-272.

Henderson, Matthew et al.; "Word-Based Dialog State Tracking with Recurrent Neural Networks" SIGDAL 2014 Conference, Philadelphia, Jun. 18-20, 2014; pp. 292-299.

Henderson, Matthew; "Machine Learning for Dialog State Tracking: A Review" (2015) available at: https://protect-eu.mimecast.com/s/tDd2CBBPkhVgAL9cKfV63?domain=static.googleusercontent.com; pp. 1-8.

Jiang, Youxuan et al.; "Understanding Task Design Trade-offs in Crowdsourced Paraphrase Collection" 55th Annual Meeting of the Association for Computational Linguistics, Vancouver, Jul. 30-Aug. 4, 2017; pp. 103-109.

Kang, Yiping et al.; "Data Collection for a Production Dialogue System: A Clinc Perspective" NAACL-HLT 2018, New Orleans, Jun. 1-6, 2018; pp. 33-40.

Larsson, S. et al.; "Information state and dialogue management in the TRINDI Dialogue Move Engine Toolkit" Natural Language Engineering 1 (1): 000 000, Mar. 26, 2000; pp. 1-17.

Li, Jiwei et al.; "Deep Reinforcement Learning for Dialogue Generation" arXiv:1606.01541v4 [cs.CL] Sep. 29, 2016; pp. 1-11.

Li, Xiujun et al.; "A User Simulator for Task-Completion Dialogues" arXiv:1612.05688v3 [cs.LG] Nov. 13, 2017; pp. 1-14.

Liu, Bing et al.; "Dialogue Learning with Human Teaching and Feedback in End-to-End Trainable Task-Oriented Dialogue Systems" NAACL-HLT 2018, New Orleans, Jun. 1-6, 2018; pp. 2060-2069.

Miller, Alexander H. et al.; "ParlAI: A Dialogue Research Software Platform" 2017 EMNLP System Demonstrations, Copenhagen, Sep. 7-11, 2017; pp. 79-84.

Mrksic, Nicola et al.; "Multi-domain Dialog State Tracking using Recurrent Neural Networks" 53rd Annual Meeting of the Association for Computational Linguistics, Beijing, Jul. 26-31, 2015; pp. 794-799.

Mrksic, Nicola et al.; "Neural Belief Tracker: Data-Driven Dialogue State Tracking" 55th Annual Meeting of the Association for Computational Linguistics, Vancouver, Jul. 30-Aug. 4, 2017; pp. 1777-1788.

Mrksic, Nicola et al.; "Semantic Specialization of Distributional Word Vector Spaces using Monolingual and Cross-Lingual Constraints" Transactions of the Association for Computational Linguistics, 2017, vol. 5; pp. 309-324.

Mrksic, Nicola; "Data-Driven Language Understanding for Spoken Dialogue Systems" University of Cambridge, Dissertation for the degree of Doctor of Philosophy, Jun. 2018; pp. 1-150.

Perez, Julien et al.; "Dialog state tracking, a machine reading approach using Memory Network" 15th Conference of the European Chapter of the Association for Computational Linguistics, Valencia, Apr. 3-7, 2017; pp. 305-314.

Rastogi, Abhinav et al.; "Multi-task learning for Joint Language Understanding and Dialogue State Tracking" SIGDAL 2018 Conference, Melbourne, Jul. 12-14, 2018; pp. 376-384.

Schatzmann, Jost et al.; "Agenda-Based User Simulation for Bootstrapping a POMDP Dialogue System" NAACL HLT 2007, Companion Volume, Rochester, Apr. 2007; pp. 1-4.

Shah, Pararth et al.; "Bootstrapping a Neural Conversational Agent with Dialogue Self-Play, Crowdsourcing and On-Line Reinforcement Learning" NAACL-HLT 2018, New Orleans, Jun. 1-6, 2018; pp. 41-51.

Shah, Pararth et al.; "Building a Conversational Agent Overnight with Dialogue Self-Play" arXiv:1801.04871v1 [cs.AI], Jan. 15, 2018; pp. 1-11.

Shi, Chen et al.; "Auto-Dialabel: Labeling Dialogue Data with Unsupervised Learning" 2018 Conference on Empirical Methods in Natural Language Processing, Brussels, Oct. 31-Nov. 4, 2018; pp. 684-689.

Su, Pei-Hao et al.; "On-line Active Reward Learning for Policy Optimization in Spoken Dialogue Systems" 54 Annual Meeting of the Association for Computational Linguistics, Berlin, Aug. 7-12, 2016; pp. 2431-2441.

Tur, Gokhan et al.; "What Is Left to Be Understood in ATIS?" SLT 2010; pp. 19-24.

Wei, Wei et al.; "AirDialogue: An Environment for Goal-Oriented Dialogue Research" 2018 Conference on Empirical Methods in Natural Language Processing, Brussels, Oct. 31-Nov. 4, 2018; pp. 3844-3854.

Wen, Tsung-Hsien et al.; "A Network-based End-to-End Trainable Task-oriented Dialogue System" 15th Conference of the European Chapter of the Association for Computational Linguistics, Valencia, Apr. 3-7, 2017; pp. 438-449.

(56) References Cited

OTHER PUBLICATIONS

Williams, Jason D. et al.; "Hybrid Code Networks: practical and efficient end-to-end dialog control with supervised and reinforcement learning" arXiv:1702.03274v2 [cs.AI] Apr. 24, 2017; pp. 1-13.

Eric, Mihail et al.; "MultiWOZ 2.1: A Consolidated Multi-Domain Dialogue Dataset with State Corrections and State Tracking Baselines" arXiv:1907.01669v4 [cs.CL], Dec. 3, 2019; pp. 1-7.

Henderson, Matthew et al.; "A Repository of Conversational Datasets" arXiv:1904.06472v2 [cs.CL], May 29, 2019; pp. 1-10.

Larson, Stefan et al.; "An Evaluation Dataset for Intent Classification and Out-of-Scope Prediction" Conference on Empirical Methods in Natural Language Processing, Hong Kong, Nov. 3-7, 2019; pp. 1311-1316.

Liu, Xingkun et al.; "Benchmarking Natural Language Understanding Services for building Conversational Agents" arXiv:1903.05566v3 [cs.CL], Mar. 26, 2019; pp. 1-13.

Microsoft "MetaLWOz—Microsoft Research" available at the url: https://www.microsoft.com/en-us/research/projecti-metalwoz, dated Jun. 14, 2019; retrieved Feb. 5, 2020; pp. 1-5.

Rastogi, Abhinav et al.; "Towards Scalable Multi-domain Conversational Agents: The Schema-Guided Dialogue Dataset" arXiv:1909.05855v1 [cs.CL], Sep. 12, 2019; pp. 1-11.

* cited by examiner

INFORMABLE SLOTS: {
PRICE RANGE: [
    cheap,
    moderate,
    expensive
],
AREA: [
    centre,
    north,
    west,
    south,
    east
],
FOOD: [
    Afghan, African, Afternoon Tea, Asian, Australian,
    Austrian, Barbeque, Basque, Belgium, Bistro, Brazilian,
    British, Cantonese, Caribbean, Catalan, Chinese,
    Christmas, Corsican, Creative, Crossover, Cuban,
    Danish, Dutch, English, Eritrean, French, Fusion ...
],
NAME: [
    Ali Baba, Anatolia, Ask, Backstreet Bistro,
    Bangkok City, Bedouin, Bloomsbury,
    Caffe Uno, Cambridge Lodge, Charlie Chan,
    Chiquito Restaurant Bar, City Stop Restaurant,
    Clowns Cafe, Cocum, Cote, Curry Garden,
    Curry King, Curry Prince, Curry Queen.....
],
REQUESTABLE SLOTS: [
    Postcode,
    Address,
    Area,
    Food,
    Phone,
    Price Range,
    Signature,
    Name
],

Figure 2(b)

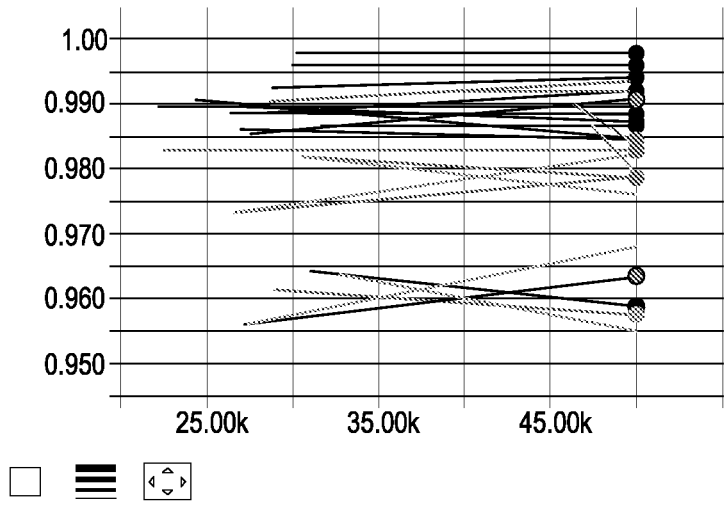
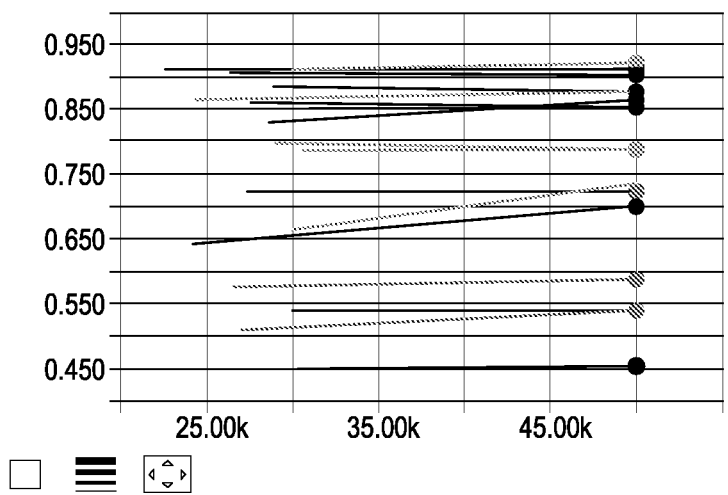
Figure 5

|  | Transcription | Best Serbian restaurant downtown? | Score / Weight |
| --- | --- | --- | --- |
|  | ASR Hypothesis 1 | Best Serbian restaurant downtown? | 0.84 |
|  | ASR Hypothesis 2 | Best Siberian restaurant downtown? | 0.16 |

$f_l$ : Lexical $n$-gram features

| | | |
| --- | --- | --- |
| Lexical Unigrams | Best | 1.0 |
| | restaurant | 1.0 |
| | downtown | 1.0 |
| | Serbian | 0.84 |
| | Siberian | 0.16 |
| Lexical Bigrams | restaurant downtown | 1.0 |
| | Best Serbian | 0.84 |
| | Serbian restaurant | 0.84 |
| | Best Siberian | 0.16 |
| | Siberian restaurant | 0.16 |
| Lexical Trigrams | Best Serbian restaurant | 0.84 |
| | Serbian restaurant downtown | 0.84 |
| | Best Siberian restaurant | 0.16 |
| | Siberian restaurant downtown | 0.16 |

$f_{d,v}$: Delexicalised $n$-gram features

| | | |
| --- | --- | --- |
| for $v$ = Serbian | VALUE | 0.84 |
| | Best VALUE | 0.84 |
| | VALUE restaurant | 0.84 |
| | Best VALUE restaurant | 0.84 |
| | VALUE restaurant downtown | 0.84 |
| for $v$ = Siberian | VALUE | 0.16 |
| | Best VALUE | 0.16 |
| | VALUE restaurant | 0.16 |
| | Best VALUE restaurant | 0.16 |
| | VALUE restaurant downtown | 0.16 |
| for $v \neq$ Serbian, Siberian | <EMPTY LIST> | - |

Figure 6(c)

```
Dialogue 0.
********************
  dialogue_id: "2e091838-6d2a-4ed5-bf06-caac5cde4d0e"
  simulation_id: "test"
  created_time {
    seconds: 1521617975
    nanos: 614672000
  }

Turn 0.
  =========
    current_user_template: "I want price range is cheap\n AND price range is NOT moderate."
    last_system_template: "Greetings!"
    user_concept_highlights: [(price range="cheap") [-1:-1], (price range!="moderate") [-1:-1]]
    system_concept_highlights:[]
    dialogue_turn {
      dialogue_id: "2e091838-6d2a-4ed5-bf06-caac5cde4d0e"
      last_system_act: GREETING()
      user_action: INFORM
      slu_labels: (price range="cheap", price range!="moderate")
      state_labels: (price range="cheap", price range!="moderate")
    }

Turn 1.
  =========
    current_user_template: "I want has_wheelchair_access is True\n AND cuisine is Hot Dogs."
    last_system_template: "How about name is Boyce Da Roca\n AND price range is cheap?\n Anything else?"
    user_concept_highlights: [(accessible_wheelchair=True) [-1:-1], (cuisine="Hot Dogs") [-1:-1]]
    system_concept_highlights:[(name="Boyce Da Roca") [-1:-1], (price range="cheap") [-1:-1]]
    dialogue_turn {
      dialogue_id: "2e091838-6d2a-4ed5-bf06-caac5cde4d0e"
      turn_index: 1
      last_system_act: OFFER(name="Boyce Da Roca", price range="cheap"), REQUEST_MORE()
      user_action: INFORM
      slu_labels: (accessible_wheelchair=True, cuisine="Hot Dogs")
      state_labels: (price range="cheap", price range!="moderate", accessible_wheelchair=True, cuisine=
    }

Proto 0.
==========
dialogue_id: "a72a3bfb-56c1-4861-a18a-fd016331dfae"
domain_tag: INITIATE_BOOKING
last_system_act: GREETING()
user_action: INFORM
slu_labels: (name="Acropolis Taverna", time="06:45PM")
state_labels: (name="Acropolis Taverna", time="06:45PM")

Proto 1.
==========
dialogue_id: "a72a3bfb-56c1-4861-a18a-fd016331dfae"
turn_index: 1
domain_tag: INITIATE_BOOKING
last_system_act: REQUEST(date, people)
user_action: INFORM
slu_labels: (date="2018/07/18")
state_labels: (name="Acropolis Taverna", time="06:45PM", date="2018/07/18")

Proto 2.
==========
dialogue_id: "a72a3bfb-56c1-4861-a18a-fd016331dfae"
turn_index: 2
domain_tag: INITIATE_BOOKING
last_system_act: REQUEST(people)
user_action: INFORM
slu_labels: (people="1")
state_labels: (name="Acropolis Taverna", time="06:45PM", date="2018/07/18", people="1")
[ ... ]

Figure 10(b)

Good morning, how can I help?

Hi. I'm looking for a Chinese restaurant.    inform (food = Chinese)

What area would you like?

How about something near Regent Street.    food = Chinese
inform (area = Regent Street)

Szechuan is the only restaurant which serves Chinese food near Regent Street.

What's the address please?    area = Regent Street
food = Chinese
request (address)

Szechuan can be found at 15 - 21 Ganton Street.

Awesome, thanks for your help, bye!    simple-act (goodbye)

Thank you, goodbye!

Figure 15

# DIALOGUE SYSTEM, A DIALOGUE METHOD, A METHOD OF GENERATING DATA FOR TRAINING A DIALOGUE SYSTEM, A SYSTEM FOR GENERATING DATA FOR TRAINING A DIALOGUE SYSTEM AND A METHOD OF TRAINING A DIALOGUE SYSTEM

CROSS-REFERENCE TO RELATED APPLICATIONS

This application is based upon and claims the benefit of priority from prior United Kingdom Application number 1818237.8 filed on Nov. 8, 2018, the entire contents of which are incorporated herein by reference.

FIELD

The present invention relates to a dialogue system, a dialogue method, a system for generating data for training a dialogue system, a method of generating data for training a dialogue system, and a method of training a dialogue system.

BACKGROUND

Dialogue systems, or conversational user interfaces, for example chatbots or voice-based agents, are used in many applications, for example voice or chat-based search, recommendation, and booking.

There is a continuing need to improve the functioning of dialogue systems and the training of such systems. There is a further need to efficiently generate data for training such systems.

BRIEF DESCRIPTION OF FIGURES

Systems and methods in accordance with non-limiting embodiments will now be described with reference to the accompanying figures in which:

FIG. 2(b) shows an example of a simple domain ontology which relates to the domain of restaurants in Cambridge, for the task of restaurant search and reservation;

FIG. 5 shows accuracy of example machine learning based classifiers (upper figure) compared to trackers based on keyword spotting (lower figure);

FIG. 6(c) shows an illustration of an example method of feature extraction which is used in a dialogue method according to an embodiment;

FIGS. 10(a) and 10(b) show example dialogue turn information including annotations and templates;

FIG. 15 shows an example dialogue;

DETAILED DESCRIPTION

Figure 1:
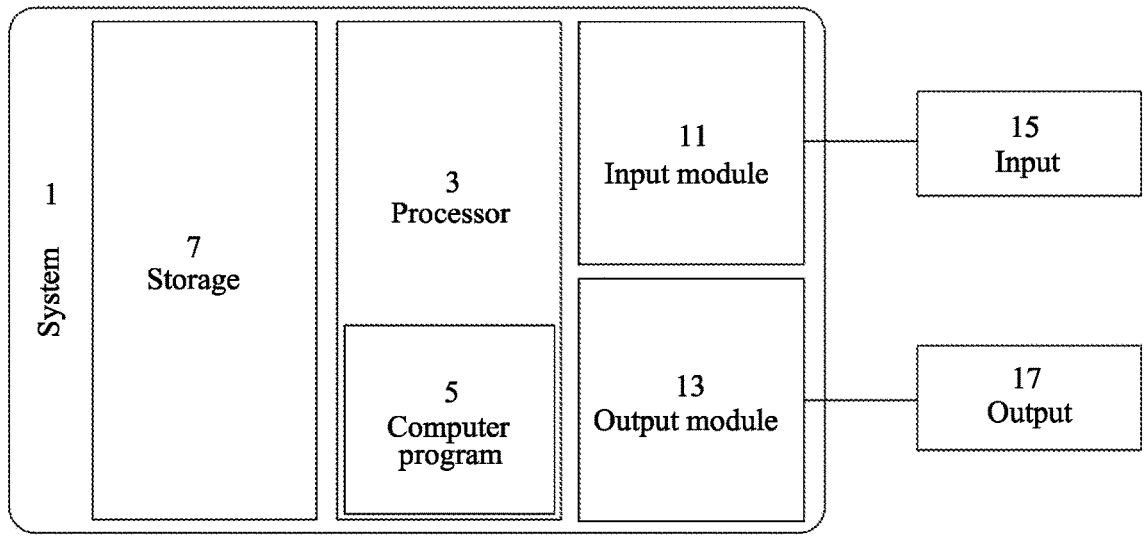
FIG. 1 shows a schematic illustration of a dialogue system in accordance with an embodiment.

According to an embodiment, there is provided a dialogue system comprising:
an input for receiving input data relating to a speech or text signal originating from a user;
an output for outputting speech or text information specified by a dialogue act; and
a processor configured to:
  generate features from the input signal;
  for each of a plurality of classifier models, each classifier model corresponding to a dialogue slot, and for one or more values corresponding to the dialogue slot, input features generated from the input signal, the classifier models outputting a probability corresponding to each of three or more relations, wherein the relations specify the relation of the value to the dialogue slot;
  update a belief state based on the outputs of the classifier models;
  determine a system dialogue act by inputting information relating to the belief state into a policy model;
  output speech or text information specified by the determined dialogue act at the output.

The disclosed system provides an improvement to computer functionality by allowing computer performance of a function not previously performed by a computer. Specifically, the disclosed system provides for processing of an input dialogue signal to recognise relationships between information, referred to as values, expressed by the user and the corresponding dialogue subjects, referred to as slots, in complex utterances. The system achieves this by providing a plurality of multi-way classifier models, each corresponding to a dialogue slot. The classifier models are run for each corresponding value, taking as input features corresponding to the input dialogue signal. Using a plurality of multi-way classifiers enables the relation of the value to the dialogue slot to be determined. By processing input dialogue signals to recognise these relationships, user intents and goals can be modelled for complex utterances, and suitable responses can be generated.

The disclosed system also addresses a technical problem tied to computer technology and arising in the realm of computer networks, namely the technical problem of resource utilization. The disclosed system solves this technical problem by providing a plurality of multi-way classifier models (for example three-way classification models) each corresponding to a dialogue slot. For each dialogue turn, each classification model may be run multiple times, once for each value corresponding to the dialogue slot in the domain ontology. For each run, a different value is taken as input. Thus multiple slot-specific classifiers are re-used for each value corresponding to the slot, instead of storing one large classifier for example. The parameters of the classifier models, stored in the non-volatile memory or storage, are therefore "re-used" for each value. Furthermore, the multiple slot-specific classifiers use a number of stored parameters which are shared between the classifiers, including the vector representations for the words and for the generic tags. Thus one set of parameters, comprising the vector representations for the words and for the generic tags, stored in the non-volatile memory of storage, are shared by multiple classifiers, resulting in further reduced memory requirement.

The classification model corresponding to a particular dialogue slot may be used for any domain where the ontology comprises that slot, without needing to re-train the classification model for that particular domain. Similarly, a classifier may be trained on data from multiple domains, since this modularisation enables the model to make per slot-value decisions. The model comprises a distributed architecture, comprising a plurality of slot specific classifiers, implemented separately for each value, that operate independently of each other. The slot specific trackers can be reused in other domains, enabling data sharing.

The disclosed system also provides an improvement in the technical field of dialogue systems, by solving the problem of efficient dialogue resolution in a goal-oriented dialogue system. Goal-oriented dialogue systems search and interact with large databases which contain information about a dialogue domain. The disclosed system provides for processing of an input dialogue signal to recognise relationships between values expressed by the user and the corresponding slots in complex utterances. The machine learning based classifiers provide accurate classification, and allow user intents and goals to be modelled for complex utterances, meaning that the user goal may be reached more quickly, and the database accessed a reduced number of times.

In an embodiment, generating features from the input signal comprises generating features for a slot and value combination, comprising:

converting the input signal to vector representations, replacing all instances of the slot and of the value with a slot vector representation and a value vector representation;
  inputting the vector representations to a first trained model, configured to output features;
  wherein for the classifier model corresponding to the slot, the features generated for the slot and value combination are inputted to the classifier model for the value, the classifier model outputting a probability that each relation specifies the relation of the value to the slot.

Generating features from the input signal may further comprise converting the input signal to vector representations and inputting the vector representations to the first trained model. Features representing the value may also be inputted to the classifier model.

In an embodiment, the processor is further configured to:

generate features from the previous dialogue system output or the previous system dialogue act, wherein features generated from the previous dialogue system output or the previous system dialogue act are inputted to the classifier models.

Generating features from the previous dialogue system output or system dialogue act may comprise generating features for a slot and value combination, comprising:

converting the previous dialogue system output or system dialogue act to vector representations, replacing all instances of the slot and of the value with a slot vector representation and a value vector representation;
  inputting the vector representations to the first trained model;
  wherein for the classifier model corresponding to the slot, the features generated for the slot and value combination are inputted to the classifier model for the value, the classifier model outputting a probability that each relation specifies the relation of the value to the slot.

In an embodiment, generating features from the previous dialogue system output or system dialogue act further comprises converting the previous dialogue system output or system dialogue act to vector representations and inputting the vector representations to the first trained model.

The first trained model may comprise one or more convolutional layers.

In an embodiment, a stored set of possible phrasings for one or more slots and values is used to determine the instances of the slots and of the values.

For one or more classifier models, the plurality of relations may comprise: an affirmative relation, a negative relation, and a not mentioned relation. For one or more of the classifier models, the plurality of relations may comprise: a greater than relation, a less than relation, and a not mentioned relation.

In an embodiment, the belief state comprises information corresponding to one or more dialogue options, each dialogue option comprising a slot, a corresponding slot value, and a relation. Determining a dialogue act comprises applying one or more rules to world state information, the world state comprising information relating to the dialogue.

This provides an improvement to computer functionality by allowing computer performance of a function not previously performed by a computer. Specifically, the disclosed system provides for the retrieval of suitable responses without the need to pre-specify the possible conversational pathways. The system achieves this by storing world state information, relating to the dialogue, and applying rules to the world state information to determine the responses. The rules are organised in two or more ordered stages and within the stages, the rules may be applied simultaneously or in any order. Furthermore, this addresses a technical problem tied to computer technology and arising in the realm of computer networks, namely the technical problem of resource utilization. The disclosed system solves this technical problem by applying rules to stored world state information, rather than using pre-specified conversational pathways or states. The system is not required to store information specifying possible conversational pathways or states, or to track the state and pathway of the dialogue and update the state and pathway of the dialogue for each dialogue turn. Rather, the system applies a single set of rules for each dialogue turn.

The world state stores information relating to the dialogue. For example, the world state stores information from current and previous belief states, as well as external information. The world state may further store information relating to current and previous selected dialogue acts. As well as determining the dialogue acts, the rules may also control entry and removal of information into the world state. By conditioning the rules on the world state, rather than just on the belief state for example, it is possible to take contextual information into account when selecting output dialogue acts (for example whether the current belief state and the previous belief state match).

In an embodiment, one or more one or more further rules may be applied to belief state information. A dialogue acts may be determined by applying a rule or rules to belief state information. Some dialogue acts may be determined by rules applied to belief state information, whereas other dialogue acts may be determined by rules applied to world state information.

In an embodiment, one of the stages is a first update stage, in which the rules control updating of the world state information based on the belief state information and/or any other information extracted from the input user utterance.

In an embodiment, another of the stages is a second update stage, in which the rules control updating of the world state information based on external information. The first update stage may be performed before the second update stage. In this way, the external information is obtained based on the up to date belief state information.

In an embodiment, one of the stages is an act selection stage, in which the rules determine a dialogue act. The act selection stage may be performed after any update stage or stages. In this way, the act selection is made based on up to date information.

One or more of the stages may comprise two or more rules. Rules may comprise a condition relating to the world state information and/or belief state information. If the condition is met, the world state information is updated, or a particular dialogue act is selected for example.

If two or more dialogue acts are selected, the output speech or text information may be specified by the two or more dialogue acts. Alternatively, the dialogue act or acts with the highest importance score are selected, such that the output speech or text information is specified by the dialogue act or acts with the highest importance score.

In an embodiment, one or more first rules comprise a condition that if a required slot is not set in the belief state information, the dialogue act comprises a request for the slot value. There may be a plurality of required slots, each corresponding to a rule comprising a condition that if the required slot is not set, the dialogue act comprises a request for the slot value. This is an example of a dialogue act determined by applying a rule or rules to belief state information.

In an embodiment, a second rule comprises a condition that if one or more of the required slots are set in the belief state information, the world state is updated based on the belief state information. The second rule may require that all of the required slots are set in the belief state information.

In an embodiment, the world state comprises information relating to the current belief state and information relating to the previous belief state. The world state may further comprise external information for example such as the outcome of a third party action.

In an embodiment, a third rule comprises a condition that if the information in the world state relating to the current belief state and the information in the world state relating to the previous belief state do not match, the dialogue act comprises a confirmation. This is an example of a dialogue act determined by applying a rule or rules to world state information.

In an embodiment, a fourth rule comprises a condition that if the information in the world state relating to the current belief state and the information in the world state relating to the previous belief state match, a third party action is taken and the world state information is updated based on the outcome of the third party action. The third party action may be a booking action.

According to an embodiment, there is provided a dialogue method, comprising:
  receiving input data relating to a speech or text signal originating from a user;
  generating features from the input signal;
  for each of a plurality of classifier models, each classifier model corresponding to a dialogue slot, and for one or more values corresponding to the dialogue slot, inputting features generated from the input signal, the classifier models outputting a probability corresponding to each of three or more relations, wherein the relations specify the relation of the value to the dialogue slot;
  updating a belief state based on the outputs of the classifier models;
  determining a system dialogue act by inputting information relating to the belief state into a policy model;
  outputting speech or text information specified by the determined dialogue act.

The belief state comprises information corresponding to one or more dialogue options, each dialogue option comprising a slot, a corresponding slot value and a relation. Determining a dialogue act, comprises applying one or more rules to world state information, the world state comprising information relating to the dialogue.

According to an embodiment, there is provided a method of training a dialogue system, using training data comprising user speech or text signals, and labels for each signal, the labels comprising information relating to dialogue slots, values and relations, wherein the relations specify the relation of the values to the dialogue slots, the method comprising:
  generating features from the signals;
  for each of a plurality of classifier models, each classifier model corresponding to a dialogue slot, and for one or more values corresponding to the dialogue slot, inputting features generated from the input signal, the classifier model outputting a probability corresponding to each of three or more relations;
  updating the classifier model parameters.

Generating features from the input signal may comprise generating features for a slot and value combination, comprising:

converting the input signal to vector representations, replacing all instances of the slot and of the value with a slot vector representation and a value vector representation;

inputting the vector representations to a first model, configured to output features;

wherein for the classifier model corresponding to the slot, the features generated for the slot and value combination are inputted to the classifier model for the value, the classifier model outputting a probability that each relation specifies the relation of the value to the slot;

wherein the method further comprises updating the vector representations and the first model parameters.

In an embodiment vector representations corresponding to a plurality of words in the training data, including slots and values, are used, wherein one or more values corresponds to an exclusive vector representation and other words may correspond to the same vector representation.

In an embodiment, the method further comprises generating features from previous dialogue system speech or text signals or system dialogue acts in the training data, wherein features generated from the previous dialogue system signals or system dialogue act are inputted to the classifier models.

The belief state comprises information corresponding to one or more dialogue options, each dialogue option comprising a slot, a corresponding slot value and a relation. Determining a dialogue act, comprises applying one or more rules to world state information, the world state comprising information relating to the dialogue.

According to an embodiment, there is provided a dialogue system, trained according to any of the above methods.

According to an embodiment, there is provided a system for generating data for training a dialogue system, comprising:

an input for receiving input data relating to a speech or text signal originating from a user;

an output for outputting information relating to a dialogue act;

a processor configured to:
obtain domain information comprising information identifying a plurality of dialogue slots and values, wherein each dialogue slot may take on one or more of the values;

generate a plurality of dialogue scenarios from the domain information, each dialogue scenario comprising one or more combinations of dialogue slots and values;

generate one or more dialogue sequences corresponding to each dialogue scenario, each dialogue sequence comprising one or more dialogue acts;

sub-sample the dialogue sequences to generate a sub-set of dialogue sequences;

output information specified by the dialogue acts;

receive data comprising speech or text signals corresponding to paraphrased versions of the sub-set of dialogue sequences.

The disclosed system provides an improvement to computer functionality by allowing computer performance of a function not previously performed by a computer. Specifically, the disclosed system provides for generation of automatically labelled training data. The system achieves this by generating training labels, or dialogue sequences, prior to collection of data.

The disclosed system further addresses a technical problem tied to computer technology and arising in the realm of computer networks, namely the technical problem of inefficient resource utilization. The disclosed system solves this technical problem by sub-sampling of dialogue sequences, generating a reduced but targeted data-set. Model training is then performed using the reduced training data set. By providing a reduced set of training data, whilst still retaining desired coverage, training of a dialogue system model may be performed more quickly. Furthermore, the training data itself may be stored using reduced memory.

In an embodiment, outputting information comprises presenting information specified by at least a part of the dialogue sequence to a user, wherein the user inputs speech or text data corresponding to the at least a part of the dialogue sequence.

In an embodiment, a user is presented with a turn in the dialogue sequence and information regarding the previous turn in the dialogue sequence.

The output information may comprise information requesting the user to identify the words in the inputted speech or text data corresponding to the values in the dialogue sequence.

The processor may be further configured to convert the dialogue sequence into a dialogue outline, wherein the dialogue outline comprises template utterances, wherein sub-sampling the dialogue sequences comprises sub-sampling the dialogue outlines, and wherein the output information comprises at least a part of the dialogue outline.

In an embodiment, generating one or more dialogue sequences comprises determining a dialogue act, wherein a dialogue act is determined by applying one or more rules to world state information, the world state comprising information relating to the dialogue.

According to an embodiment, there is provided a method of generating data for training a dialogue system, comprising:

obtaining domain information comprising information identifying a plurality of dialogue slots and values, each dialogue slot corresponding to a subject that a speech or text signal may relate to, wherein each dialogue slot may take on one or more of the values;

generating a plurality of dialogue scenarios from the domain information, each dialogue scenario comprising one or more combinations of dialogue slots and values;

generating one or more dialogue sequences corresponding to each dialogue scenario, each dialogue sequence comprising one or more dialogue acts;

sub-sampling the dialogue sequences to generate a sub-set of dialogue sequences;

outputting information specified by the dialogue acts;

receiving data comprising speech or text signals corresponding to paraphrased versions of the sub-set of dialogue sequences.

The methods are computer-implemented methods. Since some methods in accordance with embodiments can be implemented by software, some embodiments encompass computer code provided to a general purpose computer on any suitable carrier medium. The carrier medium can comprise any storage medium such as a floppy disk, a CD ROM, a magnetic device or a programmable memory device, or any transient medium such as any signal e.g. an electrical, optical or microwave signal. The carrier medium may comprise a non-transitory computer readable storage medium.

According to an embodiment, there is provided a carrier medium comprising computer readable code configured to cause a computer to perform any of the above methods.

FIG. 1 shows a schematic illustration of a dialogue system 1 in accordance with an embodiment.

The system 1 comprises a processor 3, and takes an input speech signal or text signal and outputs a speech or text signal. A computer program 5 is stored in non-volatile memory. The non-volatile memory is accessed by the processor 3 and the stored code is retrieved and executed by the processor 3. The processor 3 may comprise logic circuitry that responds to and processes the instructions in the stored code. The storage 7 stores data that is used by the program 5.

The system 1 further comprises an input module 11 and an output module 13. The input module 11 is connected to an input 15 for receiving the signal. The input 15 may be a receiver for receiving data from an external storage medium or a network. Alternatively, the input 15 may comprise hardware such as a microphone or keyboard. Connected to the output module 13 is output 17. The output 17 may comprise hardware, such as a speaker or screen. Alternatively, the output may be a transmitter for transmitting data to an external storage medium or a network.

The system may comprise means of communication with third-party services. For example, the system may be configured to communicate with a restaurant system when attempting to finalise a restaurant booking process (to check availability for a particular date, time, and number of people for example). The means may comprise a connection to a communication network for example.

In an embodiment, the system 1 may be located in a common system with hardware such as a microphone, keyboard and/or speaker for inputting and outputting signals. Alternatively, the system 1 may be a remote system 1, which receives data regarding the input signal transmitted from another unit, and transmits data regarding the output signal to the same or a different unit. For example, the system may be implemented on a cloud computing system, which receives and transmits data. Although in the described system, a single processor 3 located in a device is used, the system may comprise two or more remotely located processors configured to perform different parts of the processing and transmit data between them.

In use, the system 1 receives data corresponding to the input signal through data input 15. The program 5, executed on processor 3, outputs data corresponding to the output signal through the output 17 in the manner which will be described with reference to the following figures.

Figure 2A:
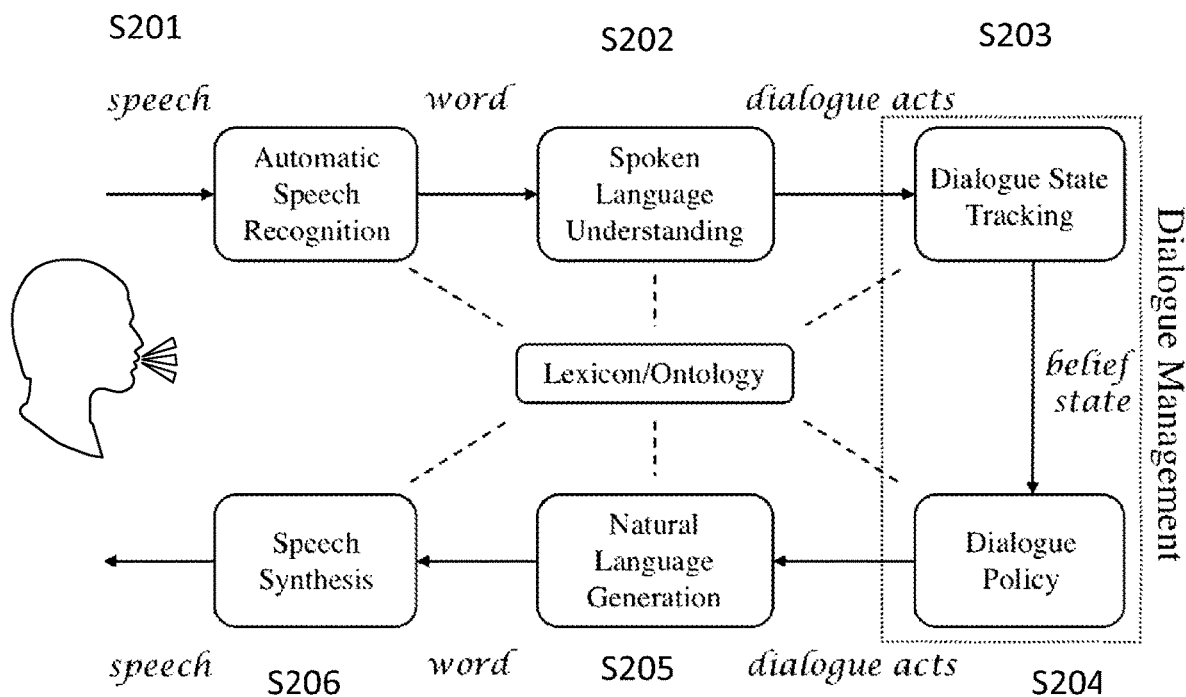
FIG. 2(a) shows a schematic illustration of a dialogue method in accordance with an embodiment, in which a dialogue system interacts with a human user.

FIG. 2(a) shows a schematic illustration of a dialogue method in accordance with an embodiment, in which a dialogue system interacts with a human user. The figure shows a modular architecture of a goal-oriented spoken dialogue system. The method comprises a number of stages or modules. These stages will be discussed briefly in relation to this figure to give an overview of the entire system operation, and then the stages are described in further detail in relation to the further figures below. Each step S201 to S206 can be considered to be a separate module.

The dialogue system is a goal-oriented dialogue system. The term goal-oriented may be used interchangeably with the term task-oriented. Goal-oriented dialogue systems search and interact with large databases which contain information about a specific dialogue domain. The goal-oriented dialogue system helps the user achieve their goals (i.e. accomplish tasks) within the particular dialogue domain. Examples of such tasks and domains are 1) restaurant search and reservation in a particular location, 2) flight bookings, 3) tourist information, 4) laptop shopping, and 5) train ticket sales, amongst others.

Each dialogue domain is defined by a domain ontology. The domain ontology comprises information which can be used to model the user goal expressed up to a given point of the conversation. This point of the conversation is referred to as dialogue state. The domain ontology comprises one or more slots. Each dialogue slot corresponds to a subject that a speech or text signal may relate to. The dialogue slots may have one or more corresponding values. The dialogue slot may take on one or more of the values.

The dialogue states are defined by the domain-specific ontology. A dialogue state represents the constraints the users can express using a collection of one or more slots (e.g. "price range" or "food") and their slot values (e.g. "cheap", "moderate", "expensive", or "Thai", "Chinese", "British", "European", "American" for the two aforementioned slots).

An example of a simple domain ontology which relates to the domain of restaurants in Cambridge, for the task of restaurant search and reservation is provided in FIG. 2(b). In this example ontology, there are a plurality of informable slots. The informable slots comprise: "price range", "area", "food", and "name". Each informable slot may take on one or more values. For the "price range" slot, the values are "cheap", "moderate", and "expensive" for example. For the "food" slot, the values are "Afghan", "African", "Afternoon tea", . . . . The informable slots represent attributes which the user can use to constrain the search for an entity in the database (e.g. the food slot is used to constrain the search for a restaurant in a database of restaurants), and have corresponding values (e.g. Afghan). The ontology may further comprise a set of requestable slots. The set of requestable slots are slots which do not have corresponding values, such as the slots "postcode", "address", "signature", . . . . The requestable slots represent attributes relating to the entities in the database which the users can ask about, but not use as search constraints.

Thus a dialogue system for restaurant search and reservation using the ontology should help the users to find and book a restaurant according to their personal taste and wishes: for example the system should book a place with cheap Thai food in central Cambridge, or a cheap Chinese place in North Cambridge if the user makes inquiries about such places.

In use, the system receives an audio input from a human user. The audio input may be received through a microphone located remotely from the system, and the audio signal transmitted to the dialogue system for example. Each audio input corresponds to a turn in the dialogue. A dialogue turn is a conversational unit within turn-taking dialogues, which comprises the previous system utterance and the current user utterance.

In S201, an automatic speech recognition (ASR) step is performed, to generate a text signal from the audio input. The generated text signal may be referred to as a text hypothesis. Any method of ASR may be used in this step. For example, a trained speech recognition algorithm based on a neural network or Hidden Markov Model may be used. ASR models may assign posterior probabilities to words in an utterance given the input acoustic signal. The ASR output may take the form of an N-best list, which approximates the full posterior distributions over the ASR hypotheses by returning the top N most probable hypotheses with their respective probabilities. Alternatively, word lattices or word confusion networks may be used. In an embodiment, only the top scoring ASR hypothesis is output from S201 and used in the subsequent steps.

Although a method in which an audio input is received is discussed here, alternatively the user may directly input a text signal (rather than speaking). In this case, the speech recognition step S201 may be omitted.

In S202, a spoken language understanding step is performed. This gives a "turn-level" prediction. Although the term "spoken" language is used, as explained above, the input signal may be a text signal. A dialogue state tracking stage is performed in S203, which generates an updated belief state. The belief state comprises the system estimate of dialogue state information. The spoken language step and dialogue state tracking step together form a natural language understanding (NLU) stage.

A dialogue management step is then performed in S204, in which a system dialogue act is determined. In S205, a natural language generation step is performed to generate a textual response based on the system act.

In S206, text to speech generation is performed to generate a speech signal, which is then output to the user as an audio signal. Any type of text to speech generation process may be used in this step. This step may alternatively be omitted, and the text signal output directly to the user, on a screen for example.

Omitting steps S201 and/or S206 means that the system operates with text only, removing the need for speech-to-text and text-to-speech modules. Operating with text can allow hearing impaired and mute people to use the system for example. The system may be configured to work with both text and audio signals, where S201 and S206 are included or omitted for each input signal as required.

The dialogue system may perform tasks across many applications and dialogue domains, as will be explained in more detail below. The dialogue system may also operate in a wide array of languages.

Figure 3:
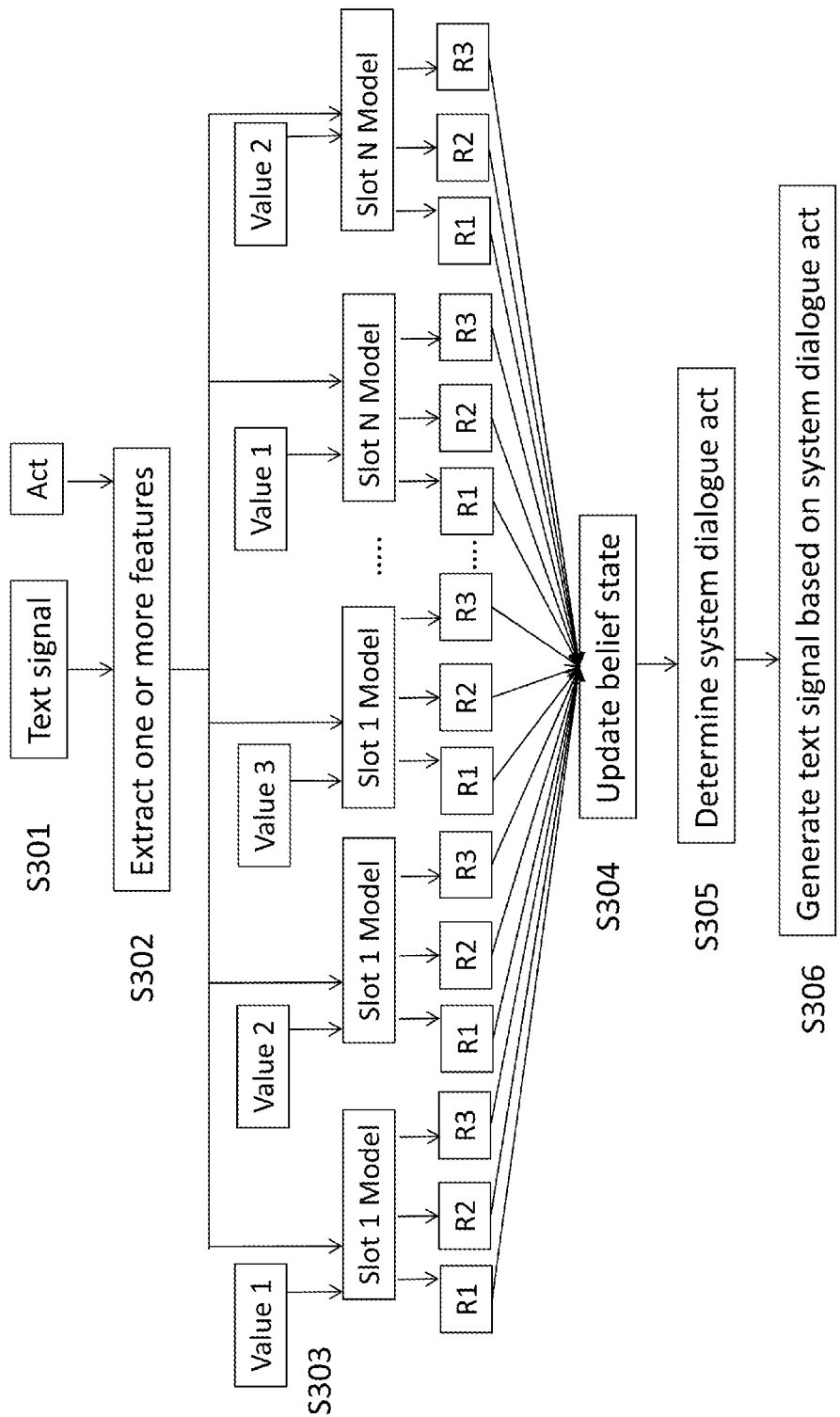
FIG. 3 shows a flow chart illustrating the processing stages included in a dialogue method according to an embodiment.

FIG. 3 shows a flow chart illustrating the processing stages included in a dialogue method according to an embodiment. The method is performed by a dialogue system in accordance with an embodiment. The dialogue system may be a statistical goal-oriented dialogue system.

In this method, at each dialogue turn, an input user utterance (spoken or text) is received. If the input is spoken, the utterance is converted to text using ASR. The input text signal (either that input directly or that generated from a spoken input) is shown in S301. In steps S302 and S303, a spoken language understanding (SLU) process is performed to extract turn-level user goals, which are then incorporated into a belief state in the subsequent step S304, in which dialogue state tracking is performed. The belief state is then used by the dialogue manager to choose an appropriate system response in S305.

The SLU process may be a machine learning-based process which is pre-trained on data. A data generation process according to an embodiment and a training process according to an embodiment will be explained in further detail below. The NLU process may be based on a delexicalised dialogue state tracking framework. In S303, classifier models extract turn-level user goals, which are then incorporated into the belief state in S304. The SLU modules use dexicalised features. The belief state comprises a probability distribution over one or more possible dialogue options, each dialogue option comprising a slot, value and relation combination, each combination having a corresponding probability.

The method will now be described in detail. In step S301, a text signal is inputted. The text corresponds to a turn in a dialogue. As described above, the text signal may be generated from an input audio signal using ASR. Alternatively, it may be directly inputted by the user. The input signal may be "I would like Chinese or Greek food" for example.

Figure 6A:
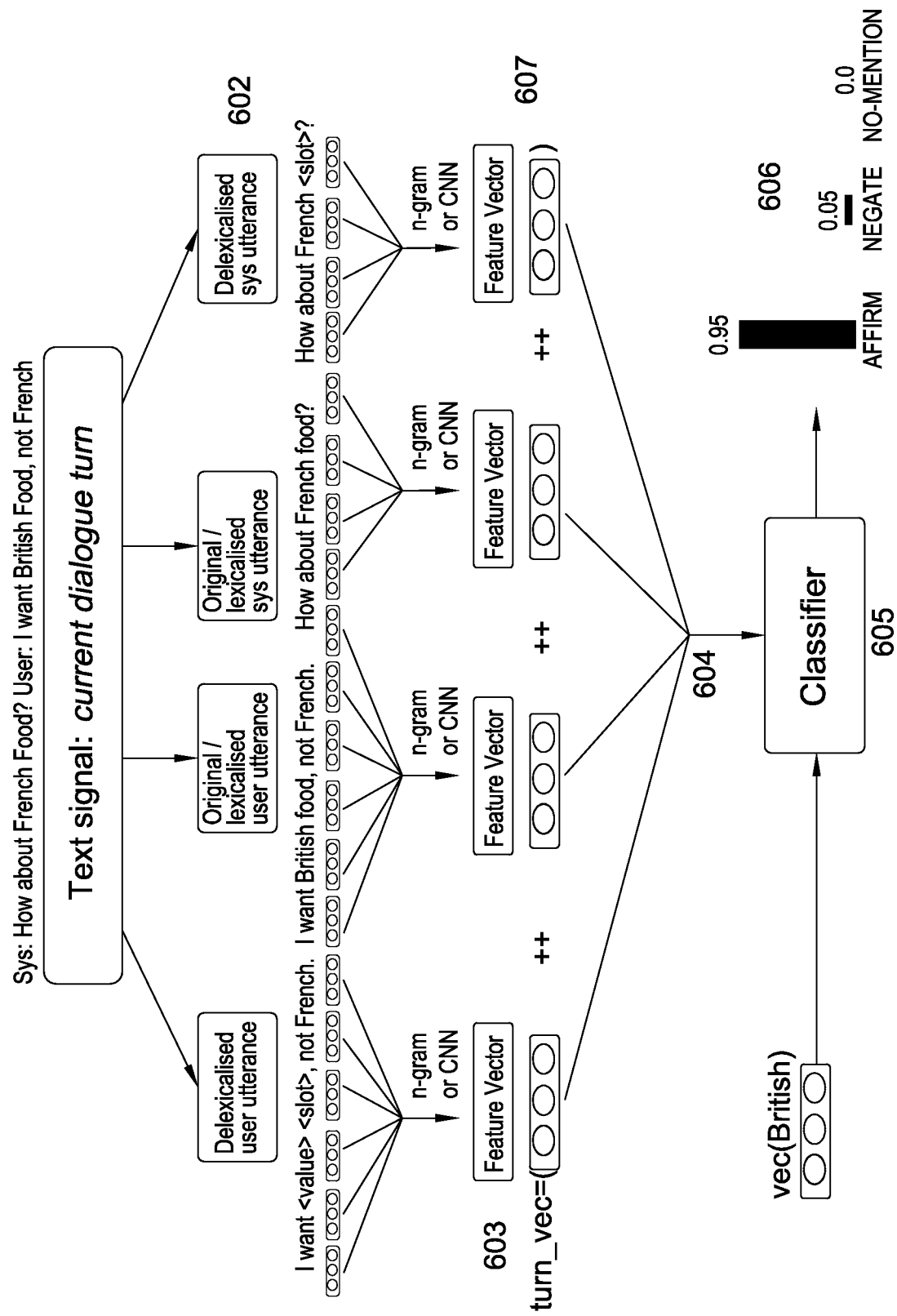
FIG. 6(a) shows a flow chart of a method performed in accordance with an embodiment for a single slot-value combination for an example dialogue turn.

In step S302, one or more features are extracted from the text signal and from the previous system text output from S205. FIG. 6(a) shows a flow chart of the method performed (for a single slot-value combination) for an example dialogue turn in S302 and S303 in more detail (where steps 602 to 604 in FIG. 6(a) correspond to S302). In the example, the previous system act is "How about French food?" and the user input utterance is "I want British food, not French".

In an embodiment, instead of the text signal corresponding to the previous system output, the system dialogue act outputted from the policy model in S204 (i.e. prior to conversion into natural language in S205), may be taken as the input. The system dialogue act is processed in the same manner as described below in relation to the text signal corresponding to the previous system act.

In the first step 602, a delexicalisation process is performed, whereby slots and values mentioned in the text are replaced with a generic label <SLOT> or <VALUE>, for each slot and value combination in the ontology. For example, for the statement "I want British food, not French", for the slot and value combination "Food" and "British", this statement will be replaced by "I want <VALUE><SLOT>, not French" (where "food" was replaced by <SLOT> and 'British" by <VALUE>). For the combination of the value "French" and slot "Food", the statement will be replaced by "I want British <SLOT>, not <VALUE>" (where "food" was replaced by <SLOT> and "French" by <VALUE>). For all other values corresponding to the slot "food", (e.g. Italian), the delexicalised utterance will be: "I want British <SLOT>, not French". For all other slots and values (e.g. slot Area), the delexicalised utterance will be: "I want British food, not French" (i.e. the same as the original lexicalised utterance).

Thus for a specific slot and value combination, the input utterance is processed to replace any mention of the specific slot or value with the generic place holder. This is repeated for each slot value combination in the ontology information, such that an utterance is produced corresponding to each slot and value combination in the ontology. The same process is performed for the previous system act. FIG. 6(a) shows the delexicalised user utterance and system utterance for the slot value combination "food" and "British" in 602. A corresponding figure for each slot value combination in the ontology (including "French" and "food") could also be drawn.

In an embodiment, one or more semantic dictionaries may be used in this delexicalisation process. Semantic dictionaries comprise lists or sets of potential re-phrasings for slots and/or values in the domain ontology. The semantic dictionaries may be manually constructed, i.e. pre-compiled (before data collection and training) and hand-crafted for example. Alternatively, the semantic dictionary may be automatically constructed during the data generation stage using concept highlighting, as will be described in further detail below. Automatically obtaining a comprehensive list of synonyms to use as a semantic dictionary may provide particular benefit for larger domains for example.

Semantic dictionaries help to account for semantic variability in user's language. They provide a list of different re-phrasings for the same value and/or slot (e.g., the value "north" can be expressed as "in the north", "somewhere north", "in the northern part of town", ... ). Thus words that correspond to a rephrasing of a slot or value may also be extracted and replaced with the generic label for the slot or value in 602, for example, "somewhere North" is replaced with <VALUE>.

Using delexicalisation (i.e. replacement of slots and values with generic labels) may allow a machine learning based model to have good performance even for states which have not been seen in training or for which there are limited training examples. For example, there may be many examples of "I want Chinese food" and "I want Thai food" in the training data, which when delexicalised become "I want <VALUE><SLOT>". During implementation, the user may input the utterance: "I want Eritrean food". Since "Eritrean" exists in the ontology, the value "Eritrean" is recognised in the delexicalisation process, and the delexicalised utterance "I want <VALUE><FOOD>" is generated. This is the same as the delexicalised utterance for training examples relating to other values, and therefore good performance may be expected, even though no training example corresponding to Eritrean was used.

The semantic dictionary may also contribute to the performance in such cases, by accounting for semantic variability, and thus meaning more conformity in the delexicalised utterances between the training data and the user inputs.

Thus in the delexicalisation step 601, a step of recognising the slots and/or values in the input utterance and system act, optionally using a semantic dictionary to account for re-phrasings, is performed. These are replaced with generic placeholders. Delexicalised utterances and system outputs are generated in this manner, for each slot and value combination in the ontology.

Both the delexicalised versions of the utterance and system output, and the original utterances and system outputs are then transformed into vector representations. This is shown as step S603 in FIG. 6(*a*). Each lexical item (i.e. each word) and each generic tag (<slot> and <value>) having a stored corresponding vector representation (also referred to as an embedding) is replaced by the vector representation. If a word does not have a corresponding stored vector representation (meaning the word was not present in the training data or in the domain ontology), the word is simply skipped, and the vector representations are generated without the word. The vector representations are learned during the training stage, as described below.

Thus each of the actual values (e.g., "Indian"), and the generic tag ("<value>") have a stored d-dimensional vector. Similarly, each of the actual slots, and the generic tag <slot> have a stored d-dimensional vector. Furthermore, each additional word in the training data has a corresponding stored d-dimensional vector representation. One or more words may correspond to the same vector representation, as will be described in more detail in relation to the training stage below. In an embodiment, each vector is a 100-dimensional vector. Thus for one dialogue turn, for each slot value combination, four sets of vectors are generated, as shown in 602 (each set corresponding to one of the lexicalised system output, lexicalised input utterance, delexicalised system output and delexicalised utterance).

Although in this example, the representations of both the delexicalised utterance and system output plus the original lexicalised utterance and system output are used, alternatively only the delexicalised versions may be used (and the representations of the original utterance and output may be omitted). Using the lexicalised utterances as well may provide more information however and therefore better performance, for example, where the term "somewhere North" has been replaced with the tag <VALUE> in the delexicalised utterance, the term "somewhere" is retained in the lexicalised utterance.

In 603, a single feature vector representation of the whole lexicalised user utterance is then generated from the set of vector representations corresponding to the lexicalised user utterance. Similarly, a feature vector for each of the delexicalised utterance, system output, and delexicalised system output is generated. This is done for each slot-value combination, such that four separate feature vectors are generated for each slot value combination (two for the case where the lexicalised versions are omitted). A convolutional neural network may be used in this step, in order to generate a single fixed length feature vector from the input set of vector representations. Alternatively, an n-gram approach may be used, for example using unigrams, bigrams and trigrams (3-grams), as described below.

Figure 6B:
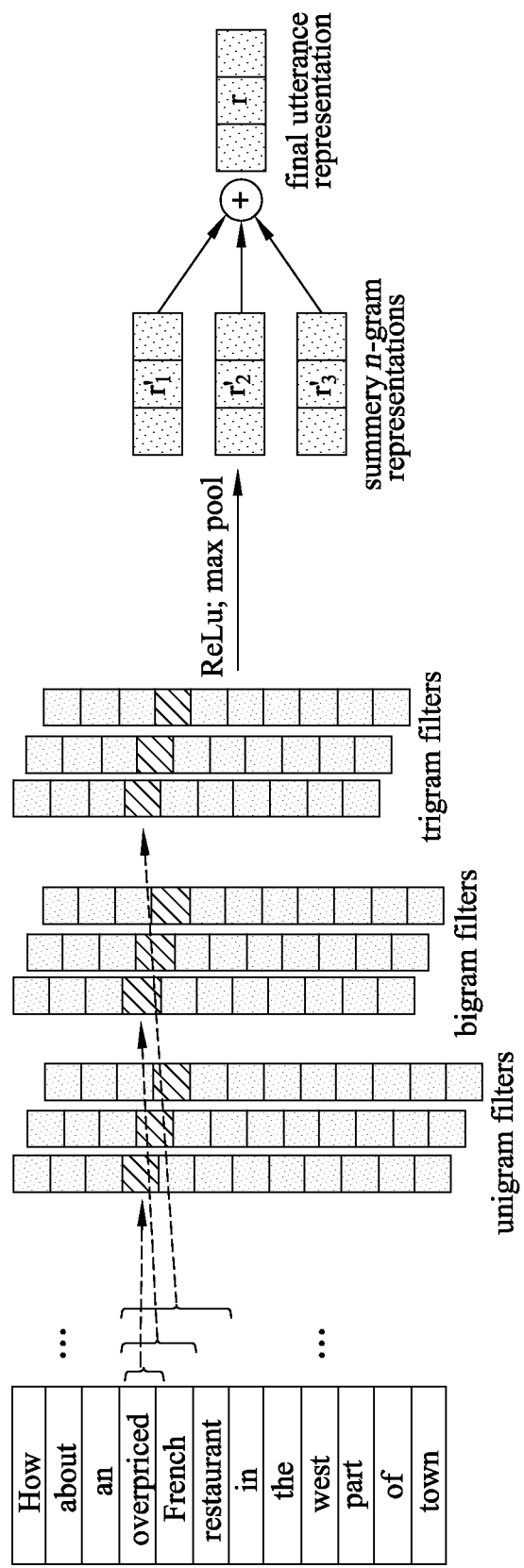
FIG. 6(b) shows an illustration of an example n-gram approach using convolutional neural networks to generate feature vectors which is used in a dialogue method according to an embodiment.
Figure 6D:
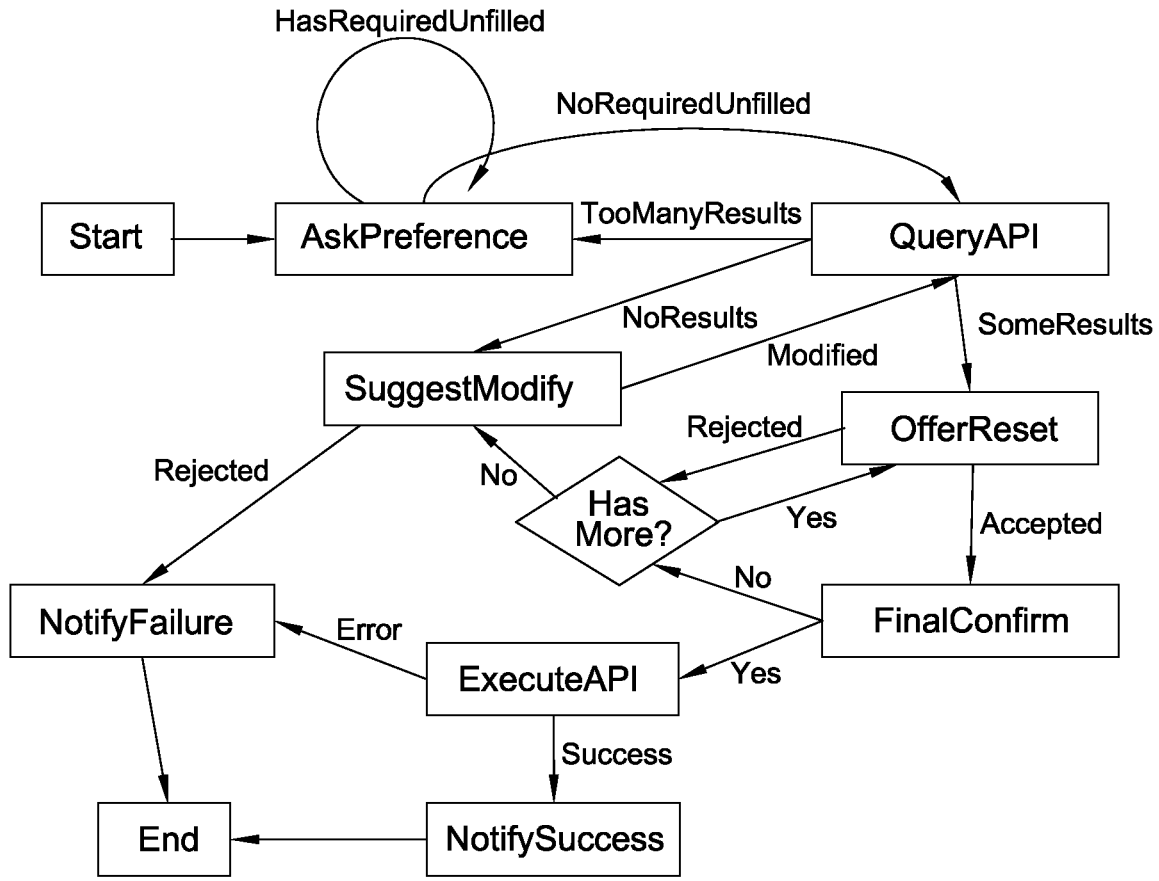
FIG. 6(d) shows an example of a policy model which is used in a dialogue method according to an embodiment.

In an embodiment, an n-gram approach using convolutional neural networks (CNNs) may be used as illustrated in FIG. 6(*b*) for this step. In the 3-gram case, L convolutional filters of window sizes 1, 2, and 3 are applied to the sequence of vector representations of the utterance. The same process is performed to the sequence of vectors corresponding to each of the system output, and the delexicalised utterance and delexicalised system output.

In the diagram, for simplification purposes, L=3. In other words, three filters of window size 1 are applied (unigram), three filters of window size 2 are applied (bigram) and three filters of window size 3 are applied (trigram). In an embodiment however, L=100, in which case 100 filters of window size 1 are applied, 100 filters of window size 2 are applied and 100 filters of window size 3 are applied. In an embodiment, L=300.

The convolutions are followed by an activation function, for example a rectifier, i.e. a rectified linear unit (ReLU) activation function. The convolutional layer may be followed by a max-pooling layer. Each produces a summary n-gram representation, i.e. a vector of real values. These are summed to obtain the feature vector.

In this step 603, the set of vector representations for the utterance is inputted into three separate CNNs (unigram, bigram and trigram). Each CNN comprises a single convolutional layer with 3 filters (in the example). Each CNN also comprises a max pooling layer. The output of each CNN is summed to give an output vector. This is repeated for the delexicalised utterance, system output and delexicalised system output vector representations, such that four feature vectors are produced for the slot-value combination (only two being generated where the lexicalised versions are not included). In an embodiment, each feature vector has a length of 100.

FIG. 6(*c*) shows an illustration of this feature extraction. An ASR N-best list of length 2 is used to extract lexical and delexicalised n-gram features for n=1, 2, 3. Delexicalised feature vectors are value-specific and different for each slot value that appears in the text signal. In this example, two food values are featured: Serbian and Siberian (often confused by ASR systems). In this case, the same delexicalised features are active for both values.

A final feature vector is then generated in 604, by a concatenation of the lexicalised and delexicalised utterance feature vectors and the lexicalised and delexicalised system output feature vectors. In the example where each feature vector has a length 100, this final feature vector thus has a length of 400. In this step, the previous dialogue output and input user utterance are converted into a single fixed length feature vector. This is the output of S302 in FIG. 3.

S302 thus outputs a single fixed length feature vector corresponding to the input user text signal and previous system output. An example method of generating such a feature vector was described in relation to FIG. 6(*a*), however various methods may alternatively be used.

In S303, classification models are implemented. This is also shown in 605 of FIG. 6(*a*). The system stores a number of classification models, or classifiers. Each classification model corresponds to a different dialogue slot in the domain ontology. Each classification model takes as input the vector representation of a value corresponding to the dialogue slot, and the feature vector extracted from the input signal and previous system output in S302 for the slot and value combination. The classification model is thus implemented on top of the learned feature representation of the dialogue turn.

For each dialogue turn, each classification model may be run multiple times, once for each value corresponding to the dialogue slot in the domain ontology. For each run, a different value is taken as input, together with the feature representation corresponding to the slot and value. Thus for an input signal, i.e. a turn in the dialogue, each classification model is run one or more times, the number of times depending on the number of values corresponding to the dialogue slot in the domain ontology, with a different input each run. Each time the classification model is run, the feature vector extracted from the dialogue turn for the slot and a value and the vector representation corresponding to the value are concatenated, and the resulting vector inputted. The vector representation of the value may comprise the d-dimensional stored vector representation described in relation to S302 above.

Each classification model outputs a probability value corresponding to each of three or more relations, i.e. multi-way classification is performed. A relation specifies the relation of a value to a dialogue slot. For example, the set of relations may comprise one or more of: Affirm, Negate, Greater, Less, Not Mentioned.

Each classification model may comprise an artificial neural network. Each output node of the neural network corresponds to one of the relations. For example, the neural network may have three output nodes, corresponding to the relations Affirm, Negate, and Not Mentioned, or Greater, Less, and Not Mentioned for example. Different relations may be used for classifiers corresponding to different slots. The relation is thus predicted by a dedicated neural network for each slot-value combination, i.e. a dedicated neural network for the dialogue slot is run with the value as the input (as well as the feature vector from the dialogue turn for the slot value combination), and a probability value corresponding to each relation is outputted. Each classifier outputs a probability value corresponding to each of three or more relations, these probability values form a categorical probability distribution. Thus the probability values for each (slot, value) pair are related to each other as they form a valid categorical distribution.

This allows modelling of complex linguistic phenomena such as conjunction (for example the user wishes for Greek or Italian food), as well as negation (for example the user does not want Chinese food) and/or ranges, for example for rating or price slots (for example where the user wants a restaurant for <£30 a head). There is a classifier iteration corresponding values in the domain ontology that can be assigned to a particular slot (rather than a classifier over all values for the particular slot). The system operates with (slot, value, relation) triplets.

Through inclusion of the "negate" relation, the NLU module is able to model negation in users' intents and utterances (for example, I am not up for British food today).

The NLU module is also able to model conjunction in users' intents and utterances. A distributed classification enables modelling of conjunction. The term "distributed" refers to the use of multiple slot-specific classifiers, instead of one large classifier for all slots. Using a plurality of slot-specialised classifiers allows handling of in-turn conjunctions. For example, if the user states "I want Indian or Chinese food", the dialogue state tracking model corresponding to the "Food" slot outputs a probability for (Indian, AFFIRM) when run with the input Indian, and a separate probability for (Chinese, AFFIRM) when run with the input Chinese. Both options can be affirmed, i.e. the probability for (Indian, AFFIRM) may be 1 and the probability for (Chinese, AFFIRM) may also be 1. However, the probabilities for (Chinese, NEGATE) and (Chinese, NOT MENTIONED) would both be 0 in this case.

Modelling range slots and values (e.g., I definitely want a place which has rating above 4) by including the relations "greater" and "less" can include range information in the model.

Thus for each of a plurality of dialogue slots in the domain, there is a corresponding classification model. The classifiers may be neural network based classifiers for example. The classifiers may each comprise a feed forward neural network (also known as a multi-layer perceptron or MLP). In an embodiment, each classifier comprises a MLP comprising three hidden layers and using a rectifier as an activation function, i.e. using a rectified linear unit (ReLU) as a non-linear activation function. In an embodiment, softmax function (normalized exponential function) is applied at the output layer to transform the vector of output values to a vector of probability values having the same dimension, where each entry is in the range 0 to 1 and all the entries add up to 1. The softmax function produces the categorical probability distribution over the relations. The input to the classifier is the final feature vector extracted in S302 for the slot value combination, concatenated with the vector representation of the value.

The classification is made based on: 1) the current user utterance, 2) the previous system act (this provides the information on the context of the user utterance), and 3) the current candidate (slot, value) pair. In other words, the input to the classifier comprises features representing the current user utterance, the previous dialogue output and the candidate value. The feature representations are obtained in the previous step S302. The input may comprise delexicalisation-based n-gram features.

Figure 4:
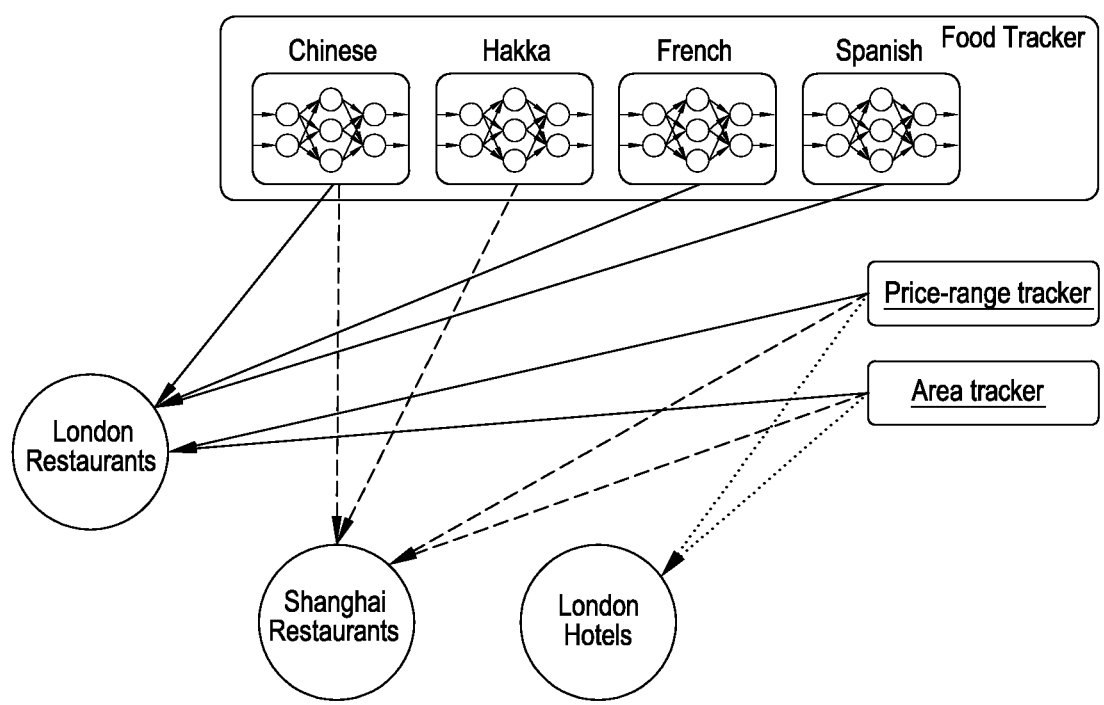
FIG. 4 shows example classification models corresponding to the dialogue slots "Food", "Price range" and "Area", used in a dialogue method according to an embodiment.

FIG. 4 shows a classification model corresponding to the dialogue slots "Food", "Price range" and "Area". For the "Food" dialogue state tracking model, the model is run for each value corresponding to the food dialogue slot, i.e. "Chinese", "Hakka", "French", "Spanish", . . . . The "Food" dialogue state tracking model may be used with all domain ontologies which comprise a "Food" slot, for example in this case the domain ontologies "London Restaurants" and "Shanghai Restaurants". Note that the classification model needs only be run for values which exist in the domain ontology. Thus for example, the "Shanghai restaurants" domain ontology does not comprise "French" or "Spanish" slot values, therefore the "Food" classification model need not be run for these values at each dialogue turn. The "Price-range" dialogue state tracking model can be used with all domain ontologies which comprise a "Price-range" slot, in this case the domain ontologies "London Restaurants", "Shanghai Restaurants" and "London hotels". Similarly, the "Area" dialogue state tracking model can be used with all domain ontologies which comprise an "Area" slot, in this case the domain ontologies "London Restaurants", "Shanghai Restaurants" and "London hotels".

This means that the classification model corresponding to a particular dialogue slot may be used for any domain where the ontology comprises that slot, without needing to train the classification model for that particular domain. Models trained for one domain can be used for other domains (for example, a classifier trained for the "Food" slot for the "London Restaurant" domain can be used for the "Shanghai Restaurant" domain by simply omitting the iterations for the values not present in the Shanghai restaurant domain). Similarly, a classifier may be trained on data from multiple domains, since the modularisation enables the model to make per slot-value decisions. The Natural Language Understanding model enables data sharing between different domains as well as language invariant training. The NLU stored model can therefore be configured to operate across different domains, by implementing classifiers for the slot-value combinations present in the domain ontology.

Thus for the example domain ontology shown in FIG. 2(b), there are four informable dialogue slots, and therefore four classifier models. For the "price range" slot, for an input text signal corresponding to a dialogue turn, the classifier corresponding to the "price range" slot is run three times, where the value "cheap" is input for one run, the value "moderate" is input for another run and the value "expensive" is input for another run. For each slot-value pair, a probability value corresponding to each relation is output. The classifiers are run for all values associated with the slot, where the majority will get assigned a high probability for the relation NOT MENTIONED. Thus for each slot in the domain ontology, a learned function f(value, dialogue_turn) →P is stored, where P is a categorical probability distribution over R possible relations, where R is greater than or equal to 3, and where "dialogue_turn" refers to the previous system utterance and the current user utterance. For example, the possible relations may comprise one or more of: affirm, negate, not mentioned, greater than, less than. The function f may be an R-way classifier, which is run for each value in consideration attached to the particular slot corresponding to the function f. Alternatively, the function may be a 3-way classifier, where for non-range slots the output relations are: affirm, negate, and not mentioned, and where for range slots the output relations are: greater, less than, not mentioned. In this case the classifiers are built only over relations that can be satisfied for the particular slots. Each tracking model outputs a categorical one-of-R probability distribution (or categorical one-of-3 probability distribution where only 3-way classifiers are used for example).

Where delexicalisation is used to represent the user utterance, the function is implemented as f(representation(value), delex(value, dialogue_turn)). The inner function delex denotes delexicalising the turn with that particular value.

The models iterate over all slot-value pairs, extracting delexicalised feature vectors and making a separate decision regarding each pair using multi-way classification.

The NLU model is modularised, i.e. it comprises a plurality of classifiers, each corresponding to one slot, and each run of the classifier recognising one slot-value pair. For example, for slot "Food" which comprises three values [Chinese, French, don't care], a trinary softmax classifier is implemented for each slot-value pair, e.g. [food=Chinese, food!=Chinese, food?=Chinese], where !=indicates negation and ?=means not mentioned. A three-way softmax is performed for each value, and not over all values. One trinary classifier output is generated per slot-value pair. More than three outputs may be used. The classifiers use a number of shared parameters, including the vector representations for the words and generic tags. Other parameters, such as weights in the slot-specific classifiers are classifier-specific. All slot-value specific classifiers operate with a set of shared parameters (as well as the classifier specific parameters).

The model comprises a distributed NLU architecture, comprising a plurality of slot specific classifiers, implemented separately for each value, that operate independently of each other. This collection of slot-value specific trackers is configured dynamically (and automatically) based on the provided input domain ontology. The slot specific trackers can be reused in other domains which enables data sharing.

The SLU and dialogue state tracking is therefore implemented as a classification-based task. Machine learning-based models are used to perform the classification. FIG. 5 shows the accuracy of slot-specialised trackers using an example machine learning based classifier (upper figure) compared to trackers based on keyword spotting (lower figure). Each line corresponds to a different slot. As can be seen, the machine learning based classifiers provide higher accuracy.

The output of S303 comprises a probability value corresponding to a plurality of (slot, value, relation) combinations in the domain ontology. The classifier output for the example slot value combination is shown in 606 of FIG. 6(a). These probability values are then used to update the belief state in S304. The belief state stores the current belief in what the current user goals are. Spoken language understanding (SLU) is performed in S302 and S303. The output of the SLU is then used in step S304, which comprises dialogue state tracking, to perform the belief state update.

In an embodiment, SLU and then a rule-based belief state update is performed to generate the most likely dialogue state information (i.e. one or more slot value relation combinations). Although a specific rule based update is described below, other rule-based methods can be used to update the belief state based on the output of the SLU stage. Alternatively, data-driven methods may be used.

In an embodiment, the belief state update depends on two factors: 1) the latest user utterance (i.e., the probability distributions over the slot, value and relation combinations generated in S303); and 2) previous belief state history (in this case the previous belief state, i.e. the probability distributions over the slot, value and relation combinations stored in the belief state after the previous dialogue turn). The most recent belief state reflects previous state history. The relative weight of the impact of the two components determines the accuracy of the current belief state.

For instance, if a complete change in the user's goal is detected (in S303, a high probability for AFFIRM is assigned to a value that is not in the previous belief state), the previous belief state history is weighted less, and more weight is assigned to the latest user input. In an embodiment, the belief state corresponds to dialogue state information, i.e. one or more slot-value-relation combinations, each having an associated probability value. For example, the belief state may store (Food=Indian=Affirm=0.8, Food=Indian=Negate=0.1, Food=Indian=Not Mentioned=0.1, Food=Chinese=Affirm=0.9, Food=Chinese=Negate=0.05, Food=Chinese=Not mentioned=0.05, Area=North=Affirm=0.9, . . . ).

The belief state may be updated using a rule based update. The belief state update integrates the information from the current dialogue turn generated in S303 into the belief state. The rule-based update may perform the following functions for example:

1) if the user mentioned a new value in the current utterance, assign the majority of the probability mass to this new value;
2) if no new values are detected, preserve the previous belief state.

For example, the below rule based algorithm may be used to update the belief state:

```
Input: previous belief state (previous_state) and probability distributions predicted from
the current user utterance (predictions);
Output: updated belief state stored in new_state ;
Initialisation:
check_probabilities(predictions);
if previous_state is None then
    previous_state = { };
end
check_probabilities(previous_state);
active_values = active(current_user_utterance);
new_state := copy_of(previous_state);
# Next steps performed over all active (i.e., mentioned) values to do the updates
for value in active_values do
    if value not in new_state then
        new state[value] = { };
    end
    prob_nothing_else_affirm = 1.0;
    prob_nothing_else_less = 1.0;
    prob_nothing_else_greater = 1.0;
    for other_value in active_values, other_value ≠ value do
        prob_nothing_else_affirm = prob_nothing_else_affirm * (1.0 -
            get_prob(predictions, other_value, AFFIRM));
        prob_nothing_else_less = prob_nothing_else_less * (1.0 -
            get_prob(predictions, other_value, LESS));
        prob_nothing_else_greater = prob_nothing_else_greater * (1.0 -
            get_prob (predictions, other_value, GREATER))
        ;
    end
    # Next steps get the probabilities from the previous state for this particular value
    prev_affirm = get_prob(previous_state, value, AFFIRM);
    prev_negate = get_prob(previous_state, value, NEGATE);
    prev_less = get_prob(previous_state, value, LESS);
    prev_greater = get_prob(previous_state, value, GREATER);
    # And the same set of probabilities from the current predictions for this particular
        value
    curr_affirm = get_prob(predictions, value, AFFIRM);
    curr_negate = get_prob(predictions, value, NEGATE);
    curr_less = get_prob(predictions, value, LESS);
    curr_greater = get_prob(predictions, value, GREATER);
    curr_not_mentioned = get_prob(predictions, value, NOT_MENTIONED);
    ;
    # (Re)combine everything into the belief state update for each relation
    new_state[value][AFFIRM] = curr_affirm + prev_affirm * ( curr_not_mentioned *
        prob_nothing_else_affirm);
    # Exactly the same update is done for LESS and GREATER relations, this is not
shown
    # For the NEGATE relation, it is slightly different:
    new_state[value][NEGATE] = curr_negate + prev_negate * curr_not_mentioned ;
    # And finally for the NOT_MENTIONED:
    new_state[value][NOT_MENTIONED] = 1 - new_state[value][LESS] -
        new_state[value][GREATER]-new_state[value][AFFIRM]-
        new_state[value][NEGATE];
end
return new_state
```

In the above, "predictions" comprises probability distributions over the relations for each value mentioned in the current user utterance, generated in S303. The values mentioned in the current user utterance are determined based on the probability distributions generated in S303 (for example for those values where the relation "not mentioned" had a probability value lower than a threshold value). The probability distributions are categorical distributions over the relations for a slot value combination generated in S303, (for example AFFIRM: 0.9, NEGATE: 0.05, NOT_MENTIONED: 0.05 for value British; AFFIRM: 0.03, NEGATE: 0.96, NOT_MENTIONED: 0.01 for value Chinese, both for slot food).

The "previous_state" comprises the previous belief state of the dialogue. The previous belief state comprises a set of probability distributions over relations for each (previously mentioned) value. The rules function to combine the probabilities from the "predictions" with the probabilities from the "previous_state".

The function "check_probabilities(in_state)" checks if the (categorical) probability distributions provided as input in "in_state" (where "in_state" can be "predictions" or "previous_state") is a valid distribution (summing to 1).

The function "active( )" returns the set of values mentioned in the current user input, based on the probability distributions generated in S303 (for example, those values where the relation "not mentioned" had a probability value lower than a threshold value). The "other values" refers to the other values for the particular slot, where the above belief state update is performed for each slot.

The function "get_prob(predictions,value,relation)" returns the actual probability value from the set of distributions predictions for the specified value and relation. For instance, get_prob(predictions,British,AFFIRM) would return 0.9.

In this example, the belief state does not store probabilities for every value, but only those that have been mentioned so far in the dialogue (as determined based on the probabilities output in S303). Thus for all the "active values" in the current turn, if an entry does not exist already in the belief state, a new entry is created.

Using the AFFIRM relation as an example, the update "new_state[value][AFFIRM]=curr_affirm+(prev_affirm* (curr_not_mentioned*prob_nothing_else_affirm))" does the following:
1) if the probability of AFFIRM in the current user utterance is high, this will be captured by a high value stored in curr_affirm, and it will be even more emphasised if "prob_nothing_else_affirm" is also high, therefore it is likely this is the current user goal, and a high probability is stored for the AFFIRM relation in the updated belief state;
2) if curr_affirm is not high and this value has not been mentioned in the current user act, and there is a high probability that something else has been affirmed, the current probability in the belief state will be decreased.

High values for "curr_not_mentioned" and "prob_nothing_else_affirm" will signal that the previous affirm is still active. A lower value of "prob_nothing_else_affirm" signals that this value is still affirmed, but the belief may need to be lowered (as some other value is also now taken into consideration). Since curr_affirm+curr_not_mentioned<1, new_state[value][AFFIRM] will also be between 0 and 1 (since all values in the formula are probabilities). Since the second term in each expression is multiplied by "curr_not_mentioned", the remaining probability from the current prediction (provided in curr_not_mentioned) is distributed over different terms (affirm, negate, greater, less). Since their sum is 1, multiplying that sum with curr_not_mentioned cannot yield a number higher than curr_not_mentioned in total, meaning that after the update, the sum for new probabilities for the value will be less than or equal to 1.

The relation NEGATE has a slightly different update rule as it has a slightly different role: it simply detects if something has been negated (i.e., removed from potential search goals) in the current turn and combines it with previous probability, but it is not dependent on any other potential NEGATEs for other values. This is different than AFFIRM where the rule is "regularised" with the probability that nothing else has been affirmed in the current user utterance.

At S304, a belief state, comprising a set of probability values for each relation, for each value which has been mentioned by the user, is updated based on the SLU output. An example rule-based update is described above, however, other methods of incorporating the SLU output into the belief state may be used. In S305, a dialogue act is then determined based on the belief state, using a policy model. The belief state is used by the downstream dialogue management module to choose the next system response.

The belief state thus dictates which system act is chosen. The role of the dialogue manager, or policy model, is to choose an appropriate system response following the latest user utterance. To do this, the dialogue manager uses the dialogue system's internal estimate of the dialogue state information (the belief state) to produce the system act, which is the dialogue act representation of the dialogue system's response to the user utterance.

Alongside steps S303 and S304, which perform SLU and DST in order to update the belief state, a dialogue act classifier or classifiers may be run, in order to determine the system estimate of the user dialogue act. Whereas the belief state stores information relating to the slots, values and relations mentioned in the dialogue, the dialogue act classifier or classifiers generate information relating to the current user dialogue act type or action, for example identifying one or more of: "inform", "request", "negate", "affirm", "greeting", "unknown", "goodbye" in the user input. The dialogue act classifier may comprise an output corresponding to each possible dialogue act type. The dialogue act classifier outputs a probability value corresponding to each output for each dialogue turn. Alternatively, a plurality of binary classifiers may be used, each corresponding to a dialogue act type. The dialogue act classifier or classifiers may use the same feature representation as the slot-specific classifiers, and may comprise one or more multi-layer perceptrons applied on top of the feature representations to perform binary or multi-way classification. The input to the dialogue classifier or classifiers is generated from a lexicalised vector representation of the input user utterance and previous system output (i.e. the text signal generated in S205 or the act generated in S204, as described above). These may be generated using the same vector representations used in S302 above. The vector representations may be converted into a single input feature vector in a similar manner as described in relation to 602 to 604, for example using a CNN or n-grams based method. The information regarding the dialogue act, for example the dialogue act having the highest probability output from the classifier, may be taken as input into the policy model. Alternatively, information regarding any dialogue act types having a probability over a threshold value may be taken as input into the policy model. Alternative models for determination of the input user act type may be used.

Other steps may also be performed to extract further information from the user utterance. For example, further requestable slot classifiers may be run, in order to determine the system estimate of the requestable slots mentioned by the user. For example, for the restaurant search and booking task, one or more requestable slot classifiers may be used to identify one or more of: "postcode", "address", "phone" in the user input. These classifiers may use the same feature representation as the slot-specific classifiers, and may comprise multi-layer perceptrons applied on top of the feature representations to perform binary classification. Each classifier corresponds to a requestable slot. The information regarding the probability that the requestable slot was mentioned, for example all requestable slots having a probability higher than a threshold, is also taken as input into the policy model. Alternative models for determination of the requestable slots may be used.

In S305, a rule based policy model may be used, in which the desired system behaviour is manually specified. The policy model selects a system act from a plurality of stored possible system acts, based on a set of rules. The rules may be applied to the information in the belief state, the output of any dialogue act classifiers, the output of any requestable slot classifiers, a set of stored parameters specifying the system behaviour, information in the database and/or information obtained from a third party system for example. The set of system acts may comprise discourse, confirm, statement and/or request acts for example. The set of system acts may comprise one or more of the following acts:
system_discourse:
 greeting( )
 goodbye( )
system_confirm: based on the user statement, confirm what user just said.
 confirm(slot=value)
 confirm(slot)
system_statement: offer user current status of the database.
 offer(name=X, slot=val, . . . )
 compare(name1=X, name2=Y, slot=val, . . . )
 count(count=?, slot=val)

system_request: ask user a question, could be proactive.
   request(slot)
   request(slot=val)
   request_alt(slot=val)
   request_alt(name=X)

The policy model may comprise a hand-crafted finite state machine (FSM) which encodes a set of rules for constructing system turns, with each turn comprising a response frame which responds to the user's previous turn and an initiate frame which drives the dialogue forward through a predetermined sequence of sub-dialogues. For instance, these sub-dialogues can be: gather user preferences, query a database via an API, offer matching entities to the user, allow user to modify preferences or request more information about an entity, and finally complete the transaction (booking the entity). An example of an FSM-based policy model (for task-independent database querying applications such as restaurant search and booking) is provided in FIG. 6(d). It is possible to pre-specify all the desired transitions, and therefore system behaviour as a response to user acts can be customised. Such engineered finite state machines implicitly define a model of expected user behaviour in the states and transitions of the system agent.

Alternatively, a learned dialogue policy may be used to map the current dialogue state hypothesis (belief state and user dialogue act) to one of the possible system actions. For example, the dialogue management policy model may use Markov Decision Processes (MDPs) to allow the dialogue policy to be learned from data using reinforcement learning. A Partially Observable Markov Decision Process may alternatively be used, in which the (true) dialogue state is treated as a hidden variable.

An alternative dialogue management method used in a dialogue method in accordance with an embodiment will be described below.

In S305, a dialogue management step is performed, in which a system act is determined. The updated belief state is taken as input. Other information may also be extracted from the input utterance and inputted to the dialogue management model, for example the system estimate of the user act type, or action and/or the system estimate of any requestable slots mentioned. In this step an appropriate system response is selected following the latest user utterance. This selection is made based on the user utterance, dialogue context (i.e. history of the current conversation), and any additional external information (such as the result of a booking attempt). The dialogue manager uses the updated belief state to determine the system act, which is the dialogue act representation of the dialogue system's response to the user utterance. The terms dialogue management and dialogue policy model are used interchangeably in this specification.

The system and user dialogue acts comprise one or more dialogue act types. Dialogue act types correspond to the general action of the utterance. A set of pre-defined dialogue act types are used to generate the system dialogue acts. Each dialogue act type has a corresponding dialogue act argument. The argument may be empty, for example where the act type is "greeting". In task-based systems, the argument may be one or more slot-value pairs. For request acts, the dialogue act argument may be an attribute of an entity. Examples of dialogue acts include inform(food=British) or request(address).

The dialogue management in step S305 may be performed using a rule based approach. Unlike for dialogue management performed based on learning-based methods such as reinforcement learning and supervised learning for example, this may enable changes to be implemented easily (by simply changing, removing or adding the relevant rules) and also does not require large amounts of domain-specific data to train the dialogue manager. The naturalness of the dialogue may also be improved using a rules based method.

In an embodiment, the rules are organised in two or more stages or groups. The stages are ordered such that the rules for a second stage are only applied after the rules of the first stage, and so on. Within the stages, the rules may be applied simultaneously or in an arbitrary order. In an embodiment, the stages are ordered such that a stage or stages comprising rules relating to a world state update are prior to a stage comprising rules relating to act selection, ensuring that the final selected dialogue act or acts correspond to up to date dialogue information. The world state comprises stored information relating to the dialogue and will be described in more detail below.

In an embodiment, the dialogue management is based on a hybrid dataflow-control flow paradigm.

A control flow approach controls the flow of a dialogue using a pre-defined sequence of steps that represent the state of the dialogue at any point during the conversation, for example in a finite state machine. In the hybrid approach, unlike a purely control flow based method, it is not required to specify every single possible conversational pathway explicitly. In other words it does not require the developer to account for all possible conversational scenarios that the user might try to follow. Instead, a number of rules are applied together (i.e. simultaneously, or in any order) within ordered stages at each dialogue turn. Thus rather than the dialogue act being determined by a state, the dialogue act is determined by a set of rules, which are applied in stages. The stages have a fixed order. The stages do not correspond to a specific dialogue state, but rather to a general rule function (e.g. world state update or act selection). For larger domains in particular, the process of adding new capabilities to the system may be made efficient, since new rules can simply be created and slotted into the appropriate stage.

In a data flow approach, a number of {if X then Y} rules are applied, and a rule engine handles the connections between the rules automatically. Multiple components can process data at the same time and multiple conditions may be evaluated and fulfilled in the same dialogue turn. In the hybrid approach, unlike a purely data flow approach, the system response is separated into several dialogue stages. In each stage, a data flow mechanism decides over the triggered rules, i.e. the rules for which the condition is fulfilled. The stages define the order in which the rules are applied.

Thus multiple stages of processing are pre-specified with an order, in a control flow approach, but at the same time, at each stage, rules are applied in a data flow approach. Control of the dialogue management specification is maintained without the need to pre-specify all possible dialogue states. The policy is implemented by matching a set of propositions that allow the system to use a given rule to output a certain set of dialogue acts and transition to a different state.

Figure 14:
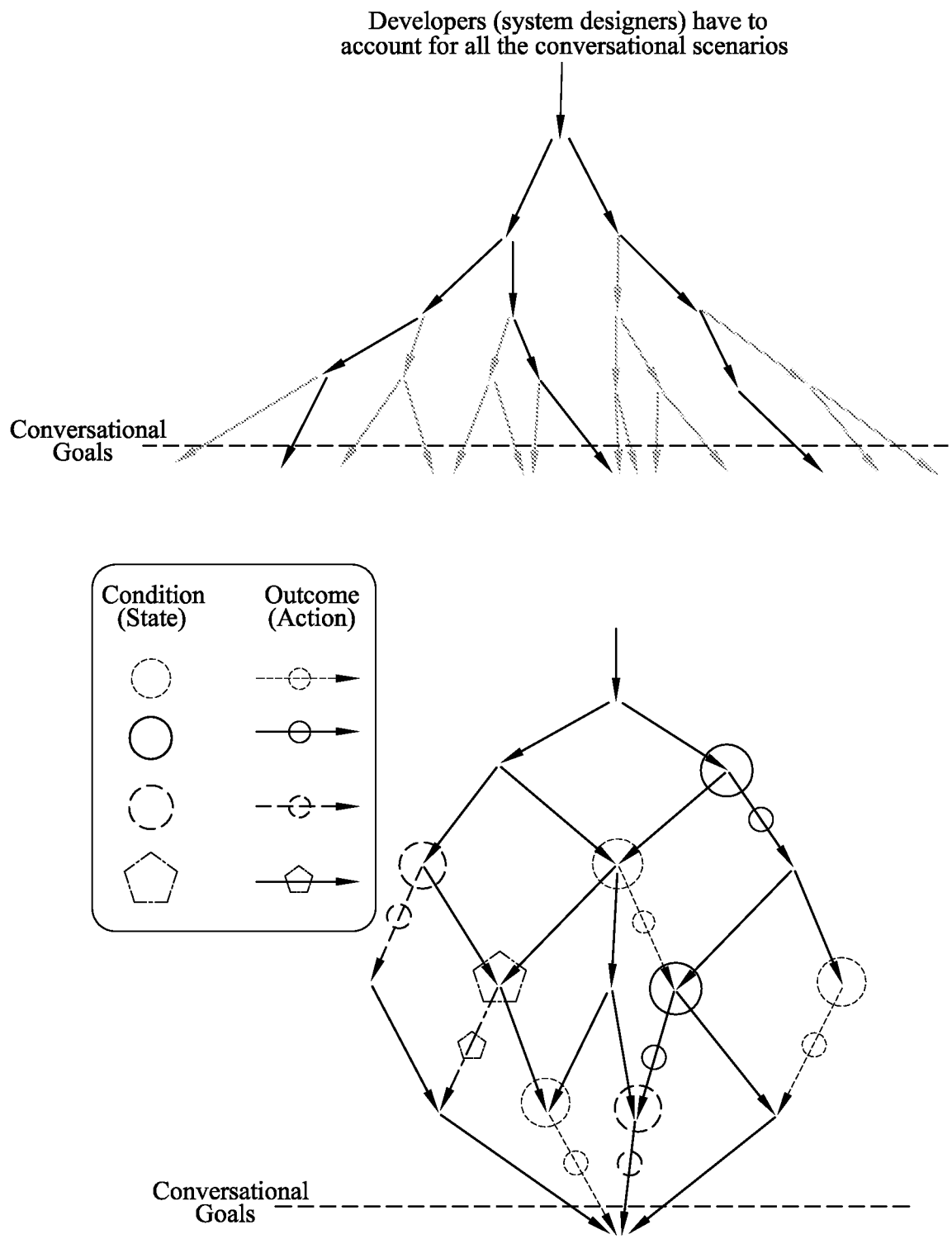
FIG. 14 shows an illustration of an example control flow based method in the upper figure and a hybrid policy model in the lower figure which may be used in a dialogue method according to an embodiment.

FIG. 14 shows a control flow based method in the upper figure, and a hybrid method in the lower figure. In the control flow method, each possible state is pre-specified, and the system response corresponding to each possible state pre-determined. For example, in a restaurant booking scenario, a separate state (and corresponding selected dialogue act) is pre-specified for the case where, in the first dialogue turn the user supplies the restaurant name, date and party size, and where in the first dialogue turn the user supplies the restaurant name, date, but not the party size. In the hybrid approach, a rule may be applied to determine if the user has supplied the booking date for example (regardless of the other information and regardless of which turn). For example, the points indicated by the dotted circles in the lower figure may be considered to correspond to dialogue turns in which the booking date is supplied. Even though this happens at different stages in the dialogue, the same dialogue act is triggered in each case. The same dialogue act can trigger based on the same rule at different points in the dialogue. Thus the same components can be used to tailor different conversations and it is not required to pre-specify all possible conversation scenarios.

FIG. 15 shows a sample dialogue with user utterances annotated with the dialogue acts. User goals in a dialogue are represented as sets of constraints expressed by slot value pairs. The text shows the slot value constraints the model stores from previous dialogue turns.

The role of the dialogue manager in S305 is to choose an appropriate system response following the latest user utterance. To do this, the dialogue manager takes the dialogue system's internal estimate of the dialogue state (the belief state) updated in S304 as input to produce the system act, which is the dialogue act representation of the dialogue system's response to the user utterance. The updated belief state information generated in S304 is therefore taken as input in S305. Other information extracted from the input user utterance may additionally be taken as input, for example the estimated user act type and/or mentioned requestable slots.

The input to the policy component is the flat NLU output, i.e. the updated belief state and any additional information extracted from the input user utterance. The NLU output, i.e. the updated belief state, for a dialogue turn may comprise a probability score for one or more slot-value pairs.

Figure 16:
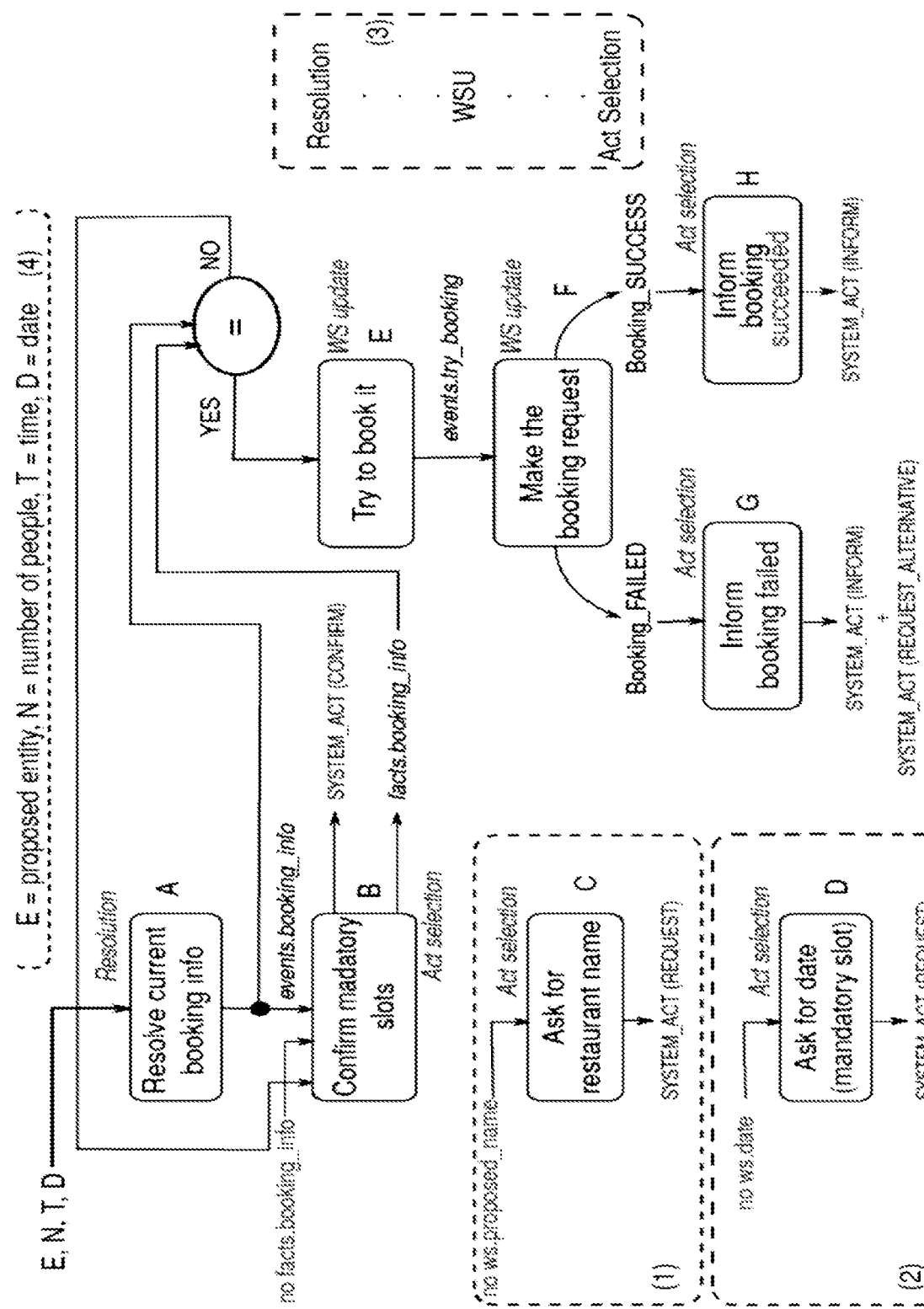
FIG. 16 is a schematic illustration of a policy management method based on a restaurant booking scenario which is used in a dialogue method according to an embodiment.
Figure 17:
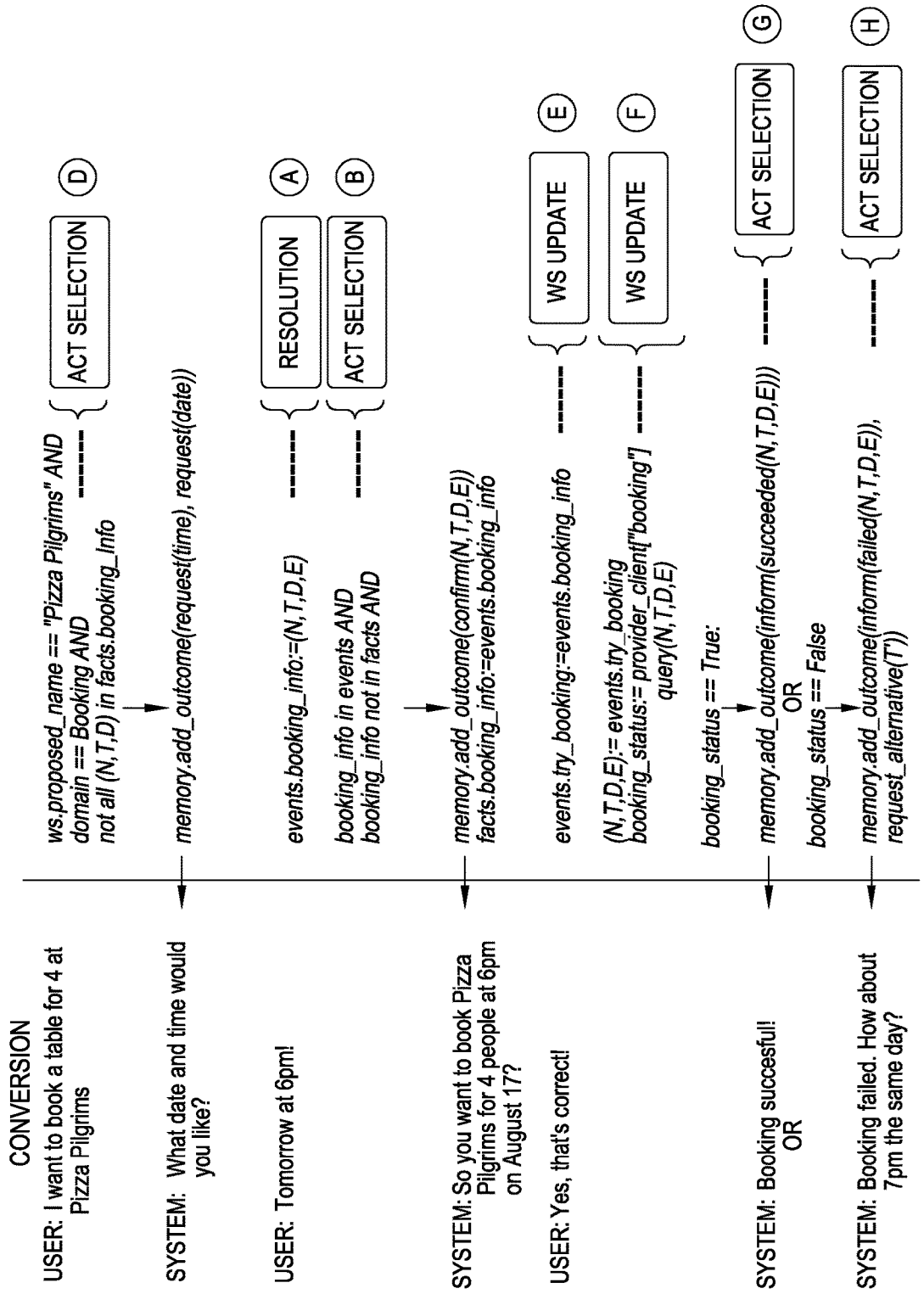
FIG. 17 is a schematic illustration of a policy management method based on the restaurant booking scenario which is used in a dialogue method according to an embodiment.

In an embodiment, in S305 a dialogue act is determined by applying a plurality of rules to world state information. Rules are also applied to belief state information. An example method based on a restaurant booking scenario will be described below in order to illustrate this step, and is also shown in FIGS. 16 and 17. The rules are applied in stages, as described previously. In an embodiment, the stages comprise:
1. Initialisation;
2. First world state update (or resolution);
3. Second world state update (based on external information);
4. Act selection.

The world state may be updated in all four stages. In the initialisation stage, world state information is initialised, through application of the rules in this stage. In the first world state update stage (or resolution stage) the world state is updated based on the belief state information and any other information extracted from the user utterance. In the second world state update stage, the world state is updated based on external information. In the act selection stage, as well as selecting acts, the rules may also specify further world state updates, for example storing a list of the selected acts.

In a further embodiment, an additional "act decoration" stage may be included after act selection. This optional further stage will be described in more detail below. Alternatively or additionally, a further stage of final act selection, based on importance, may be included after initial act selection (and prior to act decoration if included). This optional further stage will also be described in more detail below.

Each stage comprises one or more rules. The stages are performed in order, thus after a user utterance has been received and the belief state updated, the rules in stage 1 are applied, followed by the rules in stage 2 and so on. Although these specific stages are described in relation to a booking scenario example, the same stages may be used for other scenarios, for example search scenarios.

Each rule may comprise a condition relating to the world state information and/or belief state information. If the condition is fulfilled, the rule triggers, and the step specified in the rule is performed. The step may comprise a particular dialogue act being selected, an update to the world state being made or a third party call being made for example, as will be described in relation to the example below.

The world state comprises information relating to the dialogue, in particular information relating to the current conversation status or the current point of the dialogue. It can be considered as comprising information relating to a collection of "conversation checkpoints". It comprises the information known about the dialogue at any stage, for which logical propositions can be made. The term "world" refers here to the domain ontology and sets of user and system dialogue acts, as well as any additional relevant information. For example, the world state can keep track of the information related to the user confirming the booking information. The world state may comprise information from different sources, including one or more of:
1. database information,
2. third-party API feedback (for example information returned in response to a booking request sent to a third party system, for example a restaurant booking system),
3. the updated belief state information output from the previous step,
4. any other information extracted from the input user utterance (for example an estimate of the user act type or of the requestable slots mentioned); and
5. dialogue history information (i.e. previous user acts and system acts).

In other words, the world state comprises internal information from the dialogue (including the belief state information, other information extracted from the user utterance and the dialogue history), but also information conditioned on the external world (including the database information and the third-party feedback for example). The information referred to in point 5 comprises information relating to elements of logical conversation flow (e.g. the dialogue has locked on to a specific restaurant that is now being discussed). For example, in the search scenario: if the system suggested a restaurant/entity to the user and the user asked for an alternative place after that, that restaurant X is included into a list banned entities stored in the world state. When sampling another random suggestion from the list of matched entities, the system will not consider the entities in the list of banned entities. This information is not stored in the belief state, but in the world state, and represents the dialogue history (i.e. that the user gave a request alternative act).

Database information may comprise information relating to the entities which may be searched and/or booked, for example restaurant information. The database may store the values corresponding to each entity (e.g. area, food, price etc) as well as information corresponding to the requestable slots (e.g. name, address etc).

The third party API feedback information relates to one or more executable third-party queries that depend on the external world e.g. to try to do an action and report success/failure. The outcome of these actions may be used to update the world state according to one or more rules. For instance, the world state may store that the current proposed entity is X (Proposed_Entity=X), but the attempted booking at the restaurant X at a particular time slot, date, and the number of people failed (BOOKING=Failed), as will be explained in more detail in relation to the example.

The world state information may be updated after a user utterance is inputted based on the updated belief state and any other information extracted from the input user utterance, for example the estimated dialogue act type. The belief state is updated in S304 for each dialogue turn, as has been described above.

The world state may comprise "general" type information and "scenario-specific" type information. For example, general information may relate to the current status of the dialogue, for example one or more of: conversation end, flag of the current scenario (is it browsing/searching or booking?). In the searching scenario, the world state may comprise "scenario specific" information relating to one or more of: the currently proposed entity and the list of banned entities (i.e. entities in which the user is definitely not interested according to the history of current conversation). In the booking scenario, the world state may comprise "scenario specific" information relating to one or more of: the booking action status, whether all mandatory slots are filled in and the currently proposed/targeted entity.

The world state may comprise "fact" type information, i.e. information that remains across different turns and "event" type information, i.e. information that remains only for the current turn. Fact type information is used to keep track of the conversation history, and comprises information such as booking_info or banned_entities for example. Fact type information may be accumulated and/or updated across dialogue turns during the conversation. Event type information is not propagated across turns. For instance, possible events could be matched_entities (i.e. need information on the current result from the database search query) or mentioned_name (i.e. need information on the current intent expressed by the user). The matched_entities information is relevant for the search scenario. Given the current search constraints, in each turn it is reassessed which entities match the constraints. In the booking scenario, the latest booking_info is stored in events (shown in the example below). The mentioned_name information is also related to the searching scenario. For instance, if the user asks "Could you give me the address of restaurant X?", the mentioned name X is stored in events (only for that turn). Events are reset after each turn and are used to determine whether a condition in a rule is fulfilled. Facts and events are not exposed to any other component in the entire task-based system pipeline (for example SLU, ASR) but is used to determine the next system act.

The information stored in the events and facts is used when checking the conditions in one or more rules: for instance, the information stored in the mentioned_name event is used to check if the restaurant is in the matched_entities list in a searching scenario. The rules and conditions are described in more detail below in relation to a booking scenario example. The world state maintains information about the dialogue, which is used to condition the firing of rules. In other words, the conditions in one or more of the rules are evaluated based on information in the world state. The information stored in the world state is thus used to make propositions about the world which consequently condition the firing of rules. As explained below, the triggering of the rules depends on their condition being satisfied. The conditions may be based on the belief state and/or any other information extracted from the input user utterance (for example an estimate of the user act type or of the requestable slots mentioned) and/or the world state information.

In the booking scenario example, the initialisation stage may comprise one or more rules to set world state information to default values, or to identify fundamental information relating to the task.

For example, information identifying the task may be set in the world state in the initialisation stage. For example, a simple classifier which predicts the current task may be run each dialogue turn (for example a binary classifier configured to predict between a booking task and a searching task). The output of this classifier is then used to update the "task" information (also referred to as "domain" information) stored in the world state in the initialisation stage. In FIG. 17, it can be seen that "domain" is set to "booking" for example. This is done in the initialisation stage of the first dialogue turn.

One or more event or fact type information types may be set to default values.

In a booking scenario, the initialisation stage may comprise a further rule, setting the proposed entity name in the world state. This rule may be conditioned on the proposed name in the world state being empty. For example, the rule may set the proposed name to the name with the highest probability value in the belief state.

Other rules setting default values or fundamental information in the world state can be included in the initialisation stage.

The resolution stage, or first update stage, comprises rules relating to resolving the information extracted from the input user utterance, for example in the updated belief state, and storing it in the world state. In this step, information from the updated belief state is stored in the world state. The information is stored as event type information, and therefore may be updated every dialogue turn, during the resolution stage. One or more slot value combinations determined to be set in the belief state may be stored in the events information in the world state.

In the booking scenario, information from the current belief state is stored into the world state information labelled "events.booking_information", using a second rule or group of rules. In this step, it is determined whether one or more "mandatory" slots (i.e. slots relating to information predefined as being required in order to make a booking) are set in the belief state. A slot value relation combination may be determined to be set in the belief state if the probability value corresponding to the combination is greater than a threshold value. In an embodiment, the threshold value is 0.6. The threshold value is a hyper-parameter that can be changed however. The resolution step is shown in stage A in FIGS. 16 and 17.

The resolution stage may comprise a rule retrieving the affirm combination with the highest probability for each mandatory slot from the belief state information. These rules may comprise the following conditions: firstly that the proposed entity name (ws.proposed_name) is set in the world state, and secondly that the mandatory slot is set as affirmed in the belief state (for example according to the threshold described above, namely the slot value affirm combination (or slot value range combination) has a probability higher than a threshold). If these conditions are met, the mandatory slot in the world state is updated to the value with the highest probability. This information is stored as events information in the world state (events.booking_information, also referred to as events.booking_info).

In an embodiment, a single rule corresponding to all the mandatory slots may be used, comprising the following conditions: firstly that the proposed entity name (ws.proposed_name) is set in the world state, and secondly that the mandatory slots are set as affirmed in the belief state (i.e. according to the threshold described above). If these conditions are met, the entity name ("name") is updated to the proposed name in the world state and the mandatory slots are updated to the values with the highest probability.

The act selection stage comprises rules that relate to act selection. The act selection stage may comprise one or more rules comprising a condition that: if a mandatory slot has not been specified, a request act for the slot value is triggered. In the restaurant booking example, one or more of the following rules of this type may be included in the act selection stage:

1a. If "Restaurant name" not specified, request "Restaurant name";
1b. If "Date" not specified, request "Date";
1c. If "Time" not specified, request "Time";
1d. If "Number of people" not specified, request "Number of people".

This first group of rules relates to the specification by the user of mandatory information.

The first group of rules is in the act selection stage. The information listed is provided as an example. As can be readily seen any number of mandatory slots may be pre-specified for a particular dialogue scenario, and an equivalent rule corresponding to each mandatory slot can be included. In this booking scenario example, the booking can proceed only if the user has specified the following mandatory slots: the restaurant (proposed entity E), number of people to dine (N), the exact date for the booking (D), and the exact time (T). One or more of these rules may be combined.

These rules are applied at each dialogue turn during the act selection stage (i.e. after the initialisation stage, the resolution stage and the world state update stage). Since they are all in the same stage, they may be applied at the same time, or in an arbitrary order for example. Applying each rule in this group comprises determining whether the information in the world state fulfils the condition. If the information fulfils the condition, the rule is triggered and the corresponding request act is selected as an outcome.

For example, the act selection stage may comprise one rule which is conditioned on the proposed entity name (ws.proposed_name) in the world state not being filled. If triggered, an act requesting the entity name is selected as an outcome. The act selection stage may comprise a further rule conditioned on the proposed entity name being filled, but not all the mandatory slots existing as affirmed in the belief state. The rule returns the mandatory slots not included as affirmed in the belief state, and a request act relating to these slots is selected as an outcome. The request act may comprise all the slots. Alternatively, the rule may further specify a maximum slot number to be requested in one act. The maximum slot number may be sampled (randomly selected with a value less than or equal to the number of mandatory slots).

In FIG. 16, relating to the booking example, stages C and D show the case where the restaurant name and date are not specified respectively. As can be seen, a request act is selected in each case. FIG. 17 shows the case where the first dialogue turn corresponds to stage D, i.e. the condition "If "Date" not specified" is fulfilled. Thus the first group of rules relate to blocks 1 and 2 in FIG. 4. If the proposed entity is not set (i.e. still do not know which restaurant is the intent of the user, this information is not available in the world state), the rule "Ask for restaurant name" will fire and one outcome will be the system act requesting the actual restaurant name (Block 1).

In an embodiment, each mandatory slot corresponds to a separate rule in the act selection stage. If the condition for two or more of the rules in the first group is met, the two or more corresponding request dialogue acts may all be selected. The dialogue act may then correspond to the two or more request dialogue acts (i.e. a composite dialogue comprising a request for two or more mandatory slots is generated).

An additional stage of determining a final dialogue act from the set of one or more outcomes selected in the act selection stage may alternatively be included. For example, this stage may comprise selecting outcomes with the highest importance score. Importance scores are predefined associated with each outcome. The further stage may comprise a rule which compares the importance scores of the selected outcomes and generates a final dialogue act comprising the outcome(s) with the highest score. Of course, the importance may be pre-specified in any manner desired by the developer, such that composite acts comprising various combinations may be generated. The importance and implementation of act selection based on importance will be described in more detail below.

The act selection stage may comprise a third rule comprising a condition that if the information in the world state relating to the current belief state (events.booking_info) and the information in the world state relating to the previous belief state (facts.booking_info, also referred to as "facts.booking_information") do not match, the dialogue act comprises a confirmation. In the restaurant booking example, the third rule may be:

3. If "event booking info" and "fact booking info" do not match, confirm "booking info".

This corresponds to the option "NO" in stage I of FIG. 16, which leads to the "confirm mandatory slots" dialogue act in stage B of FIG. 16, and is also shown in stage B of FIG. 17.

This rule is in the act selection stage, and therefore is applied after the world state update stage. Thus, in a single dialogue turn, where the belief state comprises all the mandatory information, this information may be resolved and stored in the "events.booking_info" (in the resolution stage) and then a confirm act issued in the act selection stage.

The third rule may comprise a further effect, whereby fulfilling the condition for triggering the confirmation act also sets the global cross-turn variable "facts.booking_info" to the most recent information, i.e. the information from events.booking_info.

The third rule may be conditioned on the booking information being stored in the world state events but not in the world state facts, or the facts booking information being different from the events booking information. If the rule fires, the facts booking information is updated to events booking information, and the confirmation act is issued. The outcome of the confirmation act is added to the world state in the next dialogue turn.

The world state update stage may comprise a fourth rule comprising a condition that if the information in the world state relating to the current belief state and the information in the world state relating to the previous belief state match, a booking action is taken, the world state being updated based on the outcome of the booking action. In the restaurant booking example, the fourth rule may be:

4. If "event booking info" and "fact booking info" match, perform booking action and update world state based on outcome of booking action.

This rule will trigger in the dialogue turn after the confirm act is issued, if the user confirms the same booking information.

The fourth rule may be implemented in two parts, a first part conditioned on: "try_booking" is not in the world state event information, and that the "event booking info" and "fact booking info" both exist in the world state and are the same. If this rule fires, "try_booking" is updated with the booking information. The second part of the fourth rule is conditioned on "try_booking" being in the world state event information, and performs the booking action based on the booking information by communicating with the third party system, and updates "events.booking_succeeded" to (name, time, date, people) if the booking succeeds, or updates alternatives=list(booking_result ["alternative"].items( )) and "events.booking_failed"=(name, time, date, people, random.choice(alternatives)) if the booking failed. The flag "try_booking" is used to ensure that only one attempt at booking is made with the same information. In this case, as well as noting that the booking has failed, the system also stores possible alternative options (for example alternative times suggested by the third party booking system). This is optional however, and the system may just store that the booking failed.

Thus the resolve rule will trigger based on the user input, and "events booking info" will be updated corresponding to the updated belief state information. Since "facts booking info" was updated in the previous dialogue turn, "facts booking info" and "events booking info" will now match (assuming the user confirms the same information). The third rule will not trigger during the act selection stage, but the fourth rule will trigger in the world state update stage in this case.

The third rule and fourth rule both comprise a condition whereby whether the information stored in events.booking_info corresponds to information currently present in facts.booking_info is checked. As explained above, event information is retained only in one single turn, while facts store global information and persist across multiple turns. The third rule and the fourth rule are both evaluated in I of FIG. 16.

If the information in the world state relating to the current belief state (i.e. the events.booking_info, updated in the current turn) and the information in the world state relating to the previous belief state (i.e. the facts.booking_info, updated in a previous turn) are determined not to match the dialogue act comprises a confirmation. The case where they do not match corresponds to two different scenarios.

The first scenario is that facts.booking_info does not contain any information. It is thus not equal to events.booking_info, which contains the (resolved) belief state information from the current turn, and the condition is satisfied to trigger a "confirm mandatory slots" rule. This Act Selection layer rule (i.e., "Confirm mandatory slots") is enabled only if the previous "Resolve current booking info" has been fired based on the hierarchical multi-stage approach.

The second scenario is that facts.booking_info contains information which is different to what the user expressed in her/his latest utterance (i.e. stored in events.booking_info). For example, the user did not confirm the same booking info but provided different booking info. This means that the user has decided to change some information compared to what was said earlier in the conversation. If this is the case, the "Confirm mandatory slots" act again triggers and the confirm system act is issued. In both cases, facts.booking_info is set to the most recent information.

This rule means that in the booking scenario, an explicit confirmation from the user (i.e., an affirmative response after the issued confirm act which confirms all mandatory slots) must be received before proceeding with the booking. However, this step may be omitted by re-designing the rules (e.g., proceeding with booking without the explicit confirm). Further constraints may additionally or alternatively be imposed. The rules mechanism enables the developer to fine-tune desired system behaviours and affect the possible conversation flow.

If the information in the world state relating to the current belief state and the information in the world state relating to the previous belief state match, a booking action is taken and the world state is updated based on the outcome of the booking action as specified in the fourth rule. In other words, if facts.booking_info is the same as events.booking_info, this means that the confirmation has been received (i.e., that the system has issued the confirm act which was affirmed/okayed by the user). This signals that the system can proceed to the booking. This corresponds to the option "YES" in stage I of FIG. 16, which leads to the booking action in stages E and F of FIGS. 16 and 17.

The booking action may comprise the system issuing a third party call. For example, it may comprise communicating with the selected restaurant's system to determine whether it is possible to make the reservation for the current (N,T,D) combination. The booking action may be "Make the booking request", which was conditioned on the Boolean events.try_booking variable).

The booking action may have multiple outcomes. For example, in this case, there are two possibilities: the booking request succeeds or the booking request fails. The fourth rule specifies the step that the world state is updated based on the booking action outcome.

The act selection stage may comprise a fifth rule and a sixth rule, whereby the dialogue act comprises informing of the outcome of the booking action stored in the world state.

If the information in the world state relating to the booking action outcome indicates success, the dialogue act comprises inform booking succeeded. This is shown in stage H of FIGS. 16 and 17. In the restaurant booking example, the fifth rule may be:

5. If "booking status" is success, inform booking success.

This rule is conditioned on "booking_succeeded" in the world state event information, and may inform the user of the booking information.

If the information in the world state relating to the booking action outcome indicates fail, the dialogue act comprises inform booking failed. This is shown in stage G of FIGS. 16 and 17. In the restaurant booking example, the sixth rule may be:

6. If "booking status" is fail, inform booking fail and request alternative.

This rule is conditioned on "booking_failed" in the world state event information, and may inform the user of the failed booking and request an alternative.

Thus if the booking request succeeds, the system fires the "Inform booking succeeded" rule which will inform the user about the success and if the booking request fails, the system then fires the "Inform booking failed" rule, which informs the user about the failure. Since these rules are in the act selection stage, they are performed after the fourth rule, in which the booking action is performed and the world state updated.

In the above sixth rule, there is a composite outcome, comprising an inform act and a request act. Where the system has received alternatives from the third party system as part of the booking action, the composite outcome may instead comprise two inform acts (one to inform that the booking failed and one to inform of one or more alternatives provided by the third party system).

In both of these cases, the rule automatically selects a composite outcome. Alternatively however, a separate further stage of determining whether to add auxiliary or decorator acts may be included. In this case, the "main act" inform booking fail is selected in the act selection stage and this is stored in the working memory. The subsequent "act decoration" stage may comprise a rule whereby if the selected act is "inform booking fail", a sampling step is performed to determine whether the dialogue act further comprises a request act (or alternatively an inform of alternatives act). For example a random sampling based on some pre-defined probability distribution may be performed. If a request act is included, the system asks the user to provide alternative values for one or more of the mandatory slots (for example an alternative time). The request alternative act is added to the inform act to form a composite dialogue act. This is shown in stage G of FIG. 16. Alternatively an inform act can be included, if alternatives have been received from the third party system.

These further acts (request and inform) may be examples of "auxiliary" acts or "decorator" acts. The main act (in this case inform booking status failed) is selected based on the rules in the act selection stage, optionally including the importance as will be described below. A separate stage of determining whether to add one or more of the auxiliary acts tied to the selected main act may then be performed (the act decoration stage). One or more of the main acts (selected during the act selection stage) will always be part of the next system utterance. The auxiliary acts may enable a more varied behaviour by the system, as the system may decide to drop or keep the decorating act. This decision may be made based on a pre-specified parameter controlling how verbose and proactive the system agent is. A further stage including a rule determining whether there are any auxiliary acts associated with the selected outcome is performed, including determining whether to include any of the auxiliary acts. This may be based on a pre-specified parameter for example.

Further general rules may be included in the act selection stage, for example, a rule setting a bye act when the conversation is determined to be completed may also be included. For example, a rule conditioned on the user_action.act_type=FINISHED and "user_action.probability">0.7 for example. A further rule setting a "bye and confirm" act when the conversation is determined to be completed with a lower probability may also be included, for example when the conversation is complete with 0.5<user_action.probability <=0.7. In this case, an act 'any else I can help with?' may be issued. The user_action.act_type may be determined by the dialogue act classifier, which identifies the user input act type as has been described above. This information may be stored in the event information after each dialogue turn during the world state update stage for example.

As described in relation to the above example, a pre-specified importance score may be used to select the acts. The dialogue act or acts for each turn may be selected from the triggered acts based on the importance score. Thus selection of the dialogue act or acts may be a two stage process, in the first stage the rules for which the conditions are fulfilled determine a set of acts or outcomes, which are stored in the working memory. For example the first group of rules (issuing request acts for missing mandatory information), the third rule (issuing the confirm act), and the fifth and sixth rules (informing the outcome of the booking action) may all be in the initial act selection stage as described above. A second act selection stage, or final act selection stage, is then performed after the initial stage, and may include rules such that act or acts are selected from this stored set of outcomes based on the importance score.

By defining an importance score corresponding to each dialogue act, rather than defining a priority for each rule, conflicts (whereby more than one rule satisfies the same condition) may still be avoided with a simplified and efficient implementation. By defining the importance of possible system acts, it is possible to rank the outcomes and select the most important one or ones. In other words, all matching rules fire and produce their outcomes, the most important outcome or outcomes is then selected based on the assigned importance score. Since there are fewer system acts than rules and they have a more direct effect this is more efficient.

Additionally or alternatively, a rule selecting a default outcome (default dialogue act, e.g. a "can't help" act), conditioned on no outcomes having been selected (i.e. the set of outcomes stored in the working memory being empty) may be included in a "Final act selection" (performed after the initial act selection stage). The selected outcomes from the "initial act selection" stage are stored in the working memory. The rules in the "final act selection" stage may therefore be conditioned on the information stored in the working memory (i.e. separately from the world state).

In an embodiment, additional variability to the system behaviour may be included by adding an additional step in one or more rules, for example to enable the system to sometimes request all mandatory slots in the same act, but sometimes request values only for a subset of slots in one act. This variation may be controlled through random (or hyperparameter-controlled) sampling if there are multiple possible acts of highest importance detected.

Thus composite acts, i.e. where two or more dialogue acts are outputted, may be generated in different ways. A composite act may be generated from two separate rules in the act selection stage (for example where the time and date are not specified, the conditions "If time not specified" and "If date not specified" for the two rules are fulfilled and both corresponding acts are selected). A composite act may be generated from one rule having a composite act as an outcome, for example where two separate mandatory slots are dealt with in the same rule in the act selection stage (for example where the time and date slots are not specified, a request act with both slots is selected). Alternatively, a composite act may be generated from a single rule in the act selection stage, and from one or more rules in the act decoration stage (for example where the condition "booking indicates fail" is fulfilled in the act selection stage, the outcome "inform fail" is selected, and this outcome has an auxiliary act corresponding to the request act which is selected in the act decoration stage). In the first case (where two or more different act selection stage rules select the acts), the system may perform a further rule in a further stage of selecting between the acts based on importance. In the second and third case, the two acts form a single outcome (with a single importance score).

As described in relation to the above booking scenario example, at each dialogue turn, a dialogue act is selected based on one or more rules. The rules may comprise a condition evaluated based on the information in the belief state and/or the world state. If a condition is fulfilled, this may select the dialogue act. Alternatively, this may trigger another type of action (for example a booking action, a resolution step, or a world state update), which in turn leads to a selection of a dialogue act through application of a subsequent rule. Where two or more conditions are fulfilled for different rules, two or more dialogue acts may be selected. Alternatively, the dialogue or acts having the highest importance is/are selected.

The above described method may be implemented using three main components: 1) Working memory; 2) Engine; 3) Rules.

This modular design increases the portability of the entire policy engine. The first two components, working memory and engine, may be domain-independent. These may therefore be applied without further fine-tuning to different domains. The only domain-specific component may be the rules. The rules may also be altered by the developer in order to customise the desired behaviour of the system agent, even within the same domain.

The engine is a component that hosts and triggers the rules based on the world state in the working memory. The engine comprises stored code which accesses and reads the rules and, based on the outcome of each triggered rule, modifies the information in the working memory. The rule firing method is a dependency or graph-based approach that handles "layers" of rules (i.e. the stages including initialisation, resolution, world state update and act selection) and fires the ones that match the conditions. In an embodiment, the engine may be implemented using the RETE algorithm which determines when each rule is applied (i.e. when the condition in each rule is evaluated) within a single stage. Alternatively, the conditions for all rules within a single stage may be evaluated at the same time, for each dialogue turn.

As described in relation to the example above, rules are applied in S305 which determine the system response to the input user utterance. Different scenarios within the same domain (i.e. such as restaurant booking, restaurant searching) might require different rules. Some rules may be shared between scenarios however. A stage relating to an update of a world state and a stage relating to act selection, subsequent to the world state update, are used for all scenarios. The rules are applied based on a hybrid control-/data-flow. This means that the composition of the system response is separated in several stages, which are applied in order in a control flow approach, but within each stage the rules are triggered (i.e. if the condition comprised in the rule is fulfilled) based only on the policy input (for example the belief state information) and/or the world state information.

Figure 18:
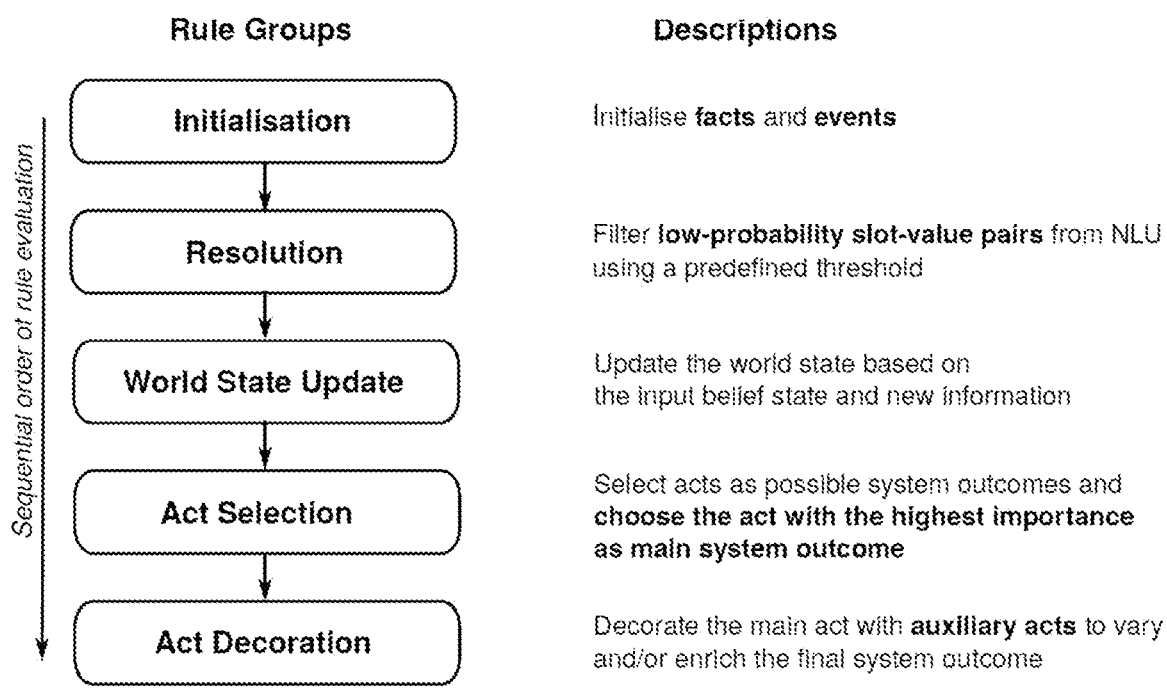
FIG. 18 is an example of the stages used in a policy engine which is used in a dialogue method according to an embodiment.

An example of the stages used in the policy engine in accordance with an embodiment is illustrated in FIG. 18. FIG. 16 described above shows the stages as applied to a booking scenario example, using the hierarchical multi-stage processing. In FIG. 16, it is assumed the Initialisation stage has been completed (i.e. no rules trigger in this stage for each dialogue turn). The figure focuses on the three stages of the pipeline: Resolution, World State Update and Act Selection. The hierarchy of execution is 1. Resolution, 2. World State Update, 3. Act Selection.

The multi-layer or multi-stage design allows changes to be made in one layer of the entire pipeline without editing anything else. For instance, the way the information is filtered in the Resolution stage could be changed without having to change any rules in any other stages. The stages may comprise:

1. Initialisation: in which some or all of the facts and events are initialised (for example matched entities, names, request);
2. Resolution: in which the low probability beliefs are filtered using a pre-defined threshold and the world state is updated based on the belief state information and any other information extracted from the input user utterance (for example user act type and/or requestable slots);
3. World state update: in which the world state is updated based on other external information, for example booking action outcomes or database information;
4. Initial act selection: in which the salient act and slot-values are added, where the system outcome(s) are selected and stored in the working memory;
5. Final act selection, where the system outcome(s) with the highest importance are selected, or a default outcome is selected;
6. Act decoration: where it is determined whether to add an auxiliary act such as confirm, request and/or request more.

As described above, stages 5 and 6 are optional. Stage 1 may also be omitted if no default values are required. The rules are thus divided over multiple stages. Rules related to the Act Selection stage cannot be evaluated before the rules from the Resolution and WS Update phase in a single dialogue turn. The full set of rules is thus divided into stages, where the chronology of rule evaluations is determined by the sequence of stages. By dividing the rules into multiple stages, the order of execution is controlled, and a control-flow mechanism is imposed. For example, one "Act Selection" rule condition may be fulfilled immediately with the current world state, however if the world state update is performed first, the information in the world state may change which will preclude this rule from firing and trigger some other rule (which was disabled by the world state before the update). Thus resolution is performed first (in which the world state is updated based on information from the input utterance and updated belief state), followed by the update of the world state based on external information, and only then the final act selection.

Figure 19:
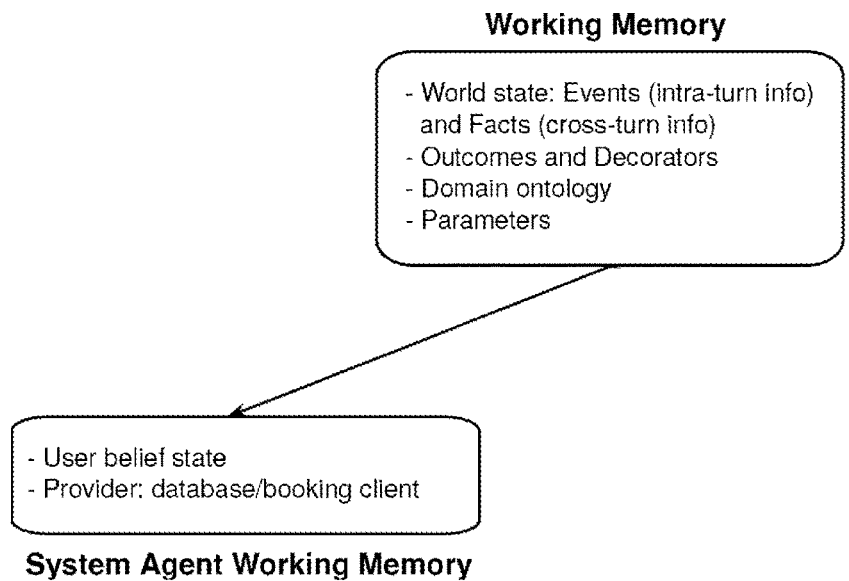
FIG. 19 is a schematic illustration of the information which may be stored in the working memory for the policy method which is used in a dialogue method according to an embodiment.

FIG. 19 is a schematic illustration of the information which may be stored in the working memory for the dialogue policy management performed in S305 in accordance with an embodiment. The working memory component interacts with additional information from the system agent side (e.g., user belief state, and 3rd party APIs). The working memory comprises the world state, as described previously. The working memory may also comprise the domain ontology.

The working memory further comprises the selected outcomes. This information may be stored in the world state for example. The outcome information comprises the collection of system outputs, i.e. dialogue acts, that are selected in stage 4 (i.e. in the initial act selection stage). As described above, the dialogue act is selected by applying the rules in the initial act selection stage. As described above, once all the acts are triggered in stage 4, in a final act selection stage 5, the policy engine may select the outcome or outcomes from the stored outcomes with the highest importance score as the next system act. One of the outcomes will always be part of the next system utterance. One or more "decorator" or "auxiliary" acts may be tied to one or more of the outcomes, as explained previously, and may be included in stage 6. Each outcome may correspond to salient main system act (e.g., OFFER, INFORM). However, additional (auxiliary) "decorating" acts may be added to the main outcome (e.g., adding an auxiliary act CONFIRM in front of the salient outcome OFFER, or an auxiliary act REQUEST after the salient outcome OFFER).

The working memory may further comprise parameters. The parameters allow variation in the behaviour of the system agent. One or more rules may comprise conditions which are dependent on the parameters, or sampling steps which are controlled by the parameters. The parameters may include one or more of:
  entity_num_threshold: if there are at most this many matching entities which satisfy the user's constraints, the system will offer one, chosen randomly;
  confirm_prob: the probability of issuing a confirm act;
  request_more_prob: the probability of issuing a request more act after an offer;
  count_prob: the probability of issuing a count act when there's more than one matching entity;
  max_inform_slot_number: maximum number of slots to inform the user;
  max_request_slot_number: maximum number of slots to request from the user.

In an embodiment, one or more of the pre-specified parameters take on the following values:
  entity_num_threshold=10
  confirm_prob=1.0
  request_more_prob=1.0
  count_prob=1.0
  max_inform_slot_number=2
  max_request_slot_number=2.

Developers can specify dialogue management through a simple interface which enables them to add, edit, or tweak rules, and to control policy parameters.

The system agent working memory comprises the belief state and the database. It may further comprise the booking client, used to execute booking actions. The rules are conditioned on information contained in the working memory and in the system agent working memory.

The implementation of the policy engine itself may be domain-independent, whereas the rules may be changed for different domains and scenarios. An example has been described above in relation to the booking scenario. Different rules may be used for a search scenario for example.

In S306, a text signal is generated based on the dialogue act. The text signal is generated based on a natural language generation process. A pre-trained natural language generation module may be used, to generate a natural language utterance from the dialogue act (e.g. "confirm(Food=Indian)").

Alternatively, natural language utterances corresponding to each dialogue act may be stored. The natural language utterance corresponding to the dialogue act is then selected in S306, from the stored utterances (each mapped to a dialogue act). The stored utterances may be generated during the data generation stage, as will be described below, where user utterances inputted during the data generation stage are stored with associated system actions. Thus a direct mapping from dialogue acts to natural language utterances is stored in this case. For example, utterances corresponding to the generic format of the dialogue act may be stored, as well as information indicating which utterances occurred with which specific slots in the training data (this mitigates inclusion of wrong examples such as "Is British a good part of town?").

The utterance may be directly output to the user as text (e.g. on a screen), or it may be converted to a speech signal using a text to speech system and outputted as audio. Any text to speech process may be used for this final step.

Figure 7:
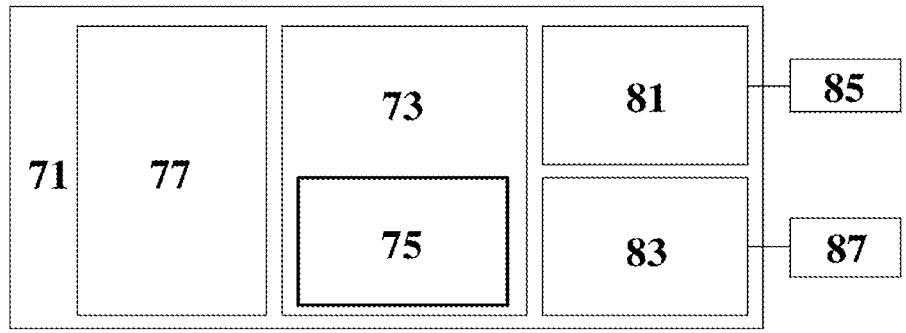
FIG. 7 shows a schematic illustration of a system for generating data for training a dialogue system in accordance with an embodiment.

FIG. 7 shows a schematic illustration of a system 71 for generating data for training a dialogue system in accordance with an embodiment.

The system 71 comprises a processor 73, and takes an input speech signal or text signal and outputs a speech or text signal. A computer program 75 is stored in non-volatile memory. The non-volatile memory is accessed by the processor 73 and the stored code is retrieved and executed by the processor 73. The processor 73 may comprise logic circuitry that responds to and processes the instructions in the stored code. The storage 77 stores data that is used by the program 75.

The system 71 further comprises an input module 81 and an output module 83. The input module 81 is connected to an input 85 for receiving the signal. The input 85 may be a receiver for receiving data from an external storage medium or a network. Alternatively, the input 85 may comprise hardware such as a microphone or keyboard. In the example described below, the input 85 is a keyboard.

Connected to the output module 83 is output 87. The output 87 may comprise hardware, such as a speaker or screen. Alternatively, the output may be a transmitter for transmitting data to an external storage medium or a network. In the example described below, the output 87 is a screen. An example graphical user interface displayed on the screen will be described in relation to FIG. 12.

In an embodiment, the system 71 may be located in a common system with hardware such as a microphone, keyboard and/or speaker for inputting and outputting signals. Alternatively, the system 71 may be a remote system 71, which receives data regarding the input signal transmitted from another unit, and transmits data regarding the output signal to the same or a different unit. For example, the system may be implemented on a cloud computing system, which receives and transmits data. Although in the described system, a single processor 73 located in a device is used, the system may comprise two or more remotely located processors configured to perform different parts of the processing and transmit data between them.

In use, the system 71 receives data corresponding to the input signal through data input 85. The program 75, executed on processor 73, outputs data corresponding to the output signal through the output 87 in the manner which will be described with reference to the following figures.

A method of generating training data in accordance with an embodiment will now be described. For statistical approaches to dialogue system training, labelled training data is used. Task-oriented dialogue systems based on machine learning algorithms learn from the labelled training data. The data generation method and the quality of the resulting labelled data therefore affect the success of the machine learning model. However, obtaining annotated data for supervised machine learning of statistical dialogue systems may require a person to manually provide annotations.

Figure 8A:
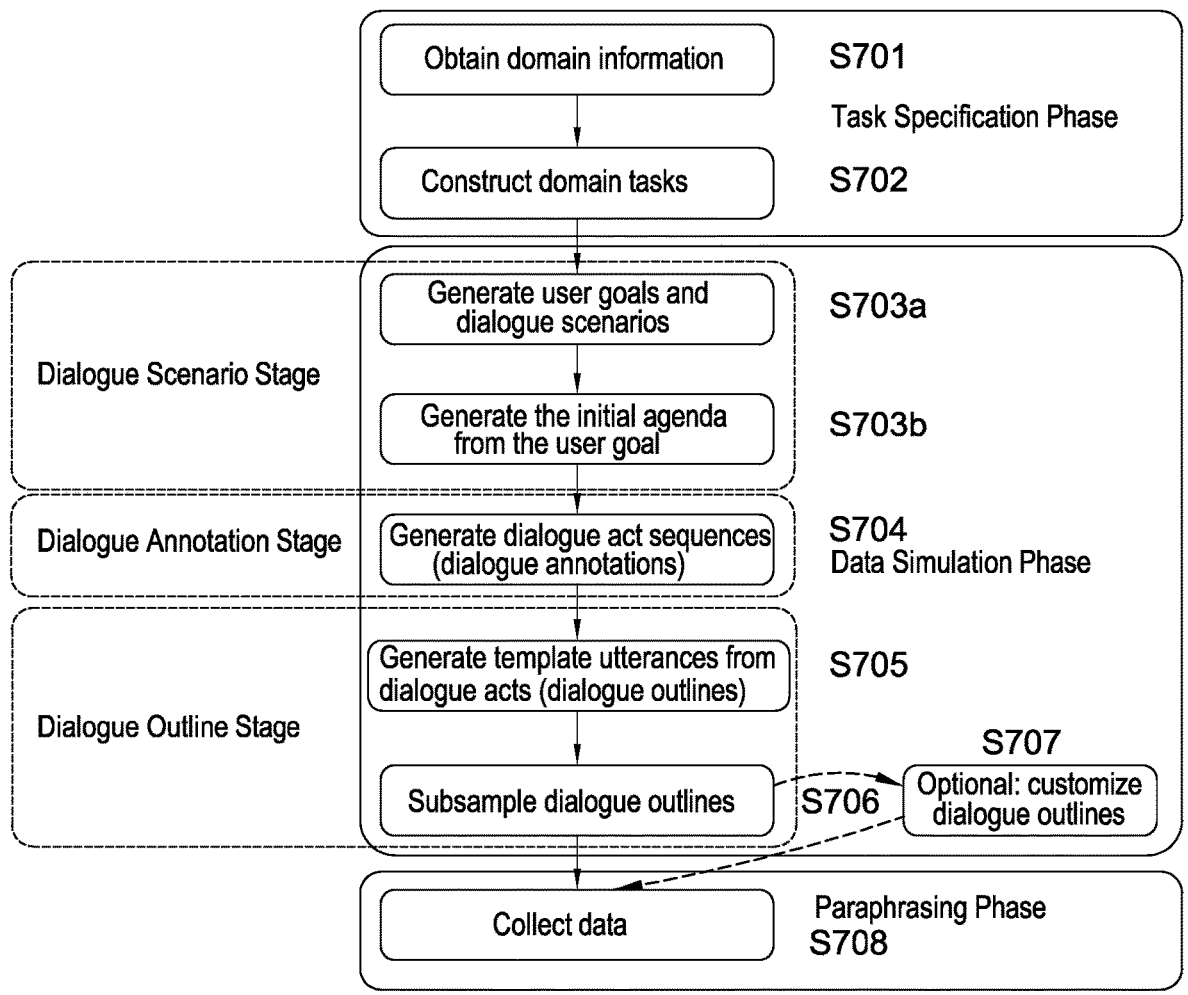
FIG. 8(a) shows a method of generating data for training a dialogue system in accordance with an embodiment and FIG. 8(b) shows an illustration of the stages of the method.
Figure 8B:
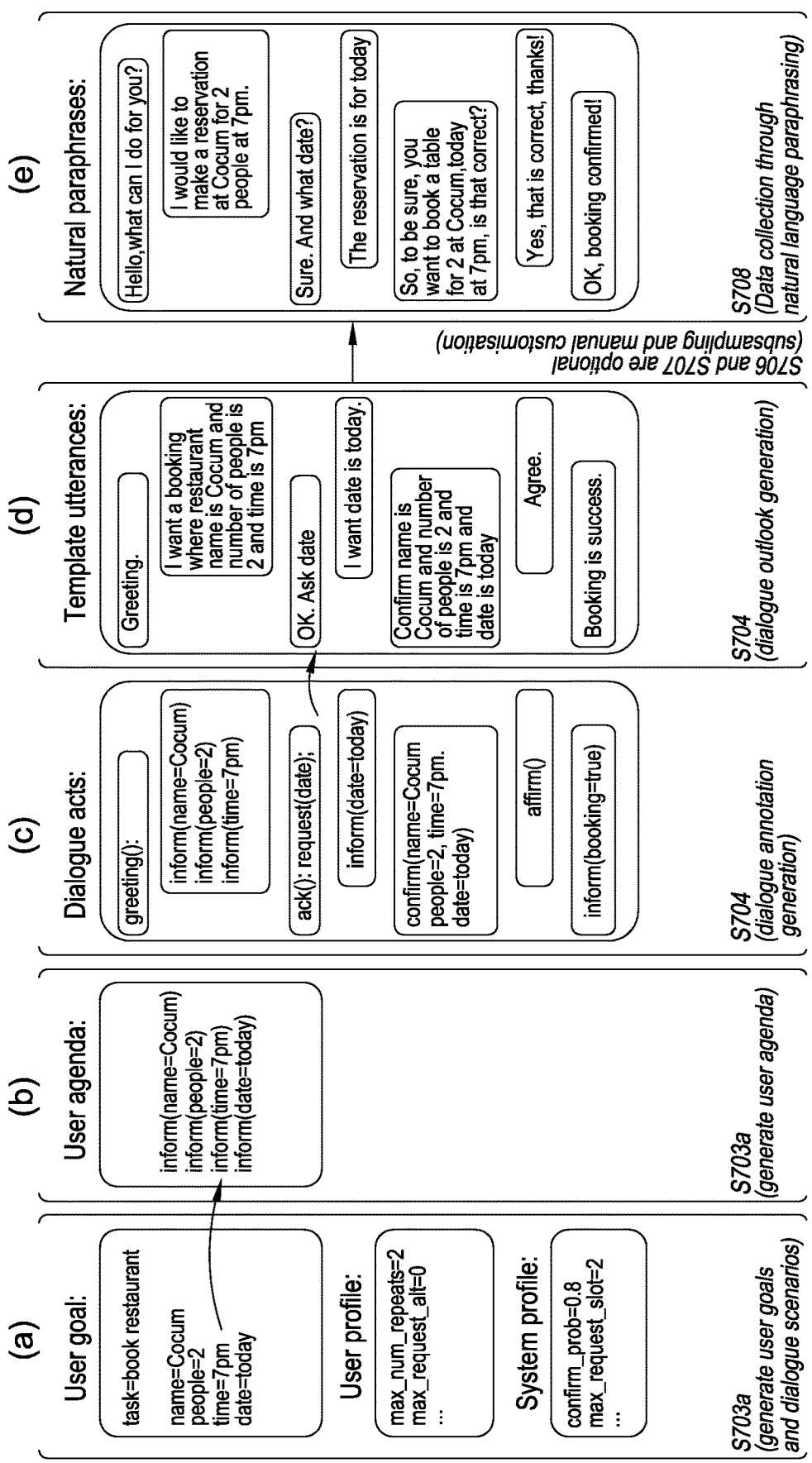

FIG. 8(a) shows a method of generating data for training a dialogue system in accordance with an embodiment. FIG. 8(b) shows an illustration of the stages of the method. In this method, annotations are automatically provided. Human users generate natural language text from the automatic annotations.

In steps S701 and S702, a task or tasks is specified and domain information is obtained. These steps may be performed in any order or simultaneously. The domain information comprises ontology information identifying a plurality of dialogue slots and values. The domain information may further comprise information stored in one or more databases, for example a database of restaurant information or movie information. Obtaining the domain information may comprise a developer selecting from a plurality of options for example, or uploading the domain information.

The domain ontology information may comprise a list of slots and the corresponding values for the domain, such as those shown in FIG. 2(b) for the domain "Cambridge restaurants".

In this step the task and domain are specified (for example restaurant search and booking or movie search and booking). In a task-oriented dialogue, the user wants to accomplish goals with the assistance of the dialogue agent, for example booking movie tickets or reserving restaurant tables. Each goal is associated with constraints that correspond to slots of the ontology, for example the restaurant name, cuisine type, number of people, and price range. A task is specified, and the corresponding domain information, i.e. the set of slots and their possible values, are obtained.

For example, the domain may be "London restaurants". One task could be the search task, where the user just wants to find some information about food options in a particular area of town (e.g. where the user compares locations, prices, cuisines when looking for a convenient place to eat in London). Another task could be the booking task, where the user wants to find out if it is possible to book a specific restaurant for N people at a particular date and time. Combining the functionality of two or more tasks is possible (e.g. search and book). Task-oriented systems may interact with databases which contain information pertaining to the domain. Each entry may comprise data for a restaurant (e.g. specifying its name, address, phone number, cuisine type, area, etc). Based on the values obtained in the dialogue, it is possible to check which restaurants satisfy the current user's search criteria. The domain ontology can be restricted to only a subset of all available information in the database and can be constructed from the database.

In step S703a, a plurality of dialogue scenarios are generated from the domain information, each dialogue scenario comprising one or more combinations of ordered dialogue slots and values referred to as a "user goal". This corresponds to stage (a) in FIG. 8(b). In this step a set of different dialogue scenarios focused on the chosen task are generated. The number of different dialogue scenarios generated in this step may be selected by the developer or may be fixed for example. A set of diverse dialogues which all have the same task (e.g. finding and booking a restaurant or booking a movie) are generated.

The dialogue scenarios may be selected to be as varied as possible. Alternatively, the dialogue scenario generation component can be steered (e.g. by importance sampling) to create scenarios that it is known are not handled well with an NLU model and/or an NLG model. This allows for generating data for specific cases (i.e. "on-demand" data generation) which in turn yields improved NLU and/or NLG modules, and consequently an improved dialogue system.

In this step, pre-built sets of slots, or "pre-built flows", may be used to generate the dialogue scenarios for a specific task. For example, for a restaurant booking task, a pre-defined group of relevant slots may be stored. The values corresponding to the slots are then sampled to generate the different dialogue scenarios. One or more additional slots may be added to the groups during the sampling. The slot order may be pre-defined or may also be varied during sampling. A task may have two or more corresponding pre-built flows, where the pre-built flows are sets of differently ordered slots, or different slots, all related to the task for example. Pre-built flows may be related to well-defined tasks, for example search. One or more of the following high-level pre-built conversational flows may be stored: Entity Search; Entity Booking; Booking Cancel. Each of these corresponds to a group of ordered slots. In the simplest case, selecting the task in S702 may automatically select a pre-built flow corresponding to the task in S703a.

The pre-built flows may also be combined. For example, it may be desired to collect data for dialogues where the users first browse for a restaurant, and then book the found restaurant. This dialogue combines two tasks: 1) search, and 2) booking. Each task may have a pre-built flow (a pre-defined set of slots). A composite flow may then be generated by connecting the "Entity Search" pre-built flow with the "Entity Booking" pre-built flow. The values corresponding to these slots are then sampled to generate the different dialogue scenarios. The order may also be sampled for the different scenarios for example.

Alternatively, instead of using pre-built flows, a set of slots is randomly sampled from the domain ontology. The sampling may be controlled to include one or more mandatory slots. The sampling may be performed in a controlled way to ensure maximum coverage for example, or coverage of particular areas. Alternatively, a set of slots may be manually specified by the user.

The order of the slots may also be generated by random sampling (first of informable slots, then requestable slots for example). Alternatively, the order sampling may be performed in a controlled way to ensure maximum coverage for example, or coverage of particular areas. Alternatively, an order may be manually specified by a user.

One or more mandatory slots may be pre-specified, which must be included in each scenario related to the task. For example, in the task of booking and in the domain of restaurants, the number of people dining, date, time, and the restaurant name may be mandatory slots. These must be specified in each dialogue scenario generated. Similarly, for the task of booking in the domain of movies, the number of people attending, the actual date and time, as well as the name of the movie and the name of the cinema may be mandatory slots.

Once one or more ordered sets of slots are obtained, the values for the informable slots are sampled. In S703a, the method samples a number of informable and optionally requestable slots to represent the user task specified in S702, generating a number of dialogue scenarios. For mandatory slots, for each generated scenario, a value must be sampled for each mandatory slot.

The dialogue scenarios may be generated to comprise slot, value and relation combinations. Thus instead of just sampling a value corresponding to each slot, a value and a relation are sampled. The relations have been described above. Parameters may be used to control the sampling to generate a desired balance between negate and affirm combinations for example. The inclusion of relations enables more complex dialogue acts and consequently capturing a wider range of possible user acts. However, data can be generated for use with a dialogue system without specifying relations.

Decoupling the task specification from the actual data collection allows negation and/or range relations to be simulated in the user behaviour in such ways so as to collect data for modelling negation and/or ranges relations. This decoupling allows for a controllable dialogue flow, but with enough flexibility to collect the data having desired properties (e.g., the occurrence of negation in "Well, definitely not Vietnamese").

Relations, such as "negate", may be included in the dialogue scenario, by allowing for a subset of informable slots to have the relation, e.g. the NEGATE relation. As has been described previously, the relations may allow the user to:

express interest (be it for a particular restaurant, a particular food type, a particular movie genre, a particular date for travel, a particular air carrier), corresponding to the AFFIRM relation;

explicitly declare that he is not interested in a particular value, corresponding to the NEGATE relation;

express a range, for example greater ("No, definitely more than 6") or less ("Indeed, less than 6 people"); or not mention anything about the particular value, corresponding to the NOT_MENTIONED relation.

The dialogue scenarios may alternatively or additionally be generated to include conjunction. In order to generate data in which conjunction is modelled, namely where the user affirms two or more values for a single slot (e.g. I want Greek or Italian food), when defining the dialogue scenarios, it is allowed for more than one value for the same slot to be selected. This may be controlled by another hyper-parameter. Decoupling the task specification from the actual data collection allows conjunction (i.e., multiple intents) to be simulated in the user behaviour in such ways so as to collect data for modelling conjunction. This decoupling allows for a controllable dialogue flow, but with enough flexibility to collect the data having desired properties (e.g., the occurrence of multiple intents as in "I am okay with Italian and French food").

For each generated dialogue scenario, a user goal, comprising one or more values corresponding to one or more slots in the domain ontology, including the mandatory slots, is generated. Relations may also be included. For example, where the movie domain has been selected, and the task is a booking task, first a pre-defined ordered group of slots, including the mandatory slots in the domain ontology (in this case name, theatre, date, time, . . . ), for the task may be selected. Each slot in the group is assigned one or more values from the set of values corresponding to the slot in the domain ontology. Relations may also be assigned. User goals from two different domains may be combined to build a multi-domain dialogue system.

Dialogue scenarios may also be generated with values that are not present in the domain ontology.

A scenario generator samples user goals, for example by randomly choosing the values for every slot. Alternatively, the values may be sampled in a controlled way to ensure that each value occurs at least with a certain number of dialogue scenarios for example. In an embodiment, the values are chosen from a set that includes all available values in the ontology as well as some non-existent values to create unsatisfiable user goals (to provide support for negative outcomes). Relations may also be sampled. Requestable slots may also be sampled.

Optionally, as well as comprising one or more combinations of dialogue slots and values, each dialogue scenario may also comprise sampled user profile information. The user profile helps simulate different types of users (e.g., more patient ones, more verbose ones), which leads to more varied dialogues. A user profile may be defined by one or more parameters. The parameters define the user behaviour in the dialogue. In S703a, for each scenario, the parameters of the user profile are also sampled, to generate a user profile corresponding to the scenario. The sampling may be performed randomly or, for greater variance, sampled in a controlled way to ensure that each parameter value occurred at least with a certain number of dialogue scenarios for example. Thus the dialogue scenario may comprise a user profile sample (in which each user profile parameter has a sampled value) and a user goal (in which each slot has a sampled value). For example, in stage (a) of FIG. 8(b), a sampled dialogue scenario is shown in which there is a User profile and a User goal.

The different user profiles may account for one or more of the following factors: patient vs impatient users (some users might terminate the dialogue more quickly, this can be controlled by the parameters "max_number_repeats" (which may have a default value 2 for example) and "max_request_alternative" (which may have a default value 1 for example)), verbose vs laconic users (some users prefer to utter more information in a single dialogue turn), undecided users (some users might have a goal change in the middle of the conversation, controlled by a parameter "changed_goal_prob" (which may have a default value 0.1 for example)). Some or all of these and other behaviours are controlled by sets of hyper-parameters on the user side. For example, one or more of the following user hyper-parameters may be defined in this step:

active_provide_prob: this parameter decides whether the user will just respond to the last system act passively or whether the user will proactively ask for more information on requestable, binary or informable slots;

request_alternative_prob: after the system offers a restaurant or recommends a cuisine type, the user might continue searching, i.e., ask for an alternative;

max_request_alternative: the maximum number of times the user will ask for alternative in a single dialogue;

max_number_repeats: if the conversation doesn't proceed forward and the system gets stuck, what is the maximum number of repeats of the same information before the user loses patience);

request_prob: this parameter controls whether request acts are added;

changed_goal_prob: the probability that the user changes their goal.

In an embodiment, the following default values may be used:

request_prob=0.5,
changed_goal_prob=0.1,
active_provide_prob=0.6;
request_alternative_prob=0.5;
max_request_alternative=1;
max_number_repeats=2.

The sampling of the user parameters may be performed using a grid search over predefined intervals for each hyper-parameter. The default values specify the centre of the interval in which the values are varied. In step S703a, sampling of user profile parameters may be performed to obtain variability in simulated dialogue scenarios by varying the parameters, ensuring the coverage of very verbose, patient/impatient, talkative users, etc.

The user parameters may further comprise the maximum length of dialogue, given as a maximum number of turns. If the users' goals are not satisfied after the maximum number of allowed turns, the simulated user will terminate the conversation (i.e., they will issue the bye act). In an embodiment, the maximum number of turns is 20.

Optionally, a sampled system profile may also be included. The dialogue scenarios may also account for different states of the third-party (e.g. the restaurant is not available at the particular time or for the particular number of people) in the system profile. These behaviours may be controlled by sets of system hyper-parameters. The list of system hyper-parameters may comprise one or more of the following:

entity_num_threshold: if there are at most this many matching entities which satisfy the user's constraints, the system will offer one, chosen randomly;
confirm_prob: the probability of issuing a confirm act;
request_more_prob: the probability of issuing a request more act after an offer;
count_prob: the probability of issuing a count act when there's more than one matching entity;
max_inform_slot_number: maximum number of slots to inform the user;
max_request_slot_number: maximum number of slots to request from the user.

In an embodiment, the following default values may be used:
entity_num_threshold=10
confirm_prob=1.0
request_more_prob=1.0
count_prob=1.0
max_inform_slot_number=2
max_request_slot_number=2.

The system is controlled by a dialogue policy model (such as described in relation to S204 above for example). The dialogue policy model in turn may be controlled by the specified system profile during the data generation stage, and optionally also during implementation (where default values may be used). The parameters may be built into additional rules in the policy model for example. During data generation, a grid search over the system parameters may be performed (in addition to the user parameters) to account for different system behaviours.

In the booking scenario, the flow is also conditioned on whether the booking succeeds or fails (i.e., when sampling the user goal, we also sample flows with failed bookings). This may be controlled by a further system parameter.

The dialogue scenario comprises the user goal (i.e. an ordered list of slots, with one or more corresponding values), and may further comprise a sampled user profile, and/or sampled system parameters.

In S703b, the slots and values in the dialogue scenario are converted to a sequence of user acts or an agenda. The acts are generated by converting all goal constraints (i.e. the informable slots with the sampled values) into inform acts and all goal requests (the requestable acts) into request acts. A bye act is added at the bottom of the sequence of dialogue acts to close the dialogue act sequence corresponding to the scenario. The user agenda is a stack-like structure containing the pending user dialogue acts that are needed to elicit the information specified in the goal (i.e. the inform and request acts). Thus a user goal is sampled using the system database in S703a, and the agenda is initially populated by converting all goal constraints into inform acts and all goal requests into request acts in S703b.

Figure 20:
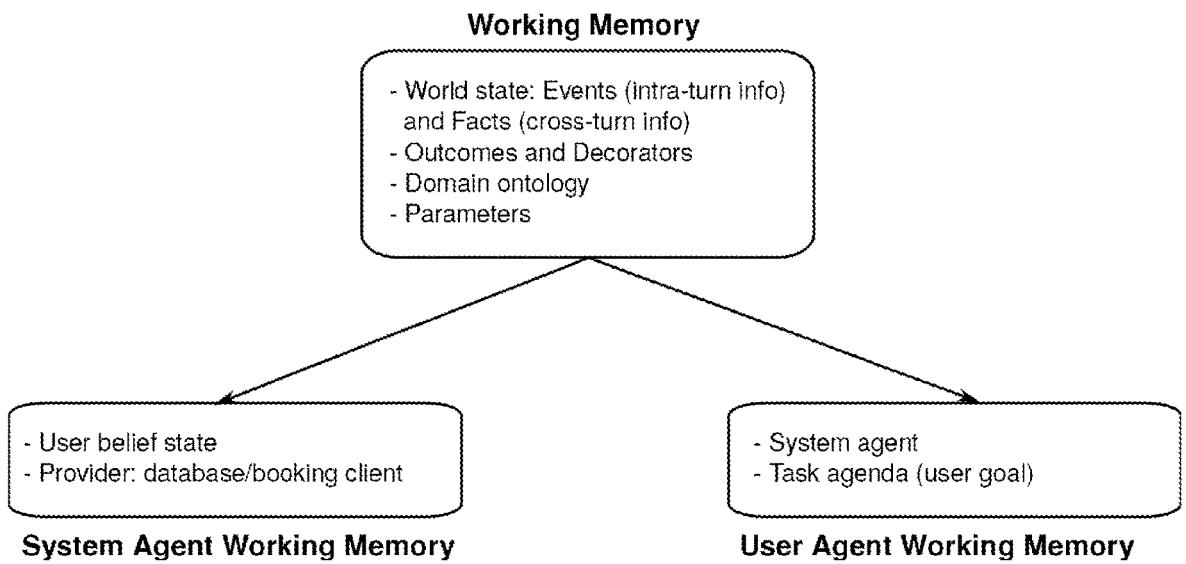
FIG. 20 is a schematic illustration of the information which may be stored in the working memory for the policy method used in a data collection method in accordance with an embodiment.

In S704, dialogue act sequences are generated from the dialogue scenarios. Thus in S703a, many diverse scenarios are sampled, in S703b these are converted into user agendas and then in S704 a dialogue simulation is performed for each scenario to generate the sequences, corresponding to the exchange of dialogue acts between the user and the system. These are generated using a simulated user, the user agenda and a system policy model (such as described in relation to S305 above). FIG. 20 is a schematic illustration of the information which may be stored in the working memory for the dialogue sequence generation, using a dialogue policy model such as described in relation to S305 above together with a simulated user. As well as the working memory and system agent working memory described above, the user agent working memory comprises the system agent and the task agenda generated in S703b.

A set of possible dialogue actions or act types for the user are pre-specified and stored. The set includes the request and inform actions. The request and inform actions are combined with the slots in the scenario to generate the user agenda in S703b. The set may further comprise discourse and confirm acts. The set may comprise one or more of the following:
user_discourse:
  greeting( )
  goodbye( )
ack_confirm: reply to system's confirmation.
  affirm( )
  negate( )
  inform(slot=val)
  inform(slot=dontcare)
ack_request:
  affirm( )
  negate( )
  inform(slot=val)
  inform(slot=dontcare)
user_statement: provide information about the user task (pop stack).
  inform(slot=val)
  request(slot)

As has been described above in relation to S305, a set of possible dialogue actions are also pre-specified for the system.

The actions used by the system and the user may comprise one or more of: inform, request, offer, confirm, select, request all, count, no other, unavailable, negate, affirm, greeting, unknown, goodbye and request more. It is possible to extend the set of acts by adding new acts.

In this step S704, a dialogue self-play between a user simulator and the policy model is performed for each dialogue scenario, producing dialogue act sequences. One dialogue sequence is generated for each scenario. In this step, a dialogue sequence corresponding to each dialogue scenario, each dialogue sequence comprising one or more dialogue acts is generated. The dialogue sequence may be used as the annotations during training, and therefore is also referred to as the annotations. The annotations may be used for the SLU training as will be described below. The goal of the trained SLU module is to correctly classify all the information stored in the annotations, such as the current user act (using the dialogue act classifier), as well as slot-value pairs and relations (using the SLU and DST modules) across each turn. The dialogue annotations comprise a sequence of issued dialogue acts both from the user and the system, as illustrated in the following example dialogue scenario:
U: inform(cuisine=British),
S: confirm(cuisine=British); count(cuisine=British), offer (The Jersey Pub, cuisine=British);
U: request_alternative( )
S: offer(The Granta, cuisine=British)

The user simulator described in this example is an agenda-based simulator, however other methods of generating the act sequences are possible. The agenda generated in S703b is taken as the initial agenda. The agenda based simulator comprises a set of pre-defined rules and the initial agenda, comprising the ordered user acts (request and inform). The order of slots in the user goal determines the initial agenda, but new acts may be put on top of the agenda based on the rules, which may be conditioned on the system response and the user parameters. For example, if the system issues an act asking for a CONFIRM, the user responds by AFFIRMing or NEGATing (based on the rules, which put the AFFIRM/NEGATE act to the top of the user agenda). The user then continues towards the goal by issuing the next INFORM act from the original user agenda, again based on the rules. New acts may be added on top of the agenda based on the rules, for example: 1) if booking failed, the user can ask for a different restaurant, or 2) if booking failed, the user can ask for a different date or time, or 3) the user has to confirm what the system asked in the previous act, etc. This means that additional acts such as AFFIRM and NEGATE can be generated as the conversation progresses. The user action selection model (i.e. comprising the pre-defined rules) is conditioned on the user profile (i.e. the parameters) in addition to the user goal (user agenda) and dialogue history (i.e. the previous system act). As the dialogue progresses, the agenda is dynamically updated by the rules and acts are selected from the top of the agenda to form the next user acts. In response to incoming system acts from the system agent, new user acts are put onto the agenda and no longer relevant ones are removed, based on the rules. The agenda thus tracks the progress of the dialogue as well as encoding the relevant dialogue history. Selecting the next user act corresponds to taking n items from the top of the agenda stack.

Figure 9:
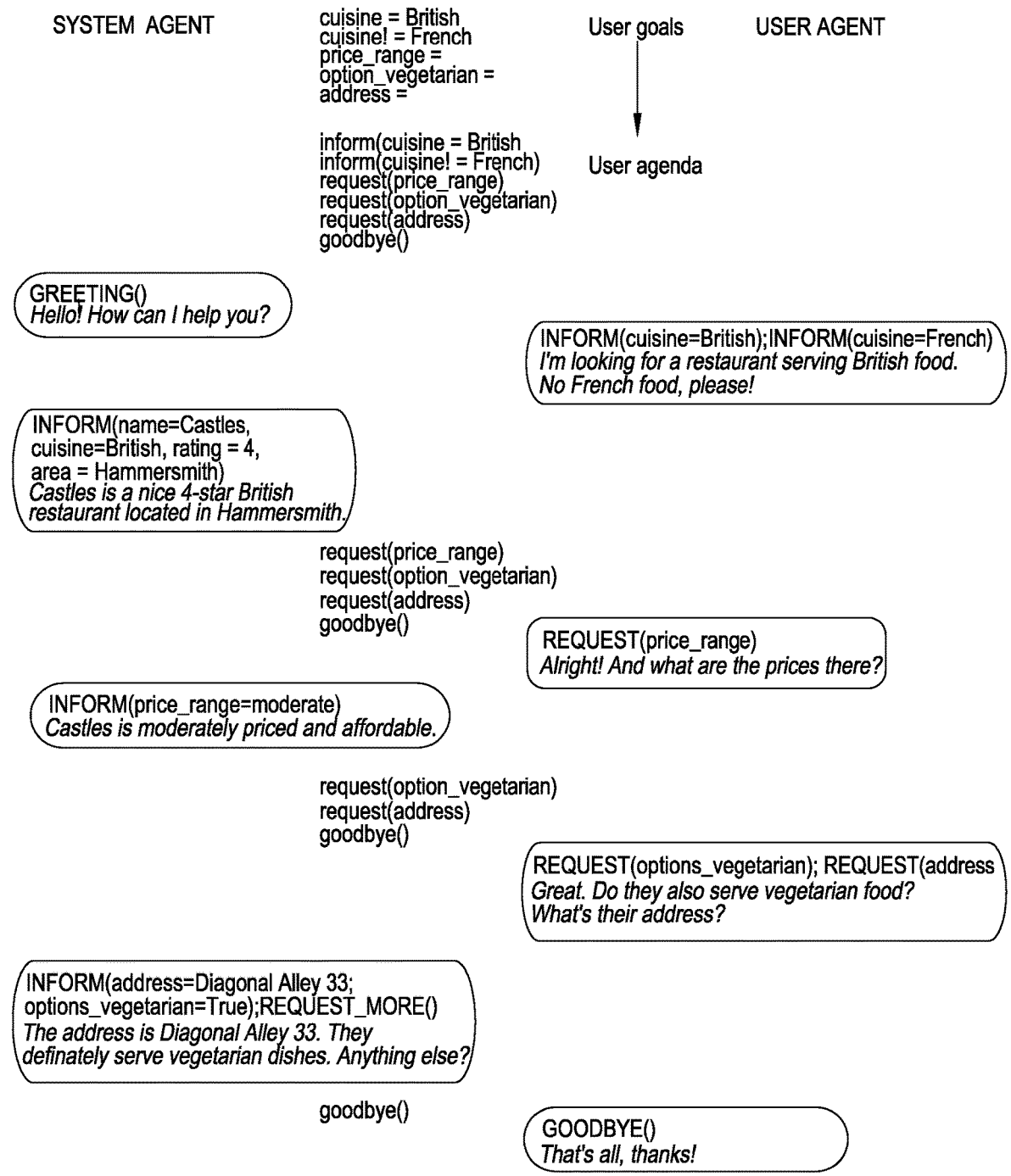
FIG. 9 shows example dialogue annotations together with user agendas and the user goal.

Thus in S704, the dialogue act sequence is generated using a simulated user and the policy model, from the stack of dialogue acts generated in S703b. The dialogue scenario is implemented as a stack-like structure containing the pending user dialogue acts (simulated user) that are needed to elicit the information specified in the goal, i.e. the dialogue act sequence generated in S703b. This simulated user and policy model are then used to model the conversation at the semantic level in S704. The beginning of an example dialogue act sequence is shown in FIG. 9.

The dialogue act sequences generated in S704 are shown in stage (c) of FIG. 8. The dialogue outlines are then generated from the dialogue act sequences in S705. The dialogue outlines, or template utterances, are shown in stage (d) of FIG. 8. The generated outlines comprise multi-turn dialogues in an unnatural machine-generated language (which could be achieved by relying on a set of simple grammar rules, as described below). Thus in S705 after the design of the dialogue sequence, each dialogue act is mapped to a description explaining its intent. This allows the users to understand what each dialogue act means when paraphrasing the outline in S708 (described below). This conversion to the dialogue outline may be done using a set of simple rules mapping raw dialogue acts into template utterances. This mapping can be based on a predefined grammar, but can also be customised by adding additional rules. S705 is optional, and alternatively the users may be presented with the dialogue act sequences, i.e. the raw annotations. The generation of dialogue outlines is performed to facilitate the final paraphrasing step conducted by humans, but the paraphrasing can be performed from the annotations instead.

In an embodiment, the transition from annotations (i.e. the dialogue act sequences generated in S704) to outlines is performed in S705 using a domain-independent grammar which is parametrized by the actual domain ontology. In other words, the transition may be achieved by relying on a set of simple transformation rules which convert annotations to sentence-like structure. For example, the annotated act inform(date=tomorrow, time=evening) would map to a template ($slot is $value) (and ($slot is $value)). The template utterance for this example is then Date is tomorrow AND time is evening. The act "Request Alternative" may be mapped to the template "Do you have any alternatives?" and so on. Below is shown an example code mapping from dialogue acts to template utterances:

```
def _template_system_act(self, act):
    labels = [(slot, relation, value)
                for slot, relation, value in act, slot_relation_values( )]
    slot_tree = _get_normal_slot_branch(labels)
    if act.act_type( ) == system_act_pb2.SystemAct.INFORM:
        template = "Inform %s," % self._template_slot_tree(slot_tree)
    elif act.act_type( ) == system_act_pb2.SystemAct.REQUEST:
        slots = (self._get_slot_realisation(slot)
                    for slot, _, _ in iter(labels)]
        template = "Ask if any preference about %s." % (
            "AND ".join(slots))
    elif act.act_type( ) == sysstem_act_pb2.SystemAct.OFFER:
        template = "How about %s?" % self._template_slot_tree_(slot_tree)
    elif act.act_type( ) == system_act_pb2.SystemAct.CONFIRM:
        template = "So, you want %s?" % self._template_slot_tree(slot_tree)
    elif act.act_type( ) == system_act_pb2.SystemAct.REQUEST_ALTERNATIVE:
        template = "Maybe try %s?" % self._template_slot_tree(slot_tree)
    elif act.act_type( ) == system_act_pb2.SystemAct.COUNT:
        count, = [value for slot, _, value in act.slot_relation_values( )
                    if slot == "count"]
        template = ("There exist %d items where %s." %
                    (count, self._template_slot_tree(slot_tree)))
    elif act.act_type( ) ==system_act_pb2.SystemAct.NO_OTHER:
        template = "Sorry, I don't have any alternatives!"
    elif act.act_type( ) == system_act_pb2.SystemAct.GREETING:
        template = "Greetings ! How can I help?"
    elif act.act_type( ) == system_act_pb2.SystemAct.CANT_HELP:
        slots = [slot for slot, _, value in act.slot_relation_values( )]
        if len(slots) > 0: # there exists a slot to talk about
            template = (
                "Sorry, I cannot help you with the value of slot %s." %
```

An alternative example is also shown below:

```
def user_template(self, user_action, slu_labels, system)acts):
    """Creates a template from the given user action and slu labels.
    Args:
        user_action: the 'UserAction'.
```

```
    slu_labels: a list of 'SLULabel's associated with the user's turn.
    system_acts: the 'SystemAct's of this turn.
Returns: (string) the user template.
""""""
slu_labels = [(slu_labels.slot, slu_labels.label_type,
                _str_vlaue_from_label(slu_label, key="value_oneof"))
              for slu_label in slu_label)
requestable_slots = _get_requestable_slots(slu_label)
informable_branch, implicit_affirm_token = (
    self._add_implicit_discourse(user_action, slu_labels, system_acts)
if user_action == user_action_pb2.INFORM:
    messages = ( )
    if len(informable_branch) > 0:
        messages.append("I want %s" %
                        self._template_slot_tree(informable_branch))
    if len(requestable_slots) > 0:
        slots = [self._get_slot_realization(slot)
                 for slot in requestable_slots]
        messages.append("Ask %s" % " AND ".join(slots))
    template = "%s." % ",".join(messages)
elif user_action == user_action_pb2.REQUEST_ALTERNATIVE:
    template = "Do you have any alternatives?"
elif user_action == usser_action_pb2.FINISHED:
    template = "Thank you, goodbye!"
elif user_action == user_actin_pb2.INITIATE.BOOKING:
    if len(informable_branch) <= 0:
        template = "Can I make a reservation?"
    else:
        template + ("Book it for %s." % self._template_slot_tree(
                    informable_branch))
elif usser_action == user_action_pb2.CONFIRM_BOOKING:
    template = "Yes, please book it for me."
```

The transition from dialogue annotations (i.e. act sequences generated in S704) to dialogue outlines (template utterances generated in S705) and then to the actual natural language utterances (in S708) is illustrated in the Table 1 below. The Table 1 below shows an example of 1) dialogue annotations converted to 2) template utterances, and then 3) paraphrased to NL utterances based on the domain Cambridge restaurants and the task restaurant booking.

annotations). In S705, the dialogue annotations are converted to template utterances (i.e. generating the dialogue outline) and in S708 a step of paraphrasing the template utterance by humans, i.e., replacing simple machine-generated template utterances with natural language while preserving the uttered content is performed.

The automatically generated dialogue outlines are used to guide the paraphrasing process performed in S708.

TABLE 1

| Annotations | Templates (Outline) | Paraphrases |
| --- | --- | --- |
| S: greeting( ) | Greeting. | Hello, what can I do for you? |
| U: inform(name = Cocum); inform(people = 2); inform(time = 7pm) | I want a booking where restaurant name is Cocum and number of people is 2 and time is 7pm. | I would like to make a reservation at Cocum for 2 people at 7pm. |
| S: ack( ); request(date) | OK. Ask date. | Sure. And what date would that be? |
| U: inform(date = today) | I want date is today. | The reservation is for today. |
| S: confirm(name = Cocum, people = 2, time = 7pm, date = today) | Confirm name is Cocum and people is 2 and time is 7pm and date is today. | So, just to be sure, you want to book a table for 2 at Cocum, today at 7pm, is that correct? |
| U: affirm( ) | Agree. | Yes, that is correct, thanks! |

Thus in S703b, raw user dialogue acts are generated from the dialogue scenarios which get converted to full annotations (i.e. dialogue act sequences) using the system agent in S704 and then to dialogue outlines (translated from annotations to the unnatural limited machine-like language or template utterances) in S705, which then get paraphrased by humans to the final dialogues provided in natural language (or NL utterances) in S708, as will be described below.

The full process is shown in FIG. 7, including specifying the task and obtaining the domain ontology information and database (S701 and S702), generating a dialogue scenario (S703a), converting the scenario into the initial user agenda (S703b), performing the interplay between the simulated user and the system agent (S704), where this step generates a conversation as an exchange of raw dialogue acts (i.e.

Examples of such outlines are (e.g., "I want price range is NOT expensive AND price range is moderate"). FIGS. 10(a) and (b) show parts of example simulated dialogues with dialogue annotations, dialogue history, and template utterances (outline). In each turn, the corresponding annotations for SLU labels are provided. These provide information on which act and which slot-value pairs have been uttered by the user in the particular turn, and optionally relations. State labels comprise the (slot, value, relation) triplets mentioned so far in the conversation, i.e. the SLU labels from all the previous turns in this case. In each turn the field last_system_template corresponds to the field last_system_act, and the field current_user_template corresponds to the fields user_action and slu_labels (which denote the current user act). Each dialogue turn gets assigned annotations in this manner (as provided in fields "last_system_act", "user_action", "slu_labels", "state_labels"). S705 is optional however, and alternatively the users may be presented with the dialogue act sequences, i.e. the raw annotations.

Thus in S703 to S705, dialogue outlines are extracted from the simulation. A variety of dialogue outlines are generated by sampling a wide variety of scenarios (in S703a) and by varying and exploring a wide range of hyper-parameters (in S703a). By sampling different slots, different orders for slots, as well as different values to be assigned to the slots, accompanied by hyper-parameter-controlled user and system profiles, variance in generated dialogue outlines can be ensured.

Prior to the data collection step S708, sub-sampling of the dialogue outlines is performed in S706 to generate a sub-set of dialogue outlines for data collection. This step is performed in order to provide a reduced set of outlines for data collection, whilst still retaining desired coverage in the data. For example, a sub-set aimed at providing coverage over one or more of the system acts, user acts, different slots associated with system acts and user acts, different values, as well as over relations associated with different slots and values may be generated in this step. The sampling may be performed using a greedy subsampling algorithm for example.

One or more of the following measures may be used to compute the coverage:
  counts associated with each possible system act;
  counts associated with each possible user act;
  counts associated with each (single) slot;
  counts associated with (system-act, slot) pairs;
  counts associated with (slot, relation) pairs for the user;
  counts associated with (system-act, slot, relation);
  counts associated with each (single) slot value pair;
  counts associated with (system-act, slot, value) combination;
  counts associated with (slot, value, relation) combinations for the user;
  counts associated with (system-act, slot, value, relation) combinations.

A count may be kept for each possible item within the categories used as the sampling is performed, e.g., for the item User-act: INFORM(food) in the category "user act", the initial count is set at 0. Each time an outline is added to the sub-sample, 1 is added to the count each time an instance of the user act INFORM(food) is found in the outline. A count is also kept for the user-act: .REQUEST_ALTERNATIVE, etc. Where only the "user act" category is used (the coverage is determined by counts associated with each possible user act only) the system samples so as to add dialogues which increase the current coverage the most, as defined by a coverage improvement function, for example, a dialogue which moves the most zero counts to non-zero counts for items in the category. More than one category may be used. In an embodiment, the coverage improvement function moves the most zero counts to non-zero counts. Other coverage improvement functions could be used.

In an embodiment, the method over-generates dialogue outlines, and then subsamples a smaller number of the dialogue outlines for maximum coverage in S706. An example implementation of the greedy approach example is illustrated below:

```
def _sample_dialogues(dialogs, stats_computer, sample_size):
    if sample_size >= len(dialouges):
        glog.warning(
            "- - sample_size %i is larger than the number of dialogues %i, "
            "so returning all dialogues.", sample_size, len(dialogues))
        return dialogues
    subset = [ ]
    for _ in range(sample_size):
        # Select some random dialogue to consider adding to subset.
        smaple_size = min(_SEARCH_WIDTH, len(dialogues))
        candidate_indices = random.sample(range(len(dialogues)), sample_size)
        improvements = [
            ( stats_computer.coverage_improvement(dialogues[index]), index)
            for index in candidate_indices]
        _, best_index = max(improvements)
        subset.append(dialogues[best_index])
        stats_computer.add_simulated_dialogue(dialogues[best_index])
        del dialogues[best_index]
    return subset
```

In this step, a function that computes coverage improvement for each dialogue outline that is added to the subset of subsampled dialogue outlines is used. This coverage improvement function can be defined in multiple ways. In an embodiment it is defined as a dialogue which moves the most zero counts to non-zero counts. Alternatively however, it could be finding a dialogue which updates the most items with the currently lowest count, or finding a dialogue which updates the largest number of counts regardless of the actual count for example. Once the coverage improvement function is defined, an example procedure is as follows.

N (corresponding to the sample_size) is the number of dialogue outlines desired in the final subset of sub-sampled dialogues. In each step, a dialogue outline with the maximum value for the coverage improvement function (described above) is found and added to the pool of final dialogue outlines (i.e. the greedy approach). This is repeated N times, until the pool comprises N dialogue outlines.

The parameter SEARCH_WIDTH controls the size of the sample which is used to find the best dialogue to add in each step. This may be used for efficiency reasons, since for large sets of dialogue outlines it may not be feasible to iterate over the entire pool each time i.e., SEARCH_WIDTH <<NUMBER_OF_ALL_DIALOGUE_OUTLINES. A different sample of outlines is used each step, and it is always a random sample from the remaining pool of dialogues (i.e., excluding the ones already added to the set of sub-sampled dialogues).

The sub-sampling step S706 reduces the number of dialogue outlines that have to be collected in the final paraphrasing step, whilst having a reduced or no detrimental effect to the final dialogue system quality. It may provide high coverage, which maintains variability whilst avoiding repetition and saturation in the obtained data.

The method thus over-generates simulated dialogues (i.e. dialogue outlines) in S701 to S705, but then samples from the set to get good distribution of data in S706. For example the sampling may ensure maximum coverage of one or more of: slots, relations, user actions, system act types, etc. This wide coverage maintains generalisability for the model trained on such data, and will allow generation of training examples for important data in the ontology.

Experiments performed show an NLU module trained on the full set of dialogues (approx. 10K dialogues) gives comparable results to an NLU trained on a subsampled 1/10 of the entire set (approx. 1K dialogues), using the sub-sampling procedure described above. A further step S707 may also be included, allowing the user to manually adjust, select or remove outlines.

Given the annotations of the dialogue (the exchange between user and system in dialogue act formats), the users are presented with an original conversation expressed in the outlines (or alternatively annotations), and asked to write fluent natural sounding paraphrases to replace them in S708. For instance, the annotation "Request cuisine AND Request price range" becomes the following natural sentence "Do you have any preference for cuisine type and how much you want to pay?". This paraphrasing step is the actual data collection step S708, explained below.

Figure 11:
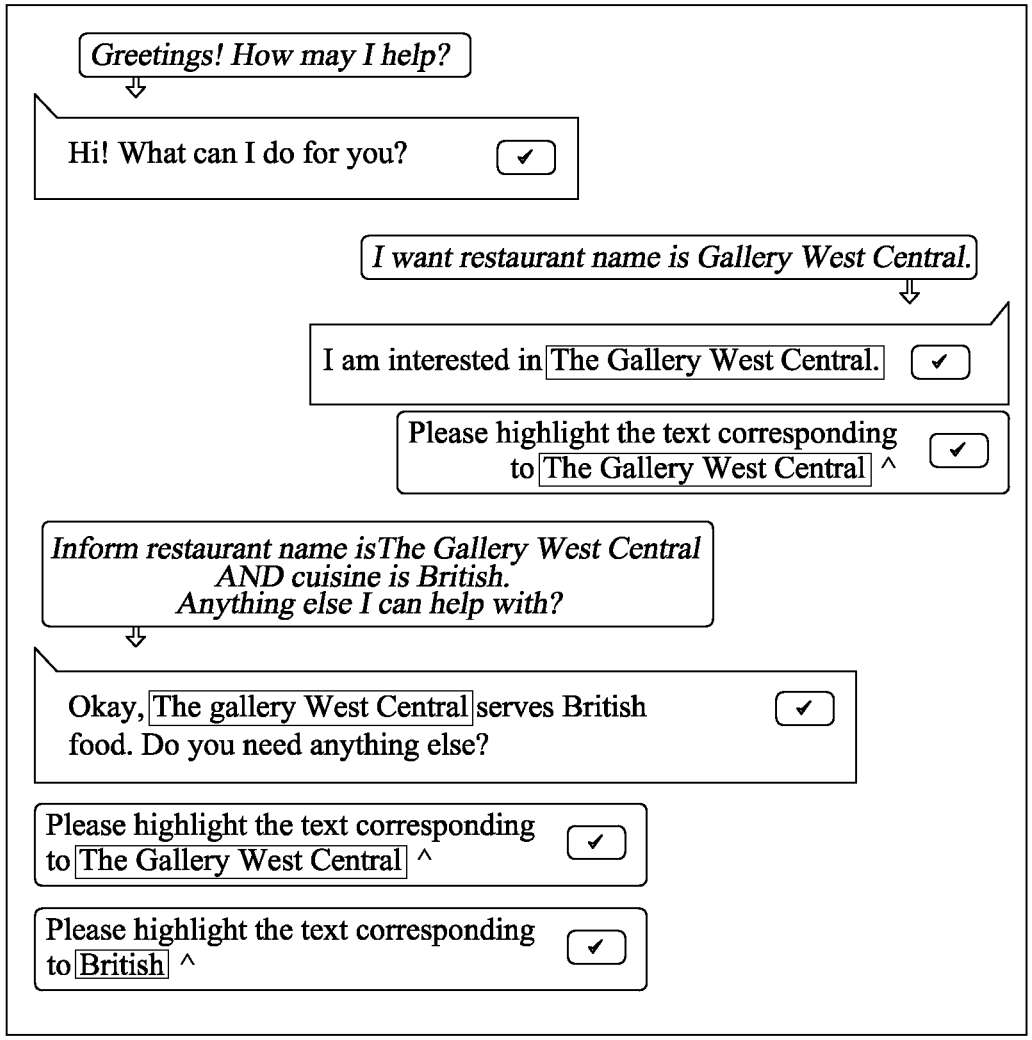
FIG. 11 shows an example web-based user interface for performing a data generation method in accordance with an embodiment.

In S708, the sub-set of dialogue outlines are presented to one or more human users using a data collection user interface tool. An example data collection user interface tool is shown in FIG. 11. In this step, data comprising speech or text signals corresponding to paraphrased versions of the sub-set of dialogue outlines are collected. The human users take up the roles of both the system and the actual user in the data collection step.

In an embodiment, users input the paraphrased versions through typing instead of using speech. This allows the user to use more sophisticated and varied language, allowing collection of more varied data and paraphrasings, which in turn allows the Machine Learning based models to learn from more flexible language and generalise better. Adaptation to more varied language leads to better and wider natural language understanding.

In the data collection phase, given the dialogue annotation (the exchange between user and system in dialogue act formats), the user is presented with a turn expressed in the handcrafted outline format, and asked to write paraphrases to replace them. Composite dialogue acts can be used, because the responses can be directly rewritten by users. In other words, multiple dialogue acts can be combined in one user or system utterance (e.g. combining CONFIRM with INFORM or combining two INFORMS or combining AFFIRM with REQUEST). The composite act can be transformed into a single natural sentence: "Exactly, I want to book it for 4 people." or "Not French, I want British food." The simulated user and policy model may be configured to issue composite dialogue acts. The frequency at which composite acts is issued may be controlled by a hyperparameter.

In this method, the dialogue turn annotation step is thus performed automatically, prior to the actual data collection S708. The data collection step S708 concerns only the collection of paraphrases based on conversational templates (i.e., dialogue outlines) and optionally current dialogue context. Paraphrases, that is, natural language acts for automatically generated dialogue outlines are collected, and therefore these do not have to be manually annotated. The complex annotation task is performed by the simulated user and dialogue policy model prior to the natural language collection step.

In an embodiment, a plurality of paraphrases are collected for the same automatically generated templates (dialogue outlines). This accounts for semantic variability, and enables models trained on such data to deal with different utterances of the same (sentence-level and concept-level) meaning.

In FIG. 11, which shows a web-based user interface for data collection, the italic text in rectangles above the speech bubbles (e.g., the text such as "I want restaurant name is The Gallery West Central") refers to template utterances (generated in S705) that have to paraphrased. The user enters the paraphrase in an empty speech bubble so that the meaning of the template utterance is fully preserved in the generated natural language utterance ("I am interested in The Gallery West Central"). The interface is designed in a way that the task is simple for untrained non-expert human subjects: they simply generate fluent (native) paraphrases from outlined simulated dialogues.

In the data collection step, all simulated dialogues (i.e. dialogue outlines) in the sub-sample are converted into a data collection task for users. The simulated dialogues (dialogue outlines) are presented to users who provide paraphrases corresponding to the automatically-generated templates. Each simulated dialogue (dialogue outline) can be seen as one paraphrasing task, while each dialogue turn in each dialogue (with its conversational context provided) can be seen as one paraphrasing subtask.

Optionally, the paraphrasing step S708 is performed asynchronously. This means that one user paraphrases only part of the dialogue, for example one dialogue turn, and is not required to paraphrase the entire dialogue. It allows parallelised data collection and to collect more varied paraphrases from multiple users. One user need not paraphrase the entire dialogue outline (i.e. all template utterances from the same dialogue). The entire dialogue is split into dialogue subtasks, for example dialogue turns, which can be presented to users separately.

Optionally, the asynchronous collection also includes the context of the dialogue. Template utterances of all prior turns are shown to provide the context of the current turn. Asynchronous contextualised paraphrasing means that although one user paraphrases only one turn (for example), they are aware of the previous context. The dialogue context is presented to the users (i.e. the previous dialogue turns), providing context-aware asynchronous data collection. This contextualisation improves the quality of paraphrases. In an embodiment, they are informed about previous dialogue context (i.e., all previous dialogue turns) and are also informed about the current intent (the current dialogue turn i.e. the latest system response and the current user template utterance which express the current user intent).

Optionally, concept highlighting is used in the data collection step S708. Concept highlighting means the user is requested to provide a direct link from each value in the dialogue outline to where this value was mentioned in the natural language utterance entered by the user. The user may additionally or alternatively provide a link for the slots for example. Concept highlighting allows generation of semantic dictionaries, which as described above may be used during training and implementation for delexicalisation-based models. The users specify which part of the paraphrased sentence refers to which part of the input template (dialogue outline). For example, the user associates the automatically generated template "price range is moderate" to the paraphrase "moderately priced place", or associates the annotation "offer(alcohol=True)" with "a restaurant which serves alcohol" (when annotations rather than templates are used).

As has been described above, semantic dictionaries are lists of re-phrasings which may be used for delexicalisation-based training and implementation. They link the same concept (e.g., cheap) to different utterances in the human language (cheap={cheap, not expensive, inexpensive, something cheap, cheaply, not so expensive, very affordable}). This helps the delexicalisation-based model to handle semantic variability in the human language. Concept highlighting enables the generation of a seed set of delexicalisations (through the paraphrasing) which then may then be used by the Natural Language Understanding module during implementation as described above and during training. This removes or mitigates the need to use manually pre-compiled semantic dictionaries as input to the delexicalisation-based module. The concept highlighting process creates such semantic dictionaries during data collection automatically. Further re-phrasings may be manually added to the semantic dictionary however if desired. This approach enables creating such dictionaries (through data collection) also for other languages and new domains, for which these hand-crafted resources are scarce or even non-existent.

The data generated in the above described method may be used to train a dialogue system, for example it may be used to train the natural language understanding module comprising the spoken language understanding and dialogue state tracking steps described above. However, the dialogue system described above may alternatively be trained on data generated in some other manner, for example using a machine to machine method. Furthermore, data generated in the above described manner may be used to train other dialogue systems. Examples of collected data, together with the annotations are shown below:

"Hello, How may I help you?" GREETING
"I want to inquire about YO! Sushi Hammersmith/Fulham." INFORM(name="Yo! Sushi Hammersmith/Fulham")
"Yo! Sushi Hammersmith/Fulham is a wonderful 4 star Japanese restaurant that is located in quiet neighbourhood of Hammersmith." INFORM(name=YO! Sushi Hammersmith/Fulham", cuisine="Japanese"; neighbourhood="Hammersmith", rating=4)
"Do they have vegetarian options and what is their price range?" INFORM(request="price range", request="options vegetarian")
"YO! Sushi Hammersmith/Fulham has a moderate price range fitting for everyone and it is unknown if they have vegetarian options. Anything else you need help with?" REQUEST_MORE
"Thank you, goodbye." FINISHED
"Hello, How may I help you?" GREETING
"I want to inquire about a restaurant name Castles." INFORM(name="Castles")
"There is a 4 star British restaurant name Castles that is located in the neighbourhood of Holloway. Anything else you need help with?" REQUEST_MORE
"Could you have it book on 2018/05/08 for 9 people." INITIATE_BOOKING(date="2018/05/09", people=9)
"Is there a specific time you would like?" REQUEST(time)
"Have it book for 11:30 AM." INITIATE_BOOKING (time="11:30 AM")
That is a reservation at Castles on 2018/05/09 for 9 people at 11:30 AM correct?" CONFIRM(time="11:30 AM", date="2018/05/09"; people=9, name="Castles") "Yes, please book it for me." CONFIRM_BOOKING
"Okay, I have succeeded in booking a reservation on 2018/05/09 for 9 people at 11:30 AM at Castles." INFORM (booking_succeded=true, time="11:30 AM", date="2018/05/09", people=9, name="Castles")
Thank you. Bye." FINISHED As described above, the collected data may additionally be used for the Natural Language Generation (NLG) step S206, S306 of the dialogue system described above, which outputs system responses after the dialogue manager policy model determines the next system action (in S205). The Natural Language step S306 may re-use paraphrases generated by users in the data collection step as a set of possible system utterances that correspond to the current dialogue act chosen by the system accordingly. In other words, rather than a trained natural language generation system, user utterances inputted during the data collection step S705 are stored with associated system actions. These are then used during implementation. The system thus has a less varied, cleaner and more fixed set of phrases when communicating with the users. However, these phrases will still be uttered in truly natural language, due to the way they were collected i.e. users enter sentences corresponding to each dialogue act, meaning that for each dialogue act there is already a natural language realisation. Thus during the training stage, it is not required to learn a NLG model. Rather, the stored collected sentences are just sampled for each dialogue act during implementation. For each dialogue act a realisation has already been collected. Thus it is possible to just sample from the collected sentences for each dialogue act. Thus a direct mapping from dialogue acts to natural language utterances is stored. Alternatively however, a NLG model may be trained on the collected data.

Figure 12:
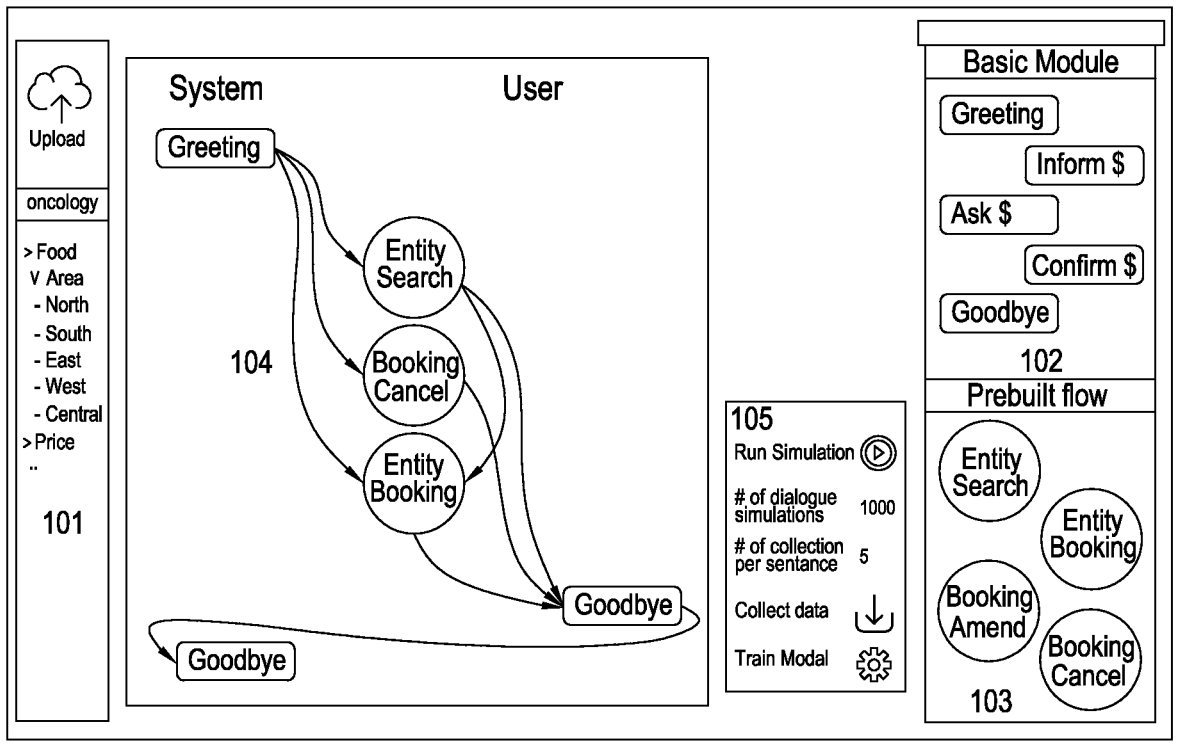
FIG. 12 shows a schematic illustration of a platform for performing a data collection method in accordance with an embodiment.

FIG. 12 shows a schematic illustration of a platform for performing the data collection procedure described above. The figure shows a GUI allowing a developer to control the construction of dialogue scenarios and outlines. The GUI enables a developer to control the construction of different dialogue scenarios and compose sub-dialogues (i.e. pre-built flows) (103) into the final dialogue.

The platform enables developers to build a conversational agent (dialogue system). The constructed dialogue system may be specialised for a desired dialogue domain, by generating specialised data (controlled by the dialogue scenarios). The data collection component may be connected to a crowdsourcing platform such as Amazon MTurk, Prolific Academic or Crowdflower for example. The data collection platform is adaptable and data can be generated for any dialogue domain based on the specifications provided by the developer in S701 and S702 (i.e. domain ontology and task specification).

The system may be continuously re-trained with new data. For example, if the system encounters a new dialogue scenario which is not handled well, more data may be collected to handle such scenarios and retrain the model to support this new scenario.

The system performs the method described in relation to FIG. 7 above. The developer may upload or select the domain ontology and the database of the dialogue domain. This is indicated by 101 in FIG. 12, and corresponds to S701 in FIG. 7 above. This corresponds to specification of the dialogue domain through database and ontology. Decoupling the task and domain specification (S701 and S702) from the actual use of language (i.e. the collection of the paraphrases in S708) enables developers to have control over the dialogues, and allows deployment of the system to new domains.

The next stage is construction of domain-specific goal-oriented dialogue agendas from basic modules (dialogue act types or actions) and pre-built conversational flows. Sub-dialogues shown in the section labelled 103 comprise pre-built dialogue flows which are used for any database querying tasks such as movie tickets search and buying, or restaurant search and booking. For instance, a straightforward dialogue agenda is generated from Greeting→Entity Booking→Goodbye, another straightforward agenda would be Greeting→Entity Search→Entity Booking→Goodbye. The pre-built conversational flows comprise the ordered groups of slots, and these are combined with the basic dialogue modules (act types or actions) to enable the developers to customise the conversational agendas without creating agendas for the standardised scenarios. The pre-built conversational flows are configurable in the sense that actual slot-value pairs from the chosen domain can be specified. A dataflow formalism is used for creating pre-built conversational flows. The pre-built conversational flows for dialogue scenario composition are used by a data simulation module in S703a, which samples values corresponding to the slots to generate the dialogue scenarios. These are then converted to dialogue acts in S703b using the basic modules (dialogue act types).

Full dialogue annotations are then generated through the interplay between the simulated user and the system policy model. The dialogue annotations are optionally converted into dialogue outlines (which are composed of template utterances). These dialogue outlines can be manually edited by the developer. The developers are not required to fully specify dialogue agendas (including the actual slot-value pairs). The constructed dialogue outlines are then fed into the data collection module in S708. After the 'Collect data' button has been pressed, the dialogue outlines (which are composed of template utterances) go to humans for paraphrasing. This removes the full dialogue specification from the developer and enables collection of more training data.

In an embodiment, developers may also build their own (custom) pre-built conversational flows, in order to expand the functionality beyond what is provided in the set of pre-built conversational flows (e.g., if the current set of conversational flows is determined not to cover all potential user behaviours and conversation scenarios). For instance, one custom flow may specify that the user always asks for the location before food type, while this is not fixed in the current "Entity Search" pre-built flow. The construction of such custom conversation flows may be achieved through simple drag-and-drop functionality: using the canvas 104 to drag-and-drop basic modules as well as pre-built conversational flows onto the canvas and build custom conversational agendas.

When the developer clicks on 'Run Simulation', the framework will generate the actual dialogue as raw dialogue acts (i.e., the dialogue annotation version of the dialogue). The dialogue is optionally then shown to the developer who can then check the dialogues and decide to add additional dialogue acts into the generated dialogue. Dialogue simulation in S703a is based on a set of dialogue scenarios composed from pre-built conversational flows (103). The values, user profile and other parameters are sampled in this step. This data simulation is designed to mitigate the problem of unnatural or incorrect dialogue acts, undesired behaviour, and also to simulate different types of users: more or less patient people, chattier or more laconic people, etc.)

Pre-built conversational flows can also be seen as different subtasks focusing on a different goal. Selecting a pre-built flow may correspond to selection of a task or subtask. They also can be combined into a more complex conversational flow. For example, first, the users want to search for a convenient restaurant (i.e., this conversational flow or subtask is Entity Search, see 103). If they find a convenient restaurant (i.e., entity), they might want to proceed with booking that restaurant, so another pre-build conversational flow has to trigger: Entity Booking, see again 103. If it is not possible to book the desired place, the system can enter another subtask: Booking Amend, or simply inform the user that the booking is not possible and finish the conversation.

The transition between pre-built conversational flows (which could be seen as different subtasks) can be specified using (finite) state machines. Combining different pre-built flows (i.e. sub-tasks) into larger flows may be performed in S703a, where the transitions between the pre-built flows can be specified using state machines. The state machine transitions operate on top of the available pre-built conversational flows, and each transition can be triggered anytime while the simulated user is at particular subtask (if the transition from that subtask A to another subtask B exists, of course). A state machine mechanism 104 for connecting pre-built flows is used. Using the pre-built dialogue flows, a variety of dialogue scenarios are generated in S703a. Random pairings of the modules and slot-value pairs for data simulation in S703a allows sampling of a wide range of conversational flows quickly. This allows collection of more data for model training.

The section labelled 102 provides a set of basic (domain-independent as much as possible) modules (dialogue acts) for building conversational agendas. The basic modules correspond to dialogue act types. The developer can select which sets of slots (and corresponding values) can be sampled when constructing user goals and dialogue scenarios. Actual slot-value pairs are sampled from the set during the data simulation step S703a. The system then generates the sampled dialogue scenarios for each designed dialogue type. The simulation component will construct a variety of dialogue scenarios for which the actual data is collected. This data simulation step comprises sampling the conversational flows, e.g. sampling the values.

Dialogue act sequences are then generated from the scenarios in S704 using dialogue self-play between the agenda-based user simulator and the policy module as described before. Once conversational pre-built flows for a particular dialogue domain have been selected, the simulations are run to generate dialogue scenarios in S703a.

The system sends the data to the paraphrasing step S708. The data is collected in S708 and comprises paraphrases of automatically generated dialogue templates, i.e. outlines. Data collection comprises the actual paraphrasing and may further comprise the concept highlighting tasks performed by the users, both based on the previously constructed and simulated dialogue outlines. The model is then trained automatically once the data is obtained, as will be described below. The sampling and simulation occur only after the user has specified their desired conversation flows (after steps 1 and 2).

The developer can perform another customisation step, if needed, by inspecting the sampled conversational agendas, tuning them or discarding them (or they can sample more conversational agendas). This step is optional.

The developer may also control the following initial steps of the data collection process:
  generating particular pre-built dialogue flows (e.g., handle search and booking);
  set the parameters of data simulation using the section labelled 105.

The parameters may specify how many dialogue scenarios are generated and how many paraphrases per each dialogue turn (i.e. per each template) they want to collect. The first parameter may correspond to the number of generated dialogue outlines (for example 1000), this corresponds to the number of dialogue simulations. The second parameter may correspond to the number of collected sentences per each template utterance (to ensure semantic/ language variability). There is another parameter that the user can specify: it controls the maximum length of the dialogue (outline) provided in the number of turns. The developer may specify just the types of goal-driven conversational flows the final system has to handle for example. The developer has to specify just the tasks the final system has to handle.

The above described method of data collection may enable a quick and effective data collection procedure, tailored for any given domain. The dialogue system, in particular the SLU and NLG modules, are dependent on the collected data, which therefore has an impact on the performance of the final dialogue system.

The data collection method may be on-demand, so that weaknesses (originating from data sparsity) detected in existing SLU and/or NLG modules can be targeted. The data simulation step (S703a) determines the scope of the dialogue. The developer may determine what patterns and behaviours are triggered in the training data. Furthermore, the simulated tasks used in data collection determine the scope of the dialogue it is possible to model.

Furthermore, the dialogue annotations are generated automatically during simulation, which mitigates labelling errors, which also has a positive effect on SLU (trained based on the data collected). Effectively labels are created initially, and the data generated based on the labels instead of the other way round.

The data collection can be considered as two stages: dialogue outline generation and data collection. By separating the dialogue outline generation from the data collection, the developer has control over the dialogue. Furthermore, annotations are automatically generated. Quality can also be determined at each stage.

Figure 13:
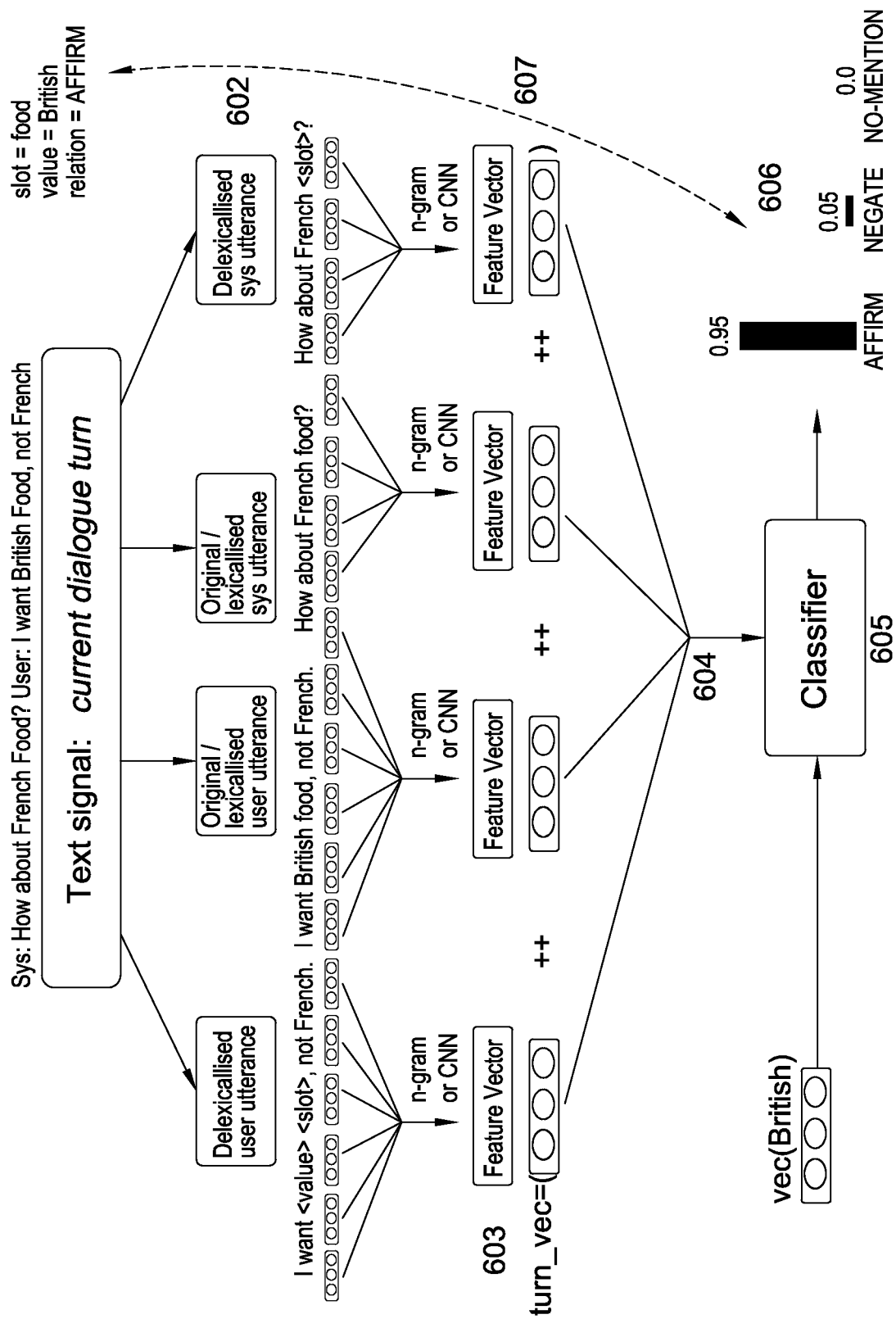
FIG. 13 shows a schematic illustration of a training method in accordance with an embodiment.

Once data collection has been completed, the model training phase can be performed. Data may be generated using the above described method, or using some other method, for example a machine to machine based method. A training procedure for Spoken Language Understanding is then performed. In other words, training of the parameters of the algorithms used in S302 and S303 above, including the vector representations of the slots, values, words and generic tags, is performed. An illustration of part of a training method in accordance with an embodiment is shown in FIG. 13. The method corresponds to that shown in FIG. 6(a), where labels are included in this case.

During the training method, an update of the parameters may be performed after each input user utterance, or in batches of dialogue turns, for example batches of 16 turns. The training process uses annotated training data (i.e., datasets annotated per-turn with slot-value pairs, and optionally dialogue act types and/or requestable slots). The annotations are also referred to as labels. Example training data is shown below:

"Hello, How can I help you?" GREETING
"I am looking for a restaurant that has vegan options and a moderate price range." INFORM(options_vegan=true, price_range="moderate")
"How about the Workshop Coffee Co, they have vegan options and a moderate price range?" OFFER (name="Workshop Coffee Co", options_vegan=true, price_range="moderate")
"I would like a rating GREATER than 1." INFORM(rating_greater=1)
"The restaurant Workshop Coffee Co has vegan options and they have vegetarian options. It is in the moderate price range and has a rating of 4. Is there anything else I can help me?"
REQUEST_MORE(name="Workshop Coffee Co", options_vegan=true, price_range="moderate", rating=4)
"Can you book that for me?" INITIATE_BOOKING
"Do you have a preference for a date and a number of people?" REQUEST(date, people)
"Please book that for 2018/05/02 and for 5 people at 01:15 PM"
INITIATE_BOOKING(date="2018/05/02", people=5, time="01:15 PM")
"Okay so you would like to book the restaurant Workshop Coffee Co on 2018 May 2 at 01:15 PM for 5 people, correct?" CONFIRM(name="Workshop Coffee Co", date="2018/05/02", people=5, time="01:15 PM")
"Yes, please book that for me." CONFIRM_BOOKING
"Okay so I have the restaurant Workshop Coffee Co booking_succeeded on 2018/05/02 at 01:15 PM for 5 people." INFORM(booking_suceeded=true, name="Workshop Coffee Co", date="2018/05/02", people=5, time="01:15 PM")
"Thanks, goodbye!" FINISHED In the data generation method described above, text data input by the users corresponding to each dialogue act may be stored, associated with the dialogue act. These may then be used during S306 of the dialogue method during implementation, to generate a natural language text signal based on the dialogue act. This removes the need for a natural language generation training stage to be performed. Alternatively however, a natural language generation model may also be trained, separately to process of training the spoken language understanding algorithms described below.

The training process is performed to train the slot specific classifiers used in 604 (S303), as well as the algorithms used to generate the feature vectors (e.g. the CNNs or n-grams) and to learn the word vector representations, both used in S302 (602 and 603). Only the steps up to the output of the slot specific classifiers are performed in the training stage. The subsequent steps of belief state update in S304 and system act generation in S305 are rule based processes, which do not need to be trained. Alternatively, data based belief state update models and policy models may be used, and these may be trained in a separate process. Other modules, for example ASR and TTS modules may also be trained separately.

As has been described in relation to the data generation method described above, a semantic dictionary may be compiled and stored. The semantic dictionary may comprise a list of different re-phrasings corresponding to each value and slot in the domain ontology. Alternatively or additionally, some or part of the semantic dictionary may be manually generated. This is then used as part of the training process. The compilation of the semantic dictionary (from concept highlights as described above and/or manually) is done prior to the training.

The semantic dictionary may then be used to provide delexicalisations of the training data. Alternatively, the delexicalisation may be performed without the use of a semantic dictionary. The generation of the delexicalised training data may be done before the training process begins in a single step.

During the training process, an input text signal corresponding to a user turn, together with the text signal corresponding to the previous system act, is initially processed in the same manner as described above in relation to the implementation stage. Thus the same process as described in relation to FIG. 6(a) is performed for each input turn. Alternatively, instead of the text signal corresponding to the previous system act, the annotation corresponding to the previous system act may be taken as input and processed in the same manner as described in relation to FIG. 6(a) in relation to the system act. The slot specific classifiers generate the output probability corresponding to each relation for the dialogue turn as has been described above. The update of the parameters is then performed based on the labels for the dialogue turn, which comprise the actual slot value relation combinations. These labels are mapped to a vector for each slot value combination for the turn, comprising a value of 1 for the slot value relation combination present in the dialogue turn and 0 for those which are not. The loss is generated from the classifier output probabilities and the label vectors, and the update performed as described below.

During training, vector representations of the slots and values in the ontology, words in the training data, and the generic tags, are learned as parameters. These are then stored for use during implementation (where they are fixed). There may be values, and possibly slots, for which no examples exist in the training data. In this case, the vector representations are not updated based on any example data for the slot/value, but may still be used during implementation to represent the slot/value. The inclusion of the delexicalised representation of the utterance compensates in such cases, allowing good performance as described above in relation to the implementation stage.

In an embodiment, the representation(word/tag), where "word" indicates a word in the training data or in the ontology (i.e. a slot or value), is given by hash(word/tag)). Hash(word/tag) maps the words in the training data, tags (i.e. the generic slot and value tags) and the slots and values in the ontology (of which there are an arbitrary number) to data of a fixed size, i.e. to a fixed number of vectors. In an embodiment, it assigns to each word, including the slots and values in the ontology, one d-dimensional vector from a set of $\{1, \ldots, M\}$ d-dimensional vectors. The word is hashed to provide one-of-M (also called one-hot) embedding representations. In other words, each word in the training data and ontology is represented by a d-dimensional vector. Collisions are possible if the number of possible words is larger than M (e.g., representation(chinese)=representation (british)). The vectors are randomly initialised. The vector entries are then updated as parameters during the training process. In an embodiment, M is 10 000, however this is also a configurable hyper-parameter. The embedding (i.e. the vector) is learned during training, which gives the model some capacity to learn special behaviour. Limiting the initial hash function to 1-of-M produces a fixed-size model, where the model does not need to know the number of possible words ahead of time, but learns which words are more important during training.

Some words may be designated as special words. The special words comprise special values. For example there may be a number of pre-defined special values (such as true, false, don't care) which are domain-independent. True and false are always the only possible values for any binary slot in any domain. "Don't care" is a special value used when the user doesn't care about specifying any search constraint for a particular informable slot; e.g., they don't have any preference on the food type. For these special values, representation(value), i.e. the representation of the value, is still a learned embedding (i.e. a dense real-valued d-dimensional vector), however the vector representation is specific to each special value. In other words, each special word is reserved a vector representation used only for that word. The value "other" may also be included as a special value. Special values are those considered to be more important to the model (e.g., one or more of true, false, don't care, and other will likely occur more often than some exotic cuisine types) and therefore are reserved "exclusive" vector representations which are not shared by any other word. The parameters for the special values are the same format as those for all the words, namely dense d-dimensional vectors. For each of a set of pre-defined special words, a vector is reserved, while for all the other "non-special" words, a representation from a fixed pool of M representations is assigned: this makes the model size (in terms of the number of parameters) fixed. The generic tags slot and value used for the delexicalisation may also have exclusive vector representations.

The value=<other> may be pre-defined as a special value, and therefore have a unique representation. This vector representation is then used for any value that is not present in the domain ontology, but is present in the collected data for example. The label <other> is given the relation affirm if something not found in the ontology is affirmed in the training data, similarly for negate, and otherwise it is not-_mentioned. This may be done before the training process, when delexicalising the training data. In this step, labels corresponding to values which are not in the domain ontology are replaced with the label <other>. If it is detected that there were affirms or negates in the training data which are not found in the ontology, this means that the user asks about "other values". This allows the system to report to the user that it cannot help with that particular value (as it does not exist in the ontology). This means the model can explicitly handle cases where users say "I want Eritrean food", but there is no value "Eritrean" in the ontology. This captures the cases where the user expressed an intent to which the system cannot provide sufficient assistance, whereby the system explicitly reacts to this case and avoids dead-end dialogues.

Although a specific method of generating vector representations for words has been described, alternative methods of converting words into vectors may be used. The method shown in FIG. 13 and described above in relation to FIG. 6(a) is performed in the forward pass for the current dialogue turn. As described above, the figure shows an example for the slot "food" where the current value in consideration is British. The label for that particular slot-value pair (see upper right corner) in this particular dialogue turn is AFFIRM. Thus the label comprises the information {slot=food, value=British, relation=affirm=1, relation=negate=0, relation=not mentioned=0}.

The text signal (601) is a dialogue turn from the training data which comprises the previous system utterance and the current user utterance. The system and the user utterance are first delexicalised based on the particular value for the particular slot (i.e., value=British, slot=food), and the original lexicalised utterances may also be retained (see 602). The delexicalisation process may be based on the available semantic dictionary.

The word vector representation parameters of the model are the d-dimensional real-valued stored vectors (d=100 in this example, but this is a hyperparameter which may be altered) assigned to all words from the training data, ontology, and assigned to the generic tags such as <slot> or <value>. The vector representations are parameters, shared across all slot-specific classifiers (this is a parameter tying component between the classifiers). The utterances are converted to the vector representations, as described above in relation to the implementation stage.

The vector representations of the delexicalised and lexicalised utterances are then converted into a feature vector as described in relation to the implementation stage (e.g. using the n-gram feature representation or running the vectors through CNN networks). The feature vector is passed to the slot specifc classifier (605), which in this case is a three way classifier. As described above, the classifier may be implemented as a deep three-layer MLP with ReLU as the activation function.

The classifier then outputs a categorical probability distribution assigning probability scores for the three possible relations (606) in the same manner as described in relation to the implementation stage. For the given example, the correct relation is AFFIRM and the model is penalised if the classifier's predictions do not match the correct relation label (607), as will be described in further detail below.

The process for value=French would follow the same outline, but with different delexicalised system and user utterances, and a different label (i.e., NEGATE has probability 1).

In an embodiment, during training, as well as the values for which the label is AFFIRM or NEGATE, only K "negative" values for the slot, where the relation is NOT-MENTIONED (i.e. where the delexicalised user utterance is "I want British <slot>, not French"), are run for each turn. This limits the number of iterations of the classifiers for values which are not mentioned in the turn (the majority of the values). Thus in training, the classifiers may be run only for those values for which the label is NEGATE or AFFIRM (or GREATER THAN or LESS THAN for range slots) and a fixed number of those for which it is NOT MENTIONED. In an embodiment, K=8, however K is also a hyper-parameter which may be varied. This allows a balance of the number of "positive" and "negative" examples, avoiding the classifier obtaining a low loss by simply assigning a high probability to NOT_MENTIONED all the time. The parameters are then updated according to these generated training examples (both the "positive" ones and the K "negative" ones) corresponding to the dialogue turn. Thus for a value observed in the current turn, the slot specific classifier is run for the observed value or values plus K other randomly sampled values associated with the current slot. The update may be performed based on averages from the runs, as will be described below. For slots where all of the values have the label "not_mentioned", the corresponding classifiers may be omitted for the dialogue turn.

The shared parameters of the model are the vector representations (embeddings) for non-special and special values, slots, other words and generic tags (e.g., <slot>, <value>). All these representations are shared across each classifier. Any update of these parameters is thus propagated to all other classifiers. The parameters (i.e. weights) of the algorithms (for example the CNNs) used to generate the feature vectors in 603 are also shared parameters. The actual parameters of the slot specific classifiers (weights for each classifier) are slot specific. There is thus a shared set of parameters comprising the vector representations, and a slot specific set of parameters comprising the weights of hidden layers in the slot specific classifiers.

A neural network structure mapping n-gram features to an updated distribution for the food slot, with no tying of parameters, would require separate examples of each of the food types to learn what n-grams are associated with each. However, n-grams like "<value> food" and "serving <value>" are likely to correspond to the hypothesis "food=<value>" for any food-type replacing "<value>". Through inclusion of delexicalisation, the parameters include parameters which are used for all the slot specific classifiers, namely the vector representations of generic placeholders <SLOT> and <VALUE> which abstract away the actual value and/or slot instance.

Thus for a single slot value combination for the dialogue turn, a loss may be calculated from the vector of probability values for the relations output from the slot specific classifier and the label. In an embodiment, a cross entropy loss function is used. The gradient of the loss with respect to each of the relevant parameters (i.e. weights and biases in the slot specific neural network, weights and biases in the model used to determine the feature vector, for example the CNNs, and the word vector representations used) is calculated, based on the back-propagated error signal and the feedforward activation signals (inputs to each layer). Every operation performed in the forward pass is differentiable and therefore a functional expression for the derivative of the loss with respect to every single parameter (i.e. weights, biases, vector representations) can be determined by the chain rule. The gradient values are calculated from these expressions using the back-propagated error and the activations (inputs for each layer from the forward pass, cached during the forward pass). The gradient for each parameter is then used to calculate the updated parameter from the previous values using an optimizer function (i.e. a gradient descent type optimiser function). The input to the optimiser function for each parameter is the previous value, the corresponding gradient value and a learning rate parameter. In general, gradient descent based optimizers update the parameter in the direction of steepest descent of the loss function with respect to the parameter, scaled by a learning rate. The parameters are replaced with the new values and the process iterates with another slot value combination for the dialogue turn for example.

The training may be performed in batches of dialogue turns, for example 16 turns. The average of the gradient values may be taken across the batch, and the update performed using the batch average values. Where the classifier is run for multiple values, the update may be performed using run and batch average values.

As described in relation to FIG. 3 above, a dialogue act classifier or classifiers may be included in the system, and may be trained in a separate step to the slot specific classifiers, but using the same data. Furthermore, parameters such as the vector representations may be shared with the slot specific classifiers. These parameters may be updated during both training procedures (i.e. based on the output of the dialogue act classifier or classifiers and on the outputs of the slot specific classifiers). The dialogue act classifier or classifiers are trained based on the annotation information relating to the input user utterance, specifically the dialogue act labels. The same process as described above in relation to the implementation stage is performed during the forward pass. The gradient of the loss with respect to each of the relevant parameters (i.e. weights and biases in the dialogue act classifier, weights and biases in the model used to determine the feature vector, for example a CNN, and the word vector representations used) is calculated. The gradient for each parameter is then used to calculate the updated parameter from the previous values using an optimizer function (i.e. a gradient descent type optimiser function). Again, batch average updates may be used.

As further described in relation to FIG. 3 above, requestable slot classifiers may also be included in the system. These classifiers may also be trained in a separate step, but using the same data. Furthermore, parameters such as the vector representations may be shared with the slot specific classifiers. These parameters may be updated during both or all training procedures (i.e. based on the output of the dialogue act classifier or classifiers, the requestable slot classifiers and on the outputs of the slot specific classifiers).

The requestable slot classifiers are also trained based on the annotation information relating to the input user utterance, specifically the requestable slot labels. The same process as described above in relation to the implementation stage is performed during the forward pass. The gradient of the loss with respect to each of the relevant parameters (i.e. weights and biases in the requestable slot classifiers, weights and biases in the model used to determine the feature vector, for example a CNN, and the word vector representations used) is calculated. The gradient for each parameter is then used to calculate the updated parameter from the previous values using an optimizer function (i.e. a gradient descent type optimiser function). Again, batch average updates may be used.

To implement the system in a particular language, training data in that language is used to train the system. The operation and training method, and the architecture of the system, remain the same. Training data in a particular language enables the training of the same system, and the final product is a dialogue system in that particular language. Similarly, data may be collected in the desired language using the data generation method described below. By providing the specific ontology information relating to the task along with language-specific training data, the system may be trained for operation in a particular domain and language.

Further embodiments are set out in the following clauses:

1. A system for generating data for training a dialogue system, comprising:
   an input for receiving input data relating to a speech or text signal originating from a user;
   an output for outputting information relating to a dialogue act;
   a processor configured to:
      obtain domain information comprising information identifying a plurality of dialogue slots and values, wherein each dialogue slot may take on one or more of the values;
      generate a plurality of dialogue scenarios from the domain information, each dialogue scenario comprising one or more combinations of dialogue slots and values;
      generate one or more dialogue sequences corresponding to each dialogue scenario, each dialogue sequence comprising one or more dialogue acts;
      sub-sample the dialogue sequences to generate a sub-set of dialogue sequences;
      output information specified by the dialogue acts;
      receive data comprising speech or text signals corresponding to paraphrased versions of the sub-set of dialogue sequences.

2. The system according to clause 1, wherein outputting information comprises presenting information specified by only a part of the dialogue sequence to a user, wherein the user inputs speech or text data corresponding to the at least a part of the dialogue sequence.

3. The system according to clause 2, wherein a user is presented with a turn in the dialogue sequence and information regarding the previous turn in the dialogue sequence.

4. The system according to any of clauses 1 to 3, wherein the output information comprises information requesting the user to identify the words in the inputted speech or text data corresponding to the values in the dialogue sequence.

5. The system according to any of clauses 1 to 4, wherein the processor is further configured to convert the dialogue sequence into a dialogue outline, wherein the dialogue outline comprises template utterances, wherein sub-sampling the dialogue sequences comprises sub-sampling the dialogue outlines, and wherein outputting information comprises presenting at least a part of the dialogue outline to a user.

6. A method of generating data for training a dialogue system, comprising:
   obtaining domain information comprising information identifying a plurality of dialogue slots and values, each dialogue slot corresponding to a subject that a speech or text signal may relate to, wherein each dialogue slot may take on one or more of the values;
   generating a plurality of dialogue scenarios from the domain information, each dialogue scenario comprising one or more combinations of dialogue slots and values;
   generating one or more dialogue sequences corresponding to each dialogue scenario, each dialogue sequence comprising one or more dialogue acts;
   sub-sampling the dialogue sequences to generate a sub-set of dialogue sequences;
   outputting information specified by the dialogue acts;
   receiving data comprising speech or text signals corresponding to paraphrased versions of the sub-set of dialogue sequences.

7. A carrier medium comprising computer readable code configured to cause a computer to perform the method of clause 6.

8. A method of training a dialogue system, using training data comprising user speech or text signals, and labels for each signal, the labels comprising information relating to dialogue slots, values and relations, wherein the relations specify the relation of the values to the dialogue slots, the method comprising:
   generating features from the input signal;
   for each of a plurality of classifier models, each classifier model corresponding to a dialogue slot, and for one or more values corresponding to the dialogue slot, inputting features generated from the input signal, the classifier model outputting a probability corresponding to each of three or more relations;
   updating the classifier model parameters.

9. A carrier medium comprising computer readable code configured to cause a computer to perform the method of clause 8.

While certain embodiments have been described, these embodiments have been presented by way of example only, and are not intended to limit the scope of the inventions. Indeed the novel methods and apparatus described herein may be embodied in a variety of other forms; furthermore, various omissions, substitutions and changes in the form of methods and apparatus described herein may be made.

The invention claimed is:

1. A dialogue system comprising:
   an input for receiving input data relating to a speech or text signal originating from a user;
   an output for outputting speech or text information specified by a dialogue act; and
   a processor configured to:
      generate features from the input signal;
      for each of a plurality of classifier models, each classifier model corresponding to a dialogue slot, and for one or more values corresponding to the dialogue slot, input features generated from the input signal, the classifier model outputting a probability corresponding to each of three or more relations, wherein the relations specify the relation of the value to the dialogue slot;
update a belief state based on the outputs of the classifier models;
determine a system dialogue act by inputting information relating to the belief state into a policy model;
output speech or text information specified by the determined dialogue act at the output,
wherein generating features from the input signal comprises generating features for a slot and value combination, comprising:
converting the input signal to vector representations, replacing all instances of the slot and of the value with a slot vector representation and a value vector representation; and
inputting the vector representations to a first trained model, configured to output features,
wherein for the classifier model corresponding to the slot, the features generated for the slot and value combination are inputted to the classifier model for the value, the classifier model outputting a probability that each relation specifies the relation of the value to the slot.

2. The dialogue system according claim 1, wherein generating features from the input signal further comprises:
converting the input signal to vector representations;
inputting the vector representations to the first trained model.

3. The dialogue system according to claim 1, wherein features representing the value are also inputted to the classifier model.

4. The dialogue system according to claim 3, wherein the processor is further configured to:
generate features from the previous dialogue system output or the previous system dialogue act, wherein features generated from the previous dialogue system output or the previous system dialogue act are inputted to the classifier models.

5. The dialogue system according to claim 4, wherein generating features from the previous dialogue system output or system dialogue act comprises generating features for a slot and value combination, comprising:
converting the previous dialogue system output or system dialogue act to vector representations, replacing all instances of the slot and of the value with a slot vector representation and a value vector representation;
inputting the vector representations to the first trained model;
wherein for the classifier model corresponding to the slot, the features generated for the slot and value combination are inputted to the classifier model for the value, the classifier model outputting a probability that each relation specifies the relation of the value to the slot.

6. The dialogue system according to claim 5, wherein generating features from the previous dialogue system output or system dialogue act further comprises:
converting the previous dialogue system output or system dialogue act to vector representations;
inputting the vector representations to the first trained model.

7. The dialogue system according to claim 1, wherein the first trained model comprises a convolutional layer.

8. The dialogue system according to claim 1, wherein a stored set of possible phrasings for one or more slots and values is used to determine the instances of the slots and of the values.

9. The dialogue system according to claim 1, wherein for one or more of the classifier models, the plurality of relations comprises: an affirmative relation, a negative relation, and a not mentioned relation.

10. The dialogue system according to claim 1, wherein for one or more of the classifier models, the plurality of relations comprises: a greater than relation, a less than relation, and a not mentioned relation.

11. A dialogue method, comprising:
receiving input data relating to a speech or text signal originating from a user;
generating features from the input signal;
for each of a plurality of classifier models, each classifier model corresponding to a dialogue slot, and for one or more values corresponding to the dialogue slot, inputting features generated from the input signal, the classifier model outputting a probability corresponding to each of three or more relations, wherein the relations specify the relation of the value to the dialogue slot;
updating a belief state based on the outputs of the classifier models;
determining a system dialogue act by inputting information relating to the belief state into a policy model;
outputting speech or text information specified by the determined dialogue act,
wherein generating features from the input signal comprises generating features for a slot and value combination, comprising:
converting the input signal to vector representations, replacing all instances of the slot and of the value with a slot vector representation and a value vector representation; and
inputting the vector representations to a first trained model, configured to output features,
wherein for the classifier model corresponding to the slot, the features generated for the slot and value combination are inputted to the classifier model for the value, the classifier model outputting a probability that each relation specifies the relation of the value to the slot.

12. A non-transitory computer-readable storage medium comprising computer readable code configured to cause a computer to perform the following:
receiving input data relating to a speech or text signal originating from a user;
generating features from the input signal;
for each of a plurality of classifier models, each classifier model corresponding to a dialogue slot, and for one or more values corresponding to the dialogue slot, inputting features generated from the input signal, the classifier model outputting a probability corresponding to each of three or more relations, wherein the relations specify the relation of the value to the dialogue slot;
updating a belief state based on the outputs of the classifier models;
determining a system dialogue act by inputting information relating to the belief state into a policy model;
outputting speech or text information specified by the determined dialogue act,
wherein generating features from the input signal comprises generating features for a slot and value combination, comprising:
converting the input signal to vector representations, replacing all instances of the slot and of the value with a slot vector representation and a value vector representation; and inputting the vector representations to a first trained model, configured to output features,
wherein for the classifier model corresponding to the slot, the features generated for the slot and value combination are inputted to the classifier model for the value, the classifier model outputting a probability that each relation specifies the relation of the value to the slot.

* * * * *